(12) United States Patent
Bergin

(10) Patent No.: US 10,083,189 B2
(45) Date of Patent: *Sep. 25, 2018

(54) SYSTEMS AND METHODS FOR MANAGEMENT OF CONTACT INFORMATION

(71) Applicant: James P. Bergin, NorthPort, NY (US)

(72) Inventor: James P. Bergin, NorthPort, NY (US)

( * ) Notice: Subject to any disclaimer, the term of this patent is extended or adjusted under 35 U.S.C. 154(b) by 795 days.

This patent is subject to a terminal disclaimer.

(21) Appl. No.: 14/495,218

(22) Filed: Sep. 24, 2014

(65) Prior Publication Data

US 2015/0254368 A1 Sep. 10, 2015

Related U.S. Application Data

(63) Continuation of application No. 13/601,075, filed on Aug. 31, 2012, now Pat. No. 9,152,655, which is a continuation of application No. 11/628,886, filed as application No. PCT/US2005/020671 on Jun. 9, 2005, now Pat. No. 8,280,913.

(60) Provisional application No. 60/578,665, filed on Jun. 9, 2004.

(51) Int. Cl.
*G06F 17/30* (2006.01)
*G06F 21/62* (2013.01)
*G06Q 10/10* (2012.01)

(52) U.S. Cl.
CPC .. *G06F 17/30283* (2013.01); *G06F 17/30864* (2013.01); *G06F 17/30952* (2013.01); *G06F 21/6227* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 5,737,726 A | 4/1998 | Cameron et al. | |
| 5,873,096 A | 2/1999 | Lim et al. | |
| 6,760,727 B1 | 7/2004 | Schroeder et al. | |
| 6,820,083 B1 | 11/2004 | Nagy et al. | |
| 6,883,000 B1 | 4/2005 | Gropper | |
| 6,983,205 B2 * | 1/2006 | Chen | H03M 7/30 340/991 |
| 2001/0027472 A1 | 10/2001 | Guan | |
| 2004/0051730 A1 | 3/2004 | Uvikas et al. | |
| 2004/0220899 A1 | 11/2004 | Barney et al. | |

FOREIGN PATENT DOCUMENTS

WO 0048106 8/2000

* cited by examiner

*Primary Examiner* — Amresh Singh
(74) *Attorney, Agent, or Firm* — Sofer & Haroun, LLP

(57) ABSTRACT

Systems and methods for the management of contact information, which may include automatic transfer processes, automatic update processes, automatic customization processes, automatic delivery processes, automatic storage processes, automatic portability processes, and/or automatic radial mining processes.

90 Claims, 17 Drawing Sheets

FIG. 5
50
(Front Side)
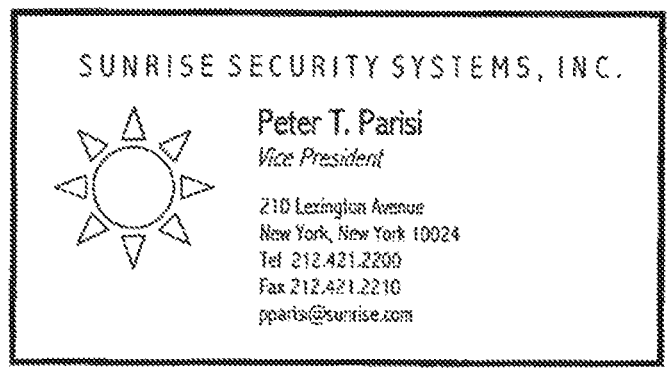
50
(Back Side)
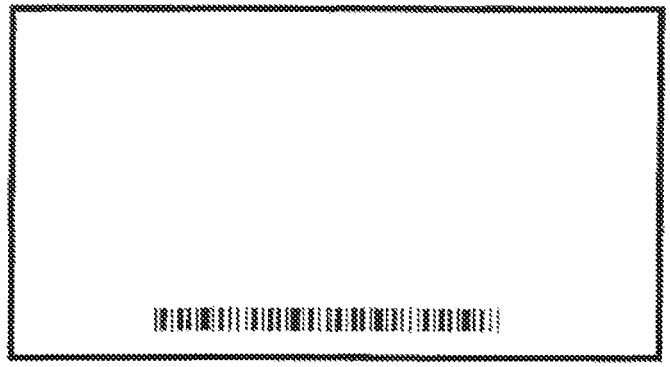

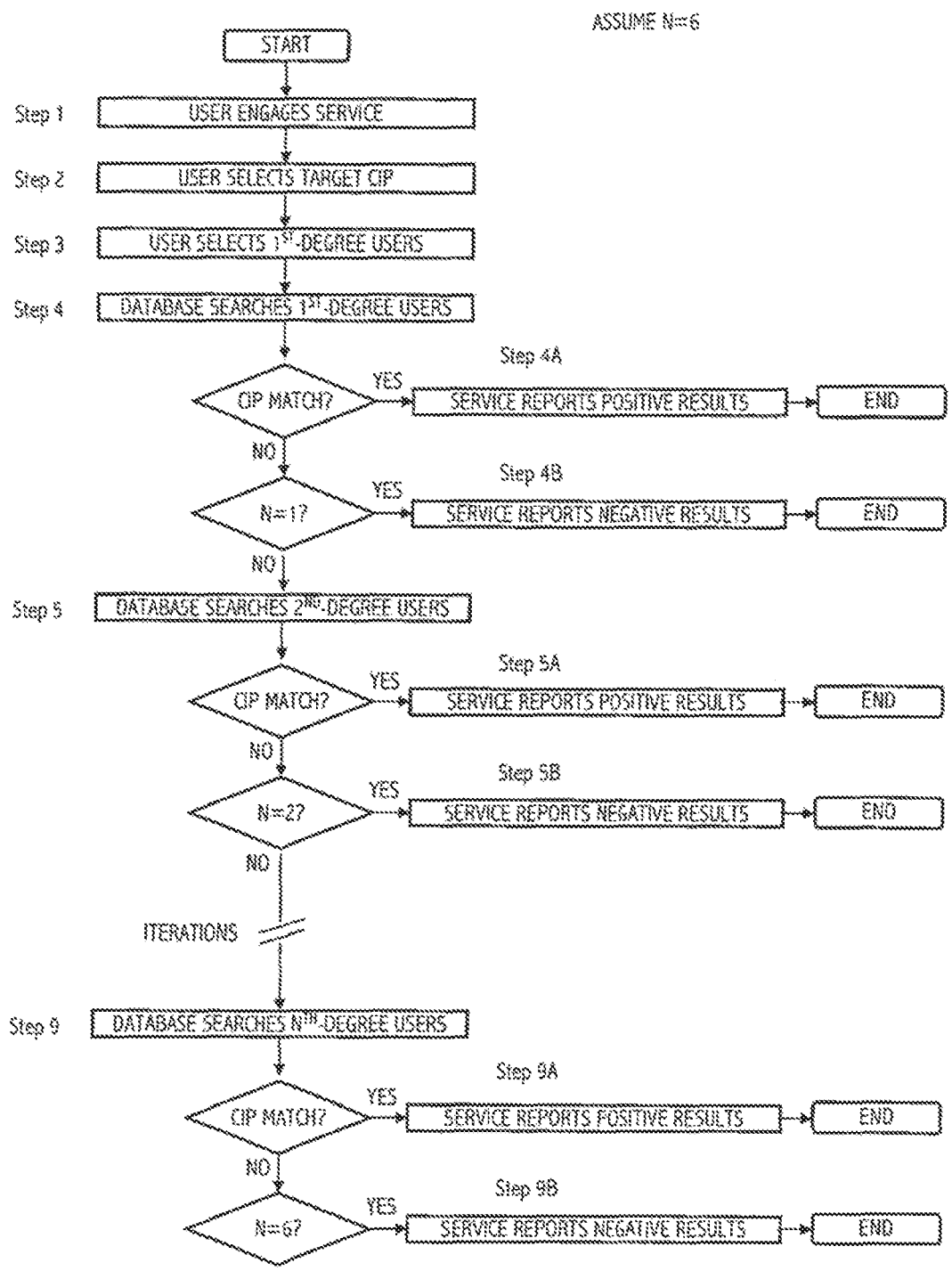

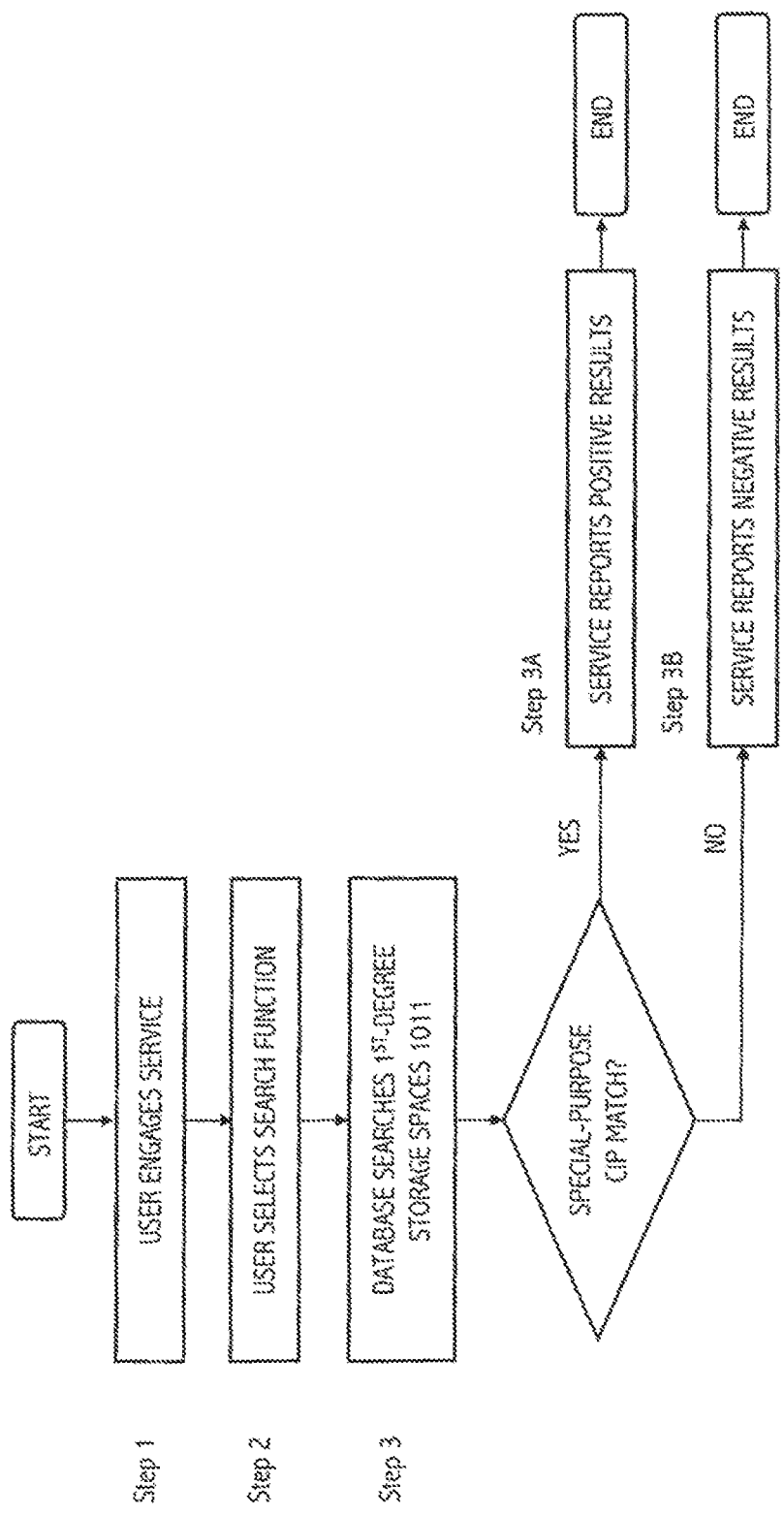

SYSTEMS AND METHODS FOR MANAGEMENT OF CONTACT INFORMATION

RELATED APPLICATION

This application is a continuation application that claims the benefit of priority from U.S. patent application Ser. No. 13/601,075, filed on Aug. 31, 2012, which in turn claims the benefit of priority from U.S. patent application Ser. No. 11/628,886, filed on Dec. 8, 2006 which is a National Phase Application of PCT Patent Application No. PCT/US2005/020671 filed on Jun. 9, 2005, which in turn claims the benefit of priority from U.S. Provisional Patent Application No. 60/578,665 filed on Jun. 9, 2004 the entirety of which are incorporated herein by reference.

FIELD OF THE INVENTION

This invention is in the field of systems and methods for the management of contact information, and more particularly, internet-based services for the management of personal and professional contact information.

BACKGROUND OF THE INVENTION

The management of contact information is one of the most frequent, and important, tasks in the everyday lives of individuals and businesses alike. For individuals, the management of contact information underlies all of their personal and professional communications. For businesses, the management of contact information underlies all professional communications with customers, partners, and others. Despite the frequency and importance of the task, technology has not to date solved many of the problems associated with the management of contact information.

For example, one's contact list—the list of all others, individuals and businesses, for whom one has contact information, together with the contact information—often is less expansive than one desires and contains information that is incomplete, inaccurate, and in a non-uniform format (meaning some or all of such information is not useful for automated processing, such as in speed dialing). This problem is largely due to the fact that the transfer of contact information from one to another typically requires manual transcription (e.g., writing or typing) of such information by the sender and/or receiver of the information. Manual transcription of such information is burdensome, time-consuming, and prone to human error. This problem is also due to the fact that it is difficult, often impossible, to find the contact information one needs. For example, privacy concerns prevent many (even most) individuals from listing their contact information in directories. What information is listed in public directories is often incomplete, inaccurate, and in a non-uniform format. Moreover, current directory services or search engines are largely unable to handle anything other than straightforward search requests. If one is successful in finding the needed information, the transfer of it again typically requires manual transcription, making it difficult or unfeasible to preserve the information in one's contact list.

For another example, one's contact list often contains information that is out of date (and thus inaccurate and/or incomplete); meaning, the contact information for one or more individuals or businesses in one's contact list has changed since last entered in the list, and thus the list does not contain the up-to-date information. This problem is due in part to the manual transcription requirement for sending and/or receiving updated contact information. This problem is also due in part to the substantial other effort typically required for communications between the sender (or would-be sender) of updated contact information and each of the many receivers (or would-be receivers) of such information. Such effort is also burdensome, time-consuming, and prone to human error.

For another example, one's contact list often does not contain "special-purpose" contact information (which may be of a personal or professional nature), like an individual's temporary contact information while on a business trip. Conversely, one's contact list often contains special-purpose contact information that is not valid, cluttering the list and sometimes confused with or overwritten in the place of valid information; for example, the individual has returned from his business trip, but his temporary contact information (no longer valid) remains in one's list. These problems are due in part to the manual transcription requirement and the multiple-communications requirement, on the parts of both the sender (or would-be sender) and receivers (or would-be receivers) of special-purpose contact information. These problems are also due in part to the substantial other effort typically required for repeatedly auditing the validity of special-purpose contact information in one's contact list. Such effort is also burdensome, time-consuming, and prone to human error.

For another example, one's contact list often does not contain contact information of unknown others whose contact information may be of interest. That is, for example, contact information is, like an advertisement, promotional in nature; indeed, it is a central part of any and all advertisements. However, one is often unaware of others offerings goods or services of interest. This problem is due in part to the fact that—though, for example, on-line search advertising is a fairly effective way to reach those likely to have an interest in one's goods or services—there are few if any effective ways to target one's contact information (or an advertisement) at the consumer who is not actively searching for it. This problem is also due in part to the manual transcription requirement; meaning, for example, even if a consumer stumbles upon an on-line advertisement of interest, it is often difficult or impossible to save it for later reference.

For another example, contact information in one's contact list is often lost. That is, for example, most individuals today store their contact lists in multiple electronic address books, each residing on one of the individual's multiple computing/communications devices (hereinafter "devices"), on-line at an internet service (e.g., AOL), or elsewhere. The devices may be misplaced, stolen, or damaged, or otherwise become inaccessible by the individual (e.g., when switching jobs and having to leave a desktop computer behind); and all contact information residing on a lost device, if not stored in another address book, is also lost. This problem is due in part to the manual transcription requirement and the auditing requirement for storing one's contact list in an address book that is less subject to loss. This problem is also due in part to the fact that, though there exist automated (at least partially) means for storing one's contact list in such an address book (e.g., an electronic address book stored on-line at an internet service), such means are prone to error and are burdensome and time-consuming to use.

For another example, contact information in one's contact list is often not available at the time or place it is needed. That is, for example, contact information stored on an individual's desktop computer may not be available to him when he is away from his computer and trying to place a call from his mobile phone. This problem is due in part to the manual transcription requirement and the auditing requirement for synchronizing the storage of one's contact list in multiple address books. This problem is also due in part to the fact that, though there exist automated (at least partially) means for synchronizing the storage of one's contact list in multiple electronic address books (including one stored on-line at an internet service), such means are prone to error and are burdensome and time-consuming to use.

For a final example, the contact information of others (in particular when taken together with one's own contact information) can yield valuable intelligence concerning one's relations to others; that is, for example, the information from multiple contact lists can reveal for one individual the "degrees of separation" between that individual and another with whom he desires to establish contact through mutual acquaintances. However, such valuable intelligence goes largely un-mined.

There exists the need for systems and/or methods to solve or alleviate these and other problems associated with the management of contact information.

SUMMARY OF THE INVENTION

The present invention relates to systems and methods for the management of contact information. More particularly, the invention relates to systems and methods for the management of a user's personal and professional contact information, including "outgoing" information (i.e., information by which another may contact the user) and "incoming" information (i.e., information by which the user may contact another, which, when possessed by the user, is said to be in the user's contact list).

The present invention may include "automatic transfer" processes where, for example, a user transfers his outgoing contact information to one or more other users with little or no manual transcription of such information, or other effort, by the sender and/or receiver(s) of the information.

The present invention may also include "automatic update" processes where, for example, a user updates his outgoing contact information and sends his updated contact information to one or more other users with little or no manual transcription of such information, or other effort, by the sender and/or receiver(s) of the updated information.

The present invention may also include "automatic customization" processes where, for example, a user customizes his outgoing contact information for special purposes (e.g., for an upcoming business trip) and sends his special-purpose contact information (e.g., his temporary contact information while traveling) to one or more other users with little or no manual transcription of such information, or other effort, by the sender and/or receiver(s) of the special-purpose information.

The present invention may also include "automatic delivery" processes where, for example, a user sends his outgoing contact information to targeted other users with little or no manual transcription of such information, or other effort, by the sender and/or receivers of such information.

The present invention may also include "automatic storage" processes where, for example, a user's incoming contact information is stored in a database, with little or no manual transcription of such information, or other effort, by the user.

The present invention may also include "automatic portability" processes where, for example, a user's incoming contact information is stored on and/or accessible through multiple devices, with little or no manual transcription of such information, or other effort, by the user.

The present invention may also include "automatic radial mining" processes where, for example, contact information is mined to yield for one user intelligence concerning his relations to other users, with little or no manual transcription of such information, or other effort, by the user.

These and other features of the present invention are apparent in the following Detailed Description of the Invention, considered in conjunction with the accompanying Drawings. It is to be understood, however, that the Detailed Description of the Invention and Drawings are presented solely for the purposes of illustration, and not as a definition of the limits of the invention.

BRIEF DESCRIPTION OF THE DRAWINGS

In the Drawings, in which like references denote similar elements throughout the several views:

FIG. 5 illustrates a sample Conveyor (described below), on which is present a sample Contact Information Profile in bar code form, according to one embodiment of the present invention;

FIG. 13 is a flow diagram illustrating the sequence of steps in an automatic radial mining process according to one embodiment of the present invention; and FIG. 14 is a flow diagram illustrating the sequence of steps in another automatic radial mining process according to one embodiment of the present invention.

It is to be understood that the Drawings are not necessarily to scale, but are merely conceptual in nature.

DETAILED DESCRIPTION OF THE INVENTION

Figure 1:
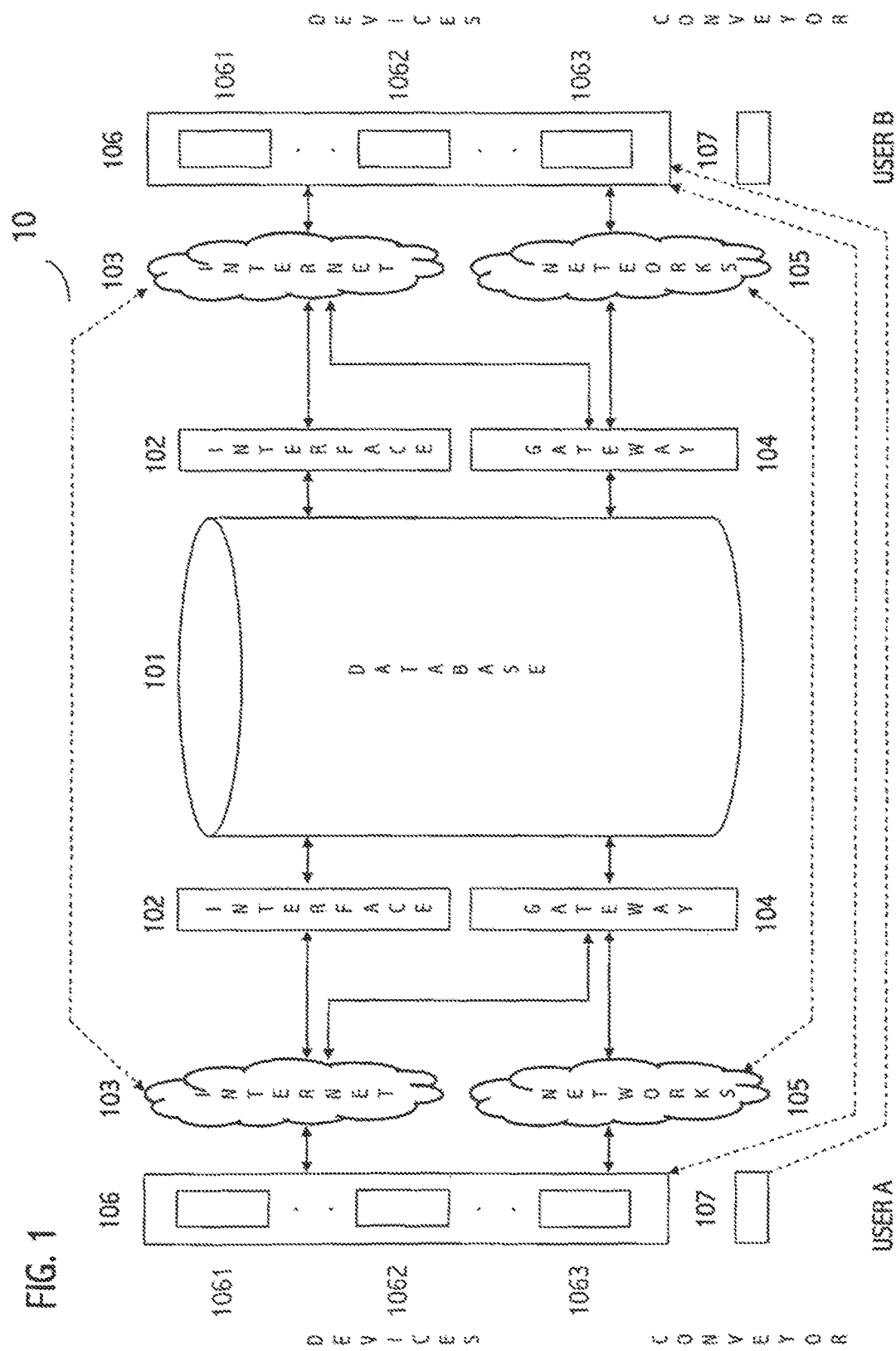
FIG. 1 is a block diagram illustrating the end-to-end architecture of one embodiment of a system for the management of contact information according to the present invention.
Figure 1A:
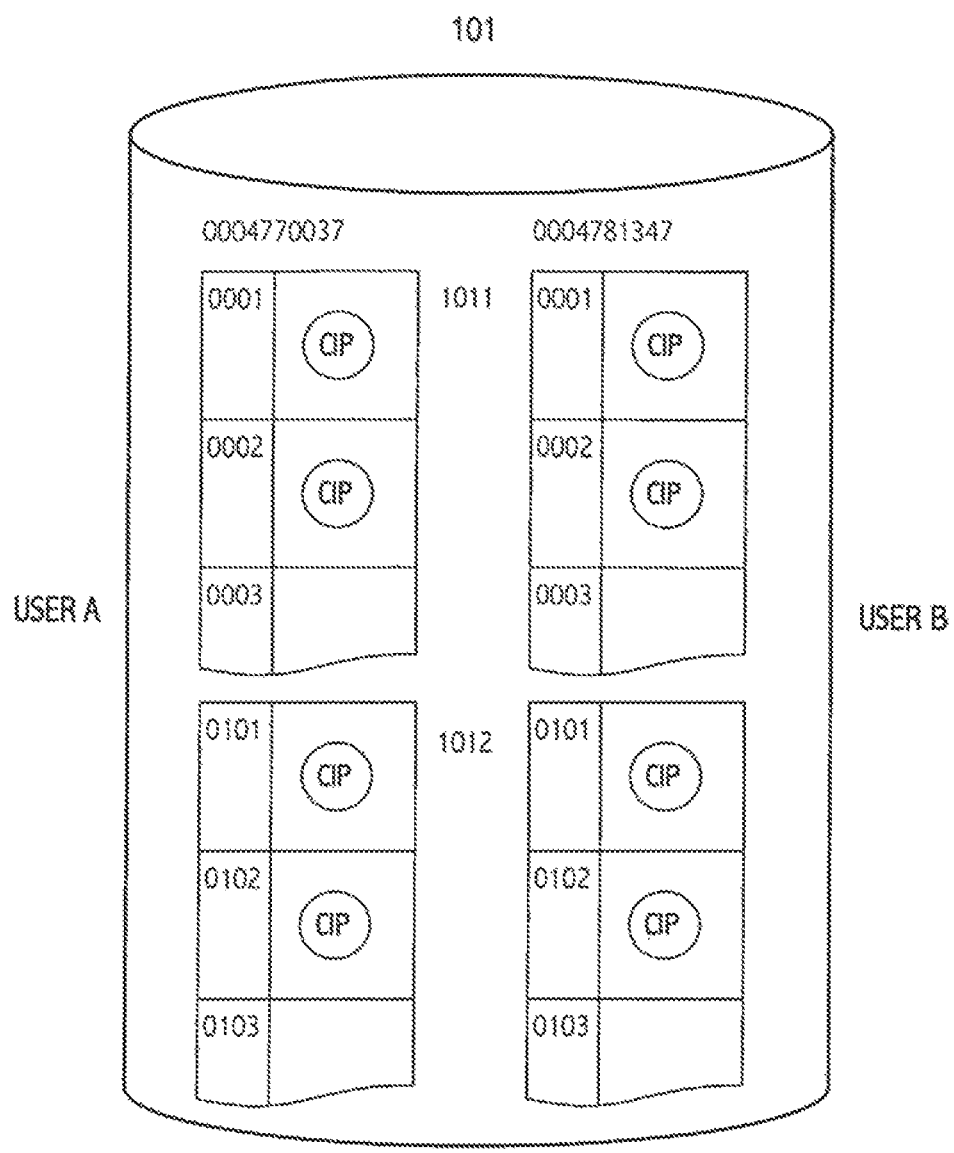
FIG. 1A is a partial detail view of Database 101 of FIG. 1, according to one embodiment of the present invention, illustrating Storage Spaces 1011 and 1012.
Figure 1B:
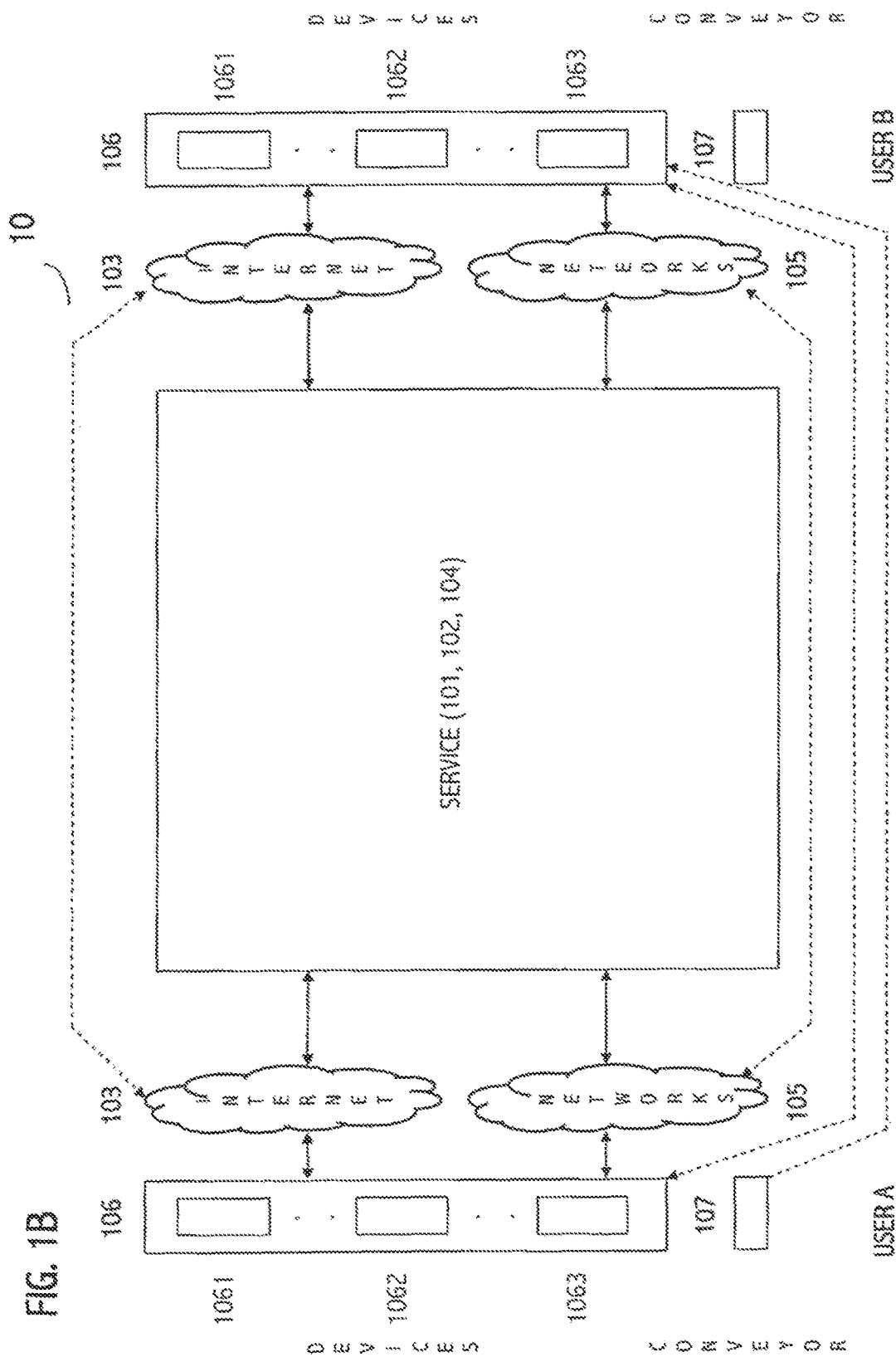
FIG. 1B is a block diagram illustrating the end-to-end architecture of the same embodiment as shown in FIG. 1, where elements 101, 102, and 104 of FIG. 1 are shown collectively as an internet-based service for the management of contact information ("the Service")

One embodiment, System 10, of a system for the management of contact information in accordance with the present invention is shown in FIGS. 1, 1A, and 1B. As illustrated and described herein, System 10 is directed toward the management of contact information. However, with minor modifications, System 10 (and other embodiments of the invention) could be used for the management of other types of information; in particular, other types of information for which automatic transfer, update, customization, storage, portability, and/or radial mining processes would be useful for the management thereof. Moreover, as illustrated and described herein, System 10 involves an internet-based service and interactions and/or communications via the internet and/or other public computing and/or communications networks. However, the present invention could also be embodied for use in private computing and/or communications networks (business, home, or other, wired and/or wireless, including wide-area, local-area, and other networks, and including virtual private networks and private networks that are accessible via the public networks), apart from or in conjunction with the public networks.

System Components

With reference to FIG. 1, System 10 includes Database 101. Database 101 may be a conventional database system (e.g., an enterprise database system by Oracle), having hardware and software for, among other things, receiving, storing, processing, generating, and outputting multiple types of information. Such hardware and software can be configured and/or programmed to, among other things, receive, store, process, generate, and/or output the multiple types of information described hereinafter, in the manner described hereinafter. The configuration and programming of Database 101 illustrated and described herein are for purposes of illustration, not limitation.

With reference to FIG. 1A, Database 101 includes, without limitation, Storage Space 1011 for storing, for each registered user of the system, the user's outgoing contact information. Database 101 also includes Storage Space 1012 for storing, for each registered user, the user's incoming contact information; collectively, the user's "Master Contact List" (or "MCL"). Storage Spaces 1011 and 1012 each include multiple discrete storage elements, each element for the storage of a discrete block of contact information. Each storage element has a unique address (or location) in the database, where each address has a corresponding address code. For example, as illustrated, Database 101 shows Storage Spaces 1011 and 1012 for two users, User A (at left) and User B (at right). The first storage element in User A's Storage Space 1011 has an address code of "00047700370001"—where the first ten digits identify User A (or User A's Storage Spaces), and the last four digits identify the first storage element within User A's Storage Spaces.

Database 101, Internet Interface 102 (discussed below), and Communications Gateway 104 (also discussed below), each shown in FIG. 1, are collectively referred to herein as "the Service," as shown in FIG. 1B.

Figure 2:
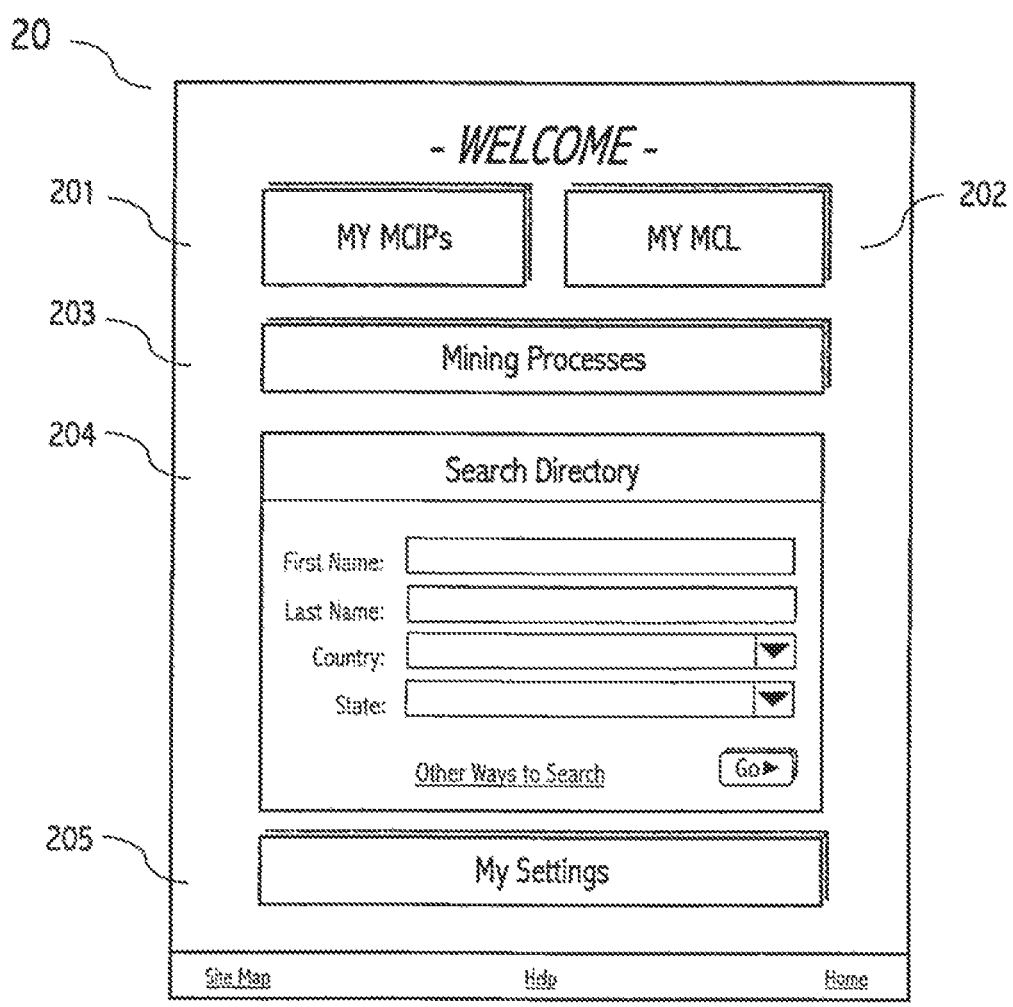
FIG. 2 illustrates a "Welcome" display screen serving as a user's interface with the Service via the internet, according to one embodiment of the present invention.

System 10 also includes Internet Interface 102 (sometimes hereinafter simply "Interface 102"), which, through well-known means, links Database 101 to the Internet 103, provides a graphic interface through which a user of the system may interact with Database 101 via the Internet 103, and receives information from and/or sends information to Database 101 and/or the user in accordance with the interactions between them. That is, through Interface 102 and via the Internet 103, a user may access the Service's "web site." With reference to FIG. 1B, a user may interact with the Service (through Interface 102) via the Internet 103 using any one of several devices (other system components, discussed below) that is internet-enabled and equipped with internet browser software, for example, a desktop computer; when doing so, Interface 102 provides a graphic interface, displayed on the desktop computer screen, through which the user may interact with Database 101. FIG. 2 shows an example of a "Welcome" Display Screen 20 (one of multiple "screens" in the graphic interface), which a registered user of the system may see after "logging in" to the Service. Display Screen 20 and other screens in the graphic interface enable the user to interact with Database 101 by, for example, "clicking on" and/or typing information into the appropriate blocks on the screen. By clicking on Block 201 (titled "MY MCIPs," explained below), the user reaches another screen or series of screens enabling him to manage his outgoing contact information, discussed below. Similarly, the user may click on Block 202 (titled "MY MCL," explained below) to manage his incoming contact information, Block 203 to manage automatic radial mining processes, Block 204 to search (and/or browse) the Service's "Directory" of contact information, or Block 205 to enter or change his "Settings"—all of which are also discussed below.

Interaction through Interface 102 is bi-directional; meaning, through Interface 102, information may flow from the user to Database 101 and/or from Database 101 to the user. Such information may be in the form of software; including, without limitation, software programs (e.g., application software) and/or software files (e.g., a "Contact Information Profile" [or "CIP"], discussed further below, which is a packet of information containing and/or representing contact information data, and which may be in the form of a software file). Through Interface 102, software may be uploaded from the user to the database and/or downloaded from the database to the user. A user's interaction with Database 101 may be active (i.e., where the user initiates the interaction, either the delivery or retrieval of information) or passive (i.e., where Database 101 or another Service component initiates the interaction, either the delivery or retrieval of information). As an example of a passive interaction, following a user's logging in to the Service, the Service may initiate retrieval from the user of certain software files for uploading to Database 101.

Through well-known means, Interface 102 may accommodate interactions through multiple types of internet-enabled devices, multiple types of internet browser software, and/or multiple means (and connection speeds) of access to the Internet 103 (e.g., dial-up, DSL, cable, wireless, etc., whether narrowband, broadband, or other). For example, if a user accesses the Service through Interface 102 via the Internet 103 using an internet-enabled mobile phone equipped with mobile browser software, and logs into the Service, Interface 102 may provide to such device a Welcome display screen different from that shown in FIG. 2 and better suited for interactions through a mobile phone.

Through well-known means, as represented in FIG. 1, users may interact and/or communicate directly with each other via the Internet 103 using multiple types of internet-enabled devices (some of which need not be equipped with internet browser software). For example, such interactions may involve one user's visiting the internet web site of another and such communications may be through internet communications services such as e-mail, instant messaging, pop-ups, internet telephony, file-sharing (through a centralized and/or peer-to-peer network), or other, and through such interactions/communications, users may transfer between them software; including, without limitation, software programs and/or software files (e.g., a CIP).

With reference still to FIG. 1, System 10 also includes Communications Gateway 104 (sometimes hereinafter simply "Gateway 104"), which (1) sends to users of the Service communications containing and/or in accordance with information received by it from Database 101, and/or (2) receives communications from users of the Service and delivers information contained in such communications to Database 101. Such communications may incorporate software; including, without limitation, software programs and/or software files (e.g., a CIP). Such communications may be sent via the Internet 103 and/or Other Public Communications Networks 105 (sometimes hereinafter simply "Networks 105"), by or for receipt by users using multiple types of devices. Networks 105 may include any data (including voice-and-data) communications network, or combination of networks, that enables point-to-point communications, whether wireline, wireless, a combination of both, or other.

Such communications via the Internet 103 may be through internet communications services such as e-mail, instant messaging, pop-ups, internet telephony, file-sharing, or other. For example, if such a communication is through e-mail, Gateway 104 may generate an e-mail message and incorporate a software file into the message by attaching it to the message and thus presenting it for downloading by the recipient of the message.

Such communications via Networks 105 may be through other communications services such as telephone service (fixed, wireless, or other), facsimile service, text messaging (i.e., "short messaging service" or "SMS"), paging, walkie-talkie service, or other. For example, if such a communication is through telephone service, Gateway 104 may initiate a call to a user's mobile phone; after a connection is established, either by the user's answering the call or by connection to the user's data-enabled "voicemail" service or answering machine, Gateway 104 may transmit a short automated (or recorded) voice message indicating that the Service is sending a software file and then upload the software file for transmission over such connection and thereby present it for downloading by the recipient of the call, either during the call, after the call, or upon retrieval of his data-enabled voicemail messages.

Through well-known means, as represented in FIG. 1, users may communicate directly with each other via Networks 105 using multiple types of devices. Such communications may be through communications services such as telephone service (fixed, wireless, or other), facsimile service, text messaging, paging, walkie-talkie service, or other, and through such communications, users may transfer between them software; including, without limitation, software programs and/or software files (e.g., a CIP).

It is to be understood that the public computing and/or communications networks may interconnect. That is, for example, a communication initiated on the Internet 103 through internet telephony may terminate on the public telephone network. For purposes of simplicity, FIGS. 1, 1B, and 6 do not illustrate such interconnection of networks; however, the present invention contemplates interactions and/or communications through such interconnection of networks.

In the preferred embodiment, the Service (collectively Database 101, Internet Interface 102, and Communications Gateway 104) is largely or wholly automated, however, the present invention does not preclude human involvement in the Service. For example, if a user of the Service wishes to obtain information from the Service's Directory and uses his mobile phone to make a telephone call to the Service via Networks 105 for that purpose, a live operator may be used to attend to the user's call, search the Directory per the user's request, and/or deliver the retrieved information to the user, performing, in that case, some or all of the functions of Gateway 104. Also, though Service elements 101, 102, and 104 are illustrated and described herein as discrete elements, those elements may, in certain embodiments of the invention, be physically, functionally, and/or otherwise intertwined.

With reference still to FIG. 1, System 10 also includes Computing And/Or Communications Devices 106 (sometimes hereinafter simply "Device(s) 106"). Devices 106 may include any device at which a user may wish to have, or provide others, access to his contact information (outgoing and/or incoming); including, without limitation, an enterprise computer system (with or without a centralized database, used, for example, by a business user to manage relationships with customers and/or partners), a home computer system (with or without a centralized database), a personal computer (desktop, laptop, notebook, handheld, or other), an "internet appliance" (or "set-top box"), an automated telephone system, a fixed-line telephone (including cordless), a mobile phone, a "smart phone," a facsimile machine, a pager, an "e-mail pager," a walkie-talkie, a personal digital assistant ("PDA"), a wrist-watch PDA, a portable music player, an automobile (or other) navigation device or system, a home or office network (including the "hub" and any next-generation networked device, such as a television or other home appliance), and others. An internet web site of a user is herein also considered a Device 106 of such user, through which, for example, such user may interact with others via the Internet 103, permitting the user to post software files for downloading by visitors to the web site and/or permitting visitors to the web site to upload software files through the web site for storage, for example, in the user's enterprise computer system.

As illustrated in FIGS. 1 and 1B, Devices 106 are divided into four categories. Category 1061 includes any Device 106 that is internet-enabled and equipped with internet browser software, such that it can be used to browse the internet and communicate through internet communications services via the Internet 103, such as e-mail; such as, for example, most desktop computers and some mobile phones and PDAs. Category 1062 includes any Device 106 that can be used to communicate through an internet communications service via the Internet 103, such as e-mail, but cannot otherwise be used to browse the internet; such as, for example, certain mobile phones, e-mail pagers, and PDAs. Category 1063 includes any Device 106 that can be used to communicate through a communications service via Networks 105; such as, for example, standard fixed-line telephones and mobile phones. Many devices in categories 1061 and 1062 can also be used to communicate through communications services via Networks 105; however, for purposes of simplification only, that fact is not represented in the accompanying drawings. Category 1064 (not shown in the figures) includes any Device 106 that is not internet-enabled and cannot be used to communicate through any communications service via either the Internet 103 or Networks 105; such as, for example, certain PDAs. A particular Device 106 may fall into more than one category. For example, a mobile phone that is internet-enabled and equipped with internet browser software falls into both Categories 1061 and 1063 (whereas, a mobile phone that is not internet-enabled falls into Category 1063 only).

Through well-known means, as represented in FIG. 1, some of Devices 106 may be used to transfer software, including, without limitation, software programs and/or software files (e.g., a CIP), from a device of one user to a device of another user, employing close-proximity data transmission technologies; including, for example, wireless technologies like infrared and Bluetooth.

Also through well-known means, though not represented in FIG. 1, some of Devices 106 may be used to transfer software, including, without limitation, software programs and/or software files (e.g., a CIP), (1) from a device of one user to a device of another user, via private computing and/or communications networks, and (2) from one device of a user to another device of the same user, either employing close-proximity data transmission technologies or via private computing and/or communications networks.

Each Device 106 for use in System 10 is equipped with some form of address book application software ("address book")—where "address book" is used broadly to include all forms of such software, from the most sophisticated (like customer relationship management ["CRM"] and partner relationship management ["PRM"] software in enterprise computer systems) to the most basic (like scaled-down programs enabling storage and/or processing of only limited amounts or types of contact information, e.g., telephone numbers only), in a variety of environments (including, e.g., an internet web site enabling the downloading and/or uploading of contact information). Microsoft's Outlook program, on most desktop computers today, is an example of an address book. That program, like others of its kind, includes features for the management of one's calendar, appointments, tasks, alerts, and reminders, which features are referred to herein as a "calendar," to some degree integrating such features with its address book. Many Devices 106 for use in System 10 are also equipped with some form of calendar, either included in or apart from the address book. For purposes of simplification only, as used herein, when referring to a Device 106 equipped with a calendar, the term address book includes the calendar. The Outlook program is sometimes also referred to as an "e-mail client," meaning it includes features for the management of one's e-mail communications, to some degree integrating such features with its address book. Many Devices 106 for use in System 10 are also equipped with some form of e-mail client (and/or analogous programs for the management of other types of communications, e.g., mobile phone calls), either included in or apart from the address book. For purposes of simplification only, as used herein, when referring to a Device 106 equipped with an e-mail client (and/or analogous program), the term address book includes the e-mail client (and/or analogous program).

In the preferred embodiment, one or more of a user's Devices 106 for use in System 10 is equipped with application software specialized for such use; however, such specialized application software may not be required to deliver the features of the present invention. Such specialized application software (hereinafter the "Software Module" or "Module") provides an interface between the address book on a particular Device 106 and the other components (including other Devices 106) of System 10—and may, in some cases, add to, modify, and/or disable certain features of the address book itself—in effect enhancing the address book for best-case integration of the device with System 10 as a whole. The Software Module may also provide an interface between the address book on a particular Device 106 and other non-address book application software on such device (e.g., Microsoft's Word or Internet Explorer)—and may, in some cases, add to, modify, and/or disable certain features of such other application software—in effect enhancing the integration of the address book with such other application software. In the preferred embodiment of the invention, where contact information data is contained in and/or represented by a CIP, the broad functions of the Software Module are (1) to enable or enhance the downloading of the CIP to the Device 106, (2) to enable or enhance the uploading of the CIP from the Device 106, (3) to enable or enhance the integration of the CIP with the address book on the Device 106, and/or (4) to enable or enhance the integration of the CIP with other application software on the Device 106. Specific functions of the Software Module are described or apparent in this Detailed Description of the Invention and/or in the accompanying Drawings. As each Device 106 may have one of a variety of different device specifications (e.g., each device is of a particular type, employs a particular processor, has a particular storage capacity, employs a particular operating system, employs a particular address book, etc.), the Software Module for one such Device 106 may be different from the Module for another such device.

The Software Module for a particular Device 106 may be downloaded from the Service to the device via the Internet 103 and/or Networks 105. For example, Database 101 may store multiple versions of the Software Module, each designed for use on Devices 106 of a particular device specification. At the time of his registering with the Service (discussed below)—via, for example, the Internet 103 through Interface 102, using any Device 106 in Category 1061—the user may be prompted to provide the Service with certain information concerning his device(s). When the user wishes to download the Software Module to the device in use, Database 101 delivers to Interface 102 for downloading by the user the version of the Software Module best-suited for use on such device.

The Software Module may be installed on Devices 106 in many other ways as well. For example, as a stand-alone software module, it may be distributed on compact discs or otherwise, either directly to the user or to another, for installation on a user's device(s) by the user himself, by a retail vendor of software and/or devices, by a manufacturer of devices (such that the Module is pre-installed on some or all next-generation devices), or by another. Moreover, the Software Module may be embedded in next-generation versions of other software (application software, operating system, or other)—for example, in an address book (like Outlook), in software for installation on devices for use with certain internet services (like AOL), and in CRM/PRM programs—and distributed for installation on a user's device(s) by whatever means such other software may be distributed, including by downloading via the Internet 103 and/or Networks 105. In certain cases—such as the installation of the Software Module on a complex enterprise computer system, the integration of the Module with the CRM/PRM or other programs running on such a system, or the incorporation of the Module into a web site—the installation, integration, and/or incorporation of the Software Module (whether stand-alone or embedded in other software) may require the services of professionals, such as information technology consultants.

The Software Module for use on a particular Device 106 may be programmed to expire (or be temporarily disabled) upon the occurrence of a pre-determined event (e.g., the reaching of a certain date). If, for example, some or all registered users of the Service are required to pay a monthly fee, the Software Module for use on a particular Device 106 may be programmed to expire upon the passage of a pre-determined amount of time (e.g., one month) if the Module is not refreshed within that amount of time by, for example, the user's engaging the Service. That is, each time the user engages the Service—by, for example, using a Device 106 in Category 1061 to access and log in to the Service via the Internet 103 through Interface 102—a timer within the Module used to count the passage of time is reset to zero. Where, as explained below, the Software Module on a user's Device 106 may have registered within it the user's User Identification Code 3011, preferably, in order to refresh such Module, the user must engage the Service through the account corresponding to such Code 3011. If, for example, the user has not paid his monthly fee, the Service may prevent his engaging the Service (by, e.g., temporarily or permanently disabling his ability to log in to the Service); consequently, the user is unable to refresh the Software Module on his device(s) and the Module(s) programmed to expire if not refreshed will expire after the passage of the pre-determined amount of time. The Service may also, or alternatively, send refresh (or reset) commands to a user's Device(s) 106 in Categories 1061, 1062, and/or 1063 through communications sent from Gateway 104 via the Internet 103 and/or Networks 105 on a periodic basis—for example, once a month following receipt of the user's monthly fee.

One or more of a user's Devices 106 for use in System 10 may be equipped with hardware specialized for such use. Such specialized hardware may include, for example, a push-button appearing on a mobile phone's main control panel dedicated for transfer of a user's outgoing CIP. That is, the user may transfer his outgoing CIP—for example, from his mobile phone to another user's mobile phone via a close-proximity data transmission technology, such as Bluetooth—by a single touch to the dedicated push-button. The Software Module on a particular device may also be used to render from non-specialized hardware the same or similar functionality as specialized hardware may provide.

With reference still to FIG. 1, System 10 also includes Conveyors 107. A Conveyor 107 may be any instrument (not in itself a Device 106) on which is present a CIP in machine-readable form or human-readable form, or both; and which, as represented in FIG. 1 (for purposes of simplicity, from User A to User B only), may be used to transfer a CIP from one user to another. (A CIP in machine-readable form or human-readable form, or both, may also be present on any Device 106). A Conveyor 107 may be, for example, a paper business card, a driver's license, an identification card, a passport, a credit card, a "smart card," a personal accessory (such as a key holder or wrist watch), or other instrument. A CIP in machine-readable form may be, for example, in the form of a bar code, a magnetic strip, a radio-frequency identification (RFID) tag, a transmitter for close-proximity data transmission technologies, or other form (where the form may or may not be apparent to human senses, including sight). A CIP in machine-readable form may also be, in whole or in part, in the form of visible characters (e.g., letters and numbers), which also are human-readable. One or more of a user's Devices 106 may be equipped with a "Reader" (not shown in the figures) for downloading to the device a CIP present in machine-readable form on a Conveyor 107 (or on another Device 106). Corresponding to the machine-readable form of the CIP, the Reader may be, for example, in the form of a bar code scanner, a magnetic strip reader, an RFID receiver, a receiver for close-proximity data transmission technologies, or other form. The Reader may be integrated within a particular Device 106 (e.g., a bar code scanner may be built into a mobile phone); or, the Reader may be stand-alone (e.g., a desktop RFID receiver) or integrated within another type of device (e.g., a magnetic strip reader may be built into an automated ticketing kiosk), where the stand-alone Reader or other type of device is connected to a particular Device 106 (e.g., the ticketing kiosk is connected to the ticket vendor's enterprise computer system). Any software required for downloading, through a Reader, to a Device 106 a CIP present in machine-readable form on a Conveyor 107, may be included in the Reader itself, in another type of device in which the Reader is integrated, and/or in the Device 106 (including in the Software Module, if any, on such device).

Other systems for the management of contact information in accordance with the present invention may not include all of the components of System 10 and may not involve all of the means for interactions and/or communications of System 10.

The Contact Information Profile (CIP)

Each user of System 10 may have one or more "Master CIP" ("MCIP"), each containing and/or representing all or some of the user's outgoing contact information data. The MCIP is in the form of a software file. In the preferred embodiment of System 10, the MCIP contains and represents the subject contact information data, as shown in FIG. 3; and, each of the MCIPs of a registered user of the Service is stored in one of the storage elements in such user's Storage Space 1011 in Database 101, as shown in FIG. 1B.

Figure 3:
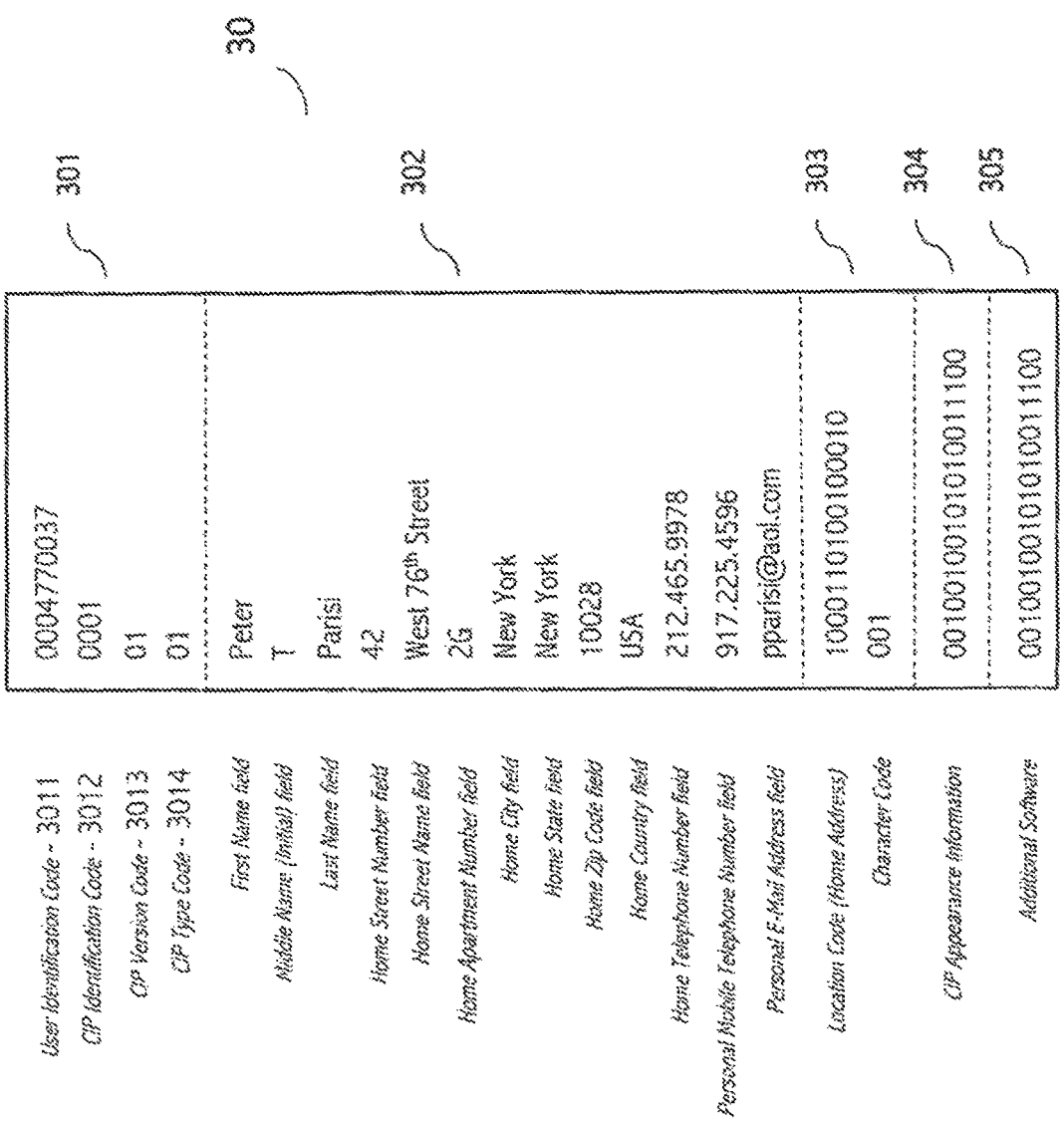
FIG. 3 illustrates the contents of a sample "Contact Information Profile" (described below), according to one embodiment of the present invention.

Referring to FIG. 3, sample MCIP 30 includes Information Block 301 ("Block 301"), which contains User Identification Code 3011 (or "Code 3011"), CIP Identification Code 3012 (or "Code 3012"), CIP Version Code 3013 (or "Code 3013"), and CIP Type Code 3014 (or "Code 3014"). User Identification Code 3011 is a code (e.g., a string of numerals) identifying the user of System 10 to whom MCIP 30 corresponds. Each user has a unique User Identification Code; whereas each of a user's outgoing MCIPs has the same User Identification Code. A User Identification Code may include within it a sub-code indicating the type of user to whom an MCIP corresponds, where, for example, a User Identification Code beginning with "0" indicates an individual user and a User Identification Code beginning with "1" indicates a business user. A CIP Identification Code is a code assigned to each of a user's MCIPs, serving to distinguish each of such MCIPs from the others. As shown in FIG. 3, MCIP 30 has a Code 3012 of "0001"; if the user to which MCIP 30 corresponds has multiple MCIPs, then his other MCIPs may have CIP Identification Codes of "0002," "0003," and so on. As illustrated for MCIP 30, Code 3011 (i.e., "0004770037") and Code 3012 (i.e., "0001") together make up the address code (i.e., "00047700370001") of the first storage element in User A's Storage Space 1011 in Database 101, as shown in FIG. 1B, in which MCIP 30 is stored. Therefore, Codes 3011 and 3012 serve to, among other things, identify the location within Database 101 where MCIP 30 can be found.

Referring still to FIG. 3, a CIP Version Code is a code assigned to each of a user's MCIPs, serving to identify the version of the MCIP. As shown, MCIP 30 has a Code 3013 of "01," meaning none of its contents has been modified since its creation. If, for example, the user to whom MCIP 30 corresponds modifies its contents by adding a home fax number to the contact information data contained in it (in Information Block 302, discussed below), then MCIP 30 will be assigned a CIP Version Code of "02."

Referring still to FIG. 3, CIP Type Code 3014 is a code serving to identify the type (or types) of contact information data contained in (and represented by) MCIP 30. Types of contact information data can be defined and categorized in limitless ways. For purposes of illustration herein, it is assumed that there are broadly two types of users of System 10, "individuals" (including certain groups of individuals, like families) and "businesses" (including not-for-profit organizations, government entities, and the like). It is further assumed that individual users (including individuals working at businesses) divide matters broadly into two categories, "personal" and "professional"; while all matters of a business user are "professional." Finally, it is assumed, therefore, that individual users regard each segment of their contact information (outgoing and/or incoming) as either of a personal nature, professional nature, or both, and wish to manage their contact information accordingly. That is, for example, an individual may wish to send his personal contact information (e.g., his home address and telephone number) to personal friends and family, but not to persons he deals with in his professional capacity (e.g., business clients and colleagues). For another example, an individual may wish to send both his personal contact information and professional contact information (e.g., his office address and telephone number) to his family and close friends, as well as to certain business colleagues who frequently need to reach him at home.

Therefore, as illustrated herein, each MCIP may have one of five CIP Type Codes; "01" (as shown for MCIP 30, for personal contact information data), "02" (for professional contact information data), "03" (for both personal and professional contact information data), "04" (for special-purpose contact information data), or "05" (for classified advertisement contact information data). A special-purpose MCIP, having a CIP Type Code of "04," contains and represents contact information data for a large variety of special situations, whether of a personal nature, professional nature, or both. For example, if an individual user is planning a business trip, he may wish to send his temporary contact information (e.g., the name, address, and telephone number of the hotel at which he will be staying) to his family and business colleagues, and, therefore, create a special-purpose MCIP for that purpose. For another example, if a business user (e.g., a law firm) is planning a luncheon conference for its clients, it may wish to send to the invitees the contact information (e.g., name, address, and telephone number) of the restaurant at which the event will be held, and, therefore, create a special-purpose MCIP for that purpose. A classified MCIP, having a CIP Type Code of "05," contains and represents contact information data relating to a variety of possible classified advertisements, whether of a personal nature, professional nature, or both.

Though, as illustrated herein, there are five types of MCIPs (having CIP Type Code "01," "02," "03," "04," or "05"), each user may have more than or fewer than five MCIPs. That is, for example, each user may have multiple personal MCIPs, multiple professional MCIPs, and so on. For example, an individual user may have a first personal MCIP (having CIP Identification Code "0001" and CIP Type Code "01") containing basic personal contact information data (e.g., his principal home address and telephone number) that he wishes to share with the majority of his personal friends, as well as his bank, credit card companies, and other companies with whom he does personal business; and a second personal MCIP (having CIP Identification Code "0002" and CIP Type Code "01") containing his basic personal contact information data as well as additional personal contact information data (e.g., his mobile phone number and the telephone number at his summer home), that he wishes to share with only his family and closest personal friends. For another example, a business user (e.g., a cable television provider) may have a first professional MCIP (having CIP Identification Code "0001" and CIP Type Code "02") containing contact information data (e.g., the telephone number of its sales department) that it wishes to share with prospective customers; and a second professional MCIP (having CIP Identification Code "0002" and CIP Type Code "02") containing contact information data (e.g., the addresses and telephone numbers of its technical support and billing departments) that it wishes to share with current customers.

Referring still to FIG. 3, MCIP 30 includes Information Block 302 ("Block 302"), which contains contact information data. As MCIP 30 is a personal MCIP (as shown, having CIP Type Code "01"), it contains personal contact information data. Block 302 is divided into multiple fields (e.g., numbered "1" through "n"), each to contain a discrete segment of contact information data; for example, first name, middle name, and so on. The manner in which data is divided into fields is for illustrative purposes only. As shown, Block 302 contains data in thirteen fields (and only the fields containing data are shown); however, it may contain less, more, and/or different data. For example, Block 302 may also contain the user's nickname, his home fax number, his instant messaging address, his internet protocol address, the URL of his web site, the address and telephone number of his summer home, his spouse's name and birthday, notes (indicating, for example, that from Thursday evening to Sunday evening during the months of July and August he can be reached at his summer home, rather than at his principal residence), and so on. Block 302 may also contain, for some or all of the fields containing data, and for each such field, a code (not shown) corresponding to the data in the field ("data-corresponding code"). That is, for example, the data-corresponding code "001" may be assigned to a country field containing "USA."

Referring still to FIG. 3, MCIP 30 includes Information Block 303 ("Block 303"), which contains information related to the contact information data in Block 302. Such related information may include, for example, expiration dates, effective dates, calendar entries, business categories (subcategories), businesses' hours of operation, "location codes," and "character codes." As shown, MCIP 30 contains only a location code and a character code. Such related information is best described through the use of examples. Assume an individual user is hosting a birthday party for her husband Bob at a catering hall on September 4, starting at 8:00 pm. For purposes of (among other things) informing the guests of the catering hall's address, the user creates a special-purpose MCIP. In Block 302 the user includes the contact information data of the catering hall (for these purposes, the user's outgoing contact information data). In Block 303 she includes an expiration date ("September 5"), a calendar entry including date ("September 4"), time ("8:00 pm"), and text ("Bob's Birthday Party at the Northport Catering Hall"), and an entry for an alert/reminder including the time of the reminder ("one week before calendar entry") and the text of the reminder ("Bob's Birthday Party next Saturday"). For another example, assume an individual user creates a personal MCIP to share only with her parents, siblings, and closest friends. She may include in Block 303 multiple recurring alert/reminder entries, one for each of her children's birthdays. Each entry includes the date (e.g., "March 18") of one of the birthdays and associated text (e.g., "Bobby's Birthday"). For another example, assume an individual user is planning a ten-day business trip in three European cities. She creates a special-purpose MCIP to share with her husband, her children at college, and her office assistant. She may include in Block 302 the contact information data for the three hotels at which she will be staying. In Block 303 she includes different effective dates for the contact information data of each of the three hotels; for example, she enters the period "March 3 through March 8" for the contact information data in "field 1 through field 4" (that of the hotel in London). For another example, in creating a professional MCIP, a florist (a business user) enters his store's address in Block 302 and, in Block 303, selects the "florist" business category, enters his hours of operation, and authorizes the entry of a location code corresponding to his store's address. The location code (represented in the figure by a string of "1s" and "0s"), generated by the Service from information in a database (e.g., Database 101), may be in any form sufficient to identify the precise location of the listed address, in a manner the same as or similar to the manner in which a precise location may be determined using the Global Positioning System ("GPS"); for example, it may be a string of numerals identifying the longitude/latitude coordinates of the address's location on a grid of the earth. An MCIP may contain a location code for each address listed in Block 302, where each address occupies a designated range of fields. For a final example, an MCIP may contain in Block 303 a character code, where, for example, code "010" indicates that the contact information data in Block 302 is in the Arabic alphabet. Block 303 may also contain data-corresponding codes; for example, a data-corresponding code "316" may be assigned to a business category field containing "florist."

Referring still to FIG. 3, MCIP 30 includes Information Block 304 ("Block 304"), which contains software (represented in the figure by a string of "1s" and "0s") defining the appearance of the MCIP. That is, an MCIP (and, in some cases, a CIP derived from an MCIP, as explained below) may, in certain environments (e.g., when one's outgoing CIP is downloaded to one's desktop computer screen), appear to a user in the form of a still image, hiding some or all of its contents, in much the same way as visual representations of common software files appear on one's desktop computer screen. In certain environments, a user may, as he does with such common software files, operate upon an MCIP (or CIP) by, for example, "clicking," "right-clicking," or "dragging and dropping" its appearance. A user may view the contact information data (and certain other information) contained in a CIP by, for example, in the case of a CIP stored on a desktop computer screen, right-clicking on the appearance of the CIP and selecting the "view" command, where the contact information data is compiled from the multiple completed fields and presented for viewing in a standard readable format. In other embodiments, the appearance of a CIP may include moving images or sound (e.g., a recorded greeting or music).

Figure 4:
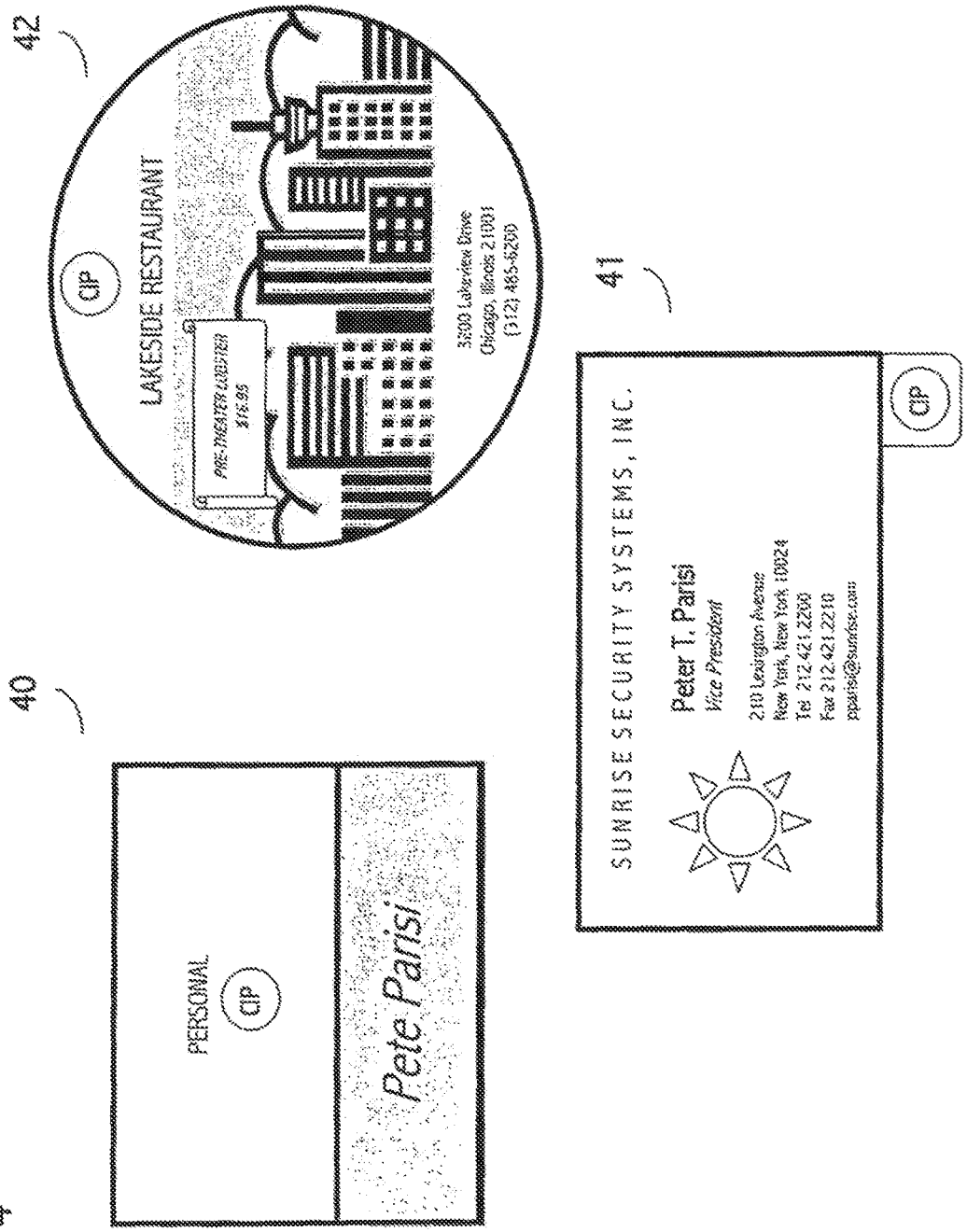
FIG. 4 illustrates possible appearances of a sample Contact Information Profile, according to one embodiment of the present invention.

The variety of possible appearances of the MCIP (or CIP) is limitless. The Service may set the design parameters and provide the design tools, and otherwise permit each user to custom design the appearance of his outgoing MCIPs. The design tools may include, for example, the ability of a user to include a photograph of himself in the appearance of his outgoing MCIPs. Three examples of MCIP appearances are shown in FIG. 4. MCIP 40 (the appearance of MCIP 30 in FIG. 3) displays the word "personal" (to indicate that it is a personal MCIP) and the user's nickname, but not his complete contact information. As shown, MCIP 40 (and the others in the figure) displays the "Service Provider's" trademark (here shown as the letters "CIP" within a circle), to inform would-be recipients of the CIP of its nature and source. MCIP 41 is the same user's professional MCIP, in the shape of a paper business card. It displays the user's complete professional contact information and his company's name and logo. The "CIP" trademark appears only as a tab to the card, so as not to interfere with its principal design. Also shown in FIG. 4 is MCIP 42, created by a business user (a restaurant). MCIP 42 displays the restaurant's name, the restaurant's complete contact information, a photograph of the view from the restaurant, and a banner advertisement, all designed by the user.

Referring again to FIG. 3, MCIP 30 includes Information Block 305 ("Block 305"), which may contain additional software (also represented in the figure by a string of "1s" and "0s") for communicating with the Software Module, other application software (including address book), and/or operating system on a Device 106, where the broad functions of such software are similar to the broad functions of the Software Module described above. For example, Block 305 may contain one or more "toggle instructions" concerning the manner in which MCIP 30 (or a derived CIP) is to be downloaded to a Device 106; for example, as explained below, a toggle instruction may instruct the device whether to treat the CIP as an outgoing CIP or incoming CIP. A toggle instruction, if enabled during downloading, is disabled following downloading in accordance with the enabled instruction, such that, for example, if the CIP is later transferred to another Device 106, the instruction is disabled during downloading to such other device. For another example, Block 305 may include information concerning the manner in which a user may operate upon MCIP 30 (or a derived CIP) while it is stored on a Device 106. That is, for example, the information in Block 305 may concern the ability of the user to right-click on the appearance of MCIP 30 on his desktop computer screen to reveal a menu of operations common to CIPs, such as "View." For another example, Block 305 may include one or more messages to users; for example, a "help" message to assist recipients of CIPs who are unfamiliar with the CIP and/or the Service.

A CIP in the form of a software file derived from an MCIP is a copy of the MCIP (either an exact copy or a copy scaled-down in contents and/or converted in form) present anywhere other than in Storage Space 1011 in Database 101 (where MCIPs are stored)—for example, stored in Storage Space 1012 in Database 101, stored on a Device 106, or in transit (e.g., incorporated in a communication via Networks 105)—where such copying (and scaling-down and/or conversion, if any) may be performed, for example, at the Service or at a Device 106 (e.g., during uploading or downloading). A CIP in machine-readable and/or human-readable form derived from an MCIP is discussed below. Herein, in discussing the elements of such derived CIPs, reference is sometimes made to FIG. 3 (as, for example, a CIP in the form of a software file derived from MCIP 30 and containing a User Identification Code contains the same User Identification Code as Code 3011 in MCIP 30).

With reference to FIG. 5, Business Card 50 (or "Card 50") is a sample of a Conveyor 107 (shown in FIG. 1), on which is present a CIP in sample machine-readable form derived from sample MCIP 41 (shown in FIG. 4). Card 50 displays on its front side in human-readable form, among other things, the contact information data contained in Block 302 (not shown) of MCIP 41 (where, if such data in such form is not also machine-readable by a Reader, such data in such form is not part of the CIP). Card 50 displays on its back side, in bar code form, the CIP derived from MCIP 41. The CIP in bar code form may be displayed on the front side of Card 50 or otherwise than as shown in FIG. 5. The bar code is illustrated in FIG. 5 as a sample one-dimensional bar code, though other types of bar codes (e.g., two-dimensional bar codes) may also be used. The symbology of the bar code may be either one of the several standards currently employed in government and industry or one customized for use in System 10; where the selection of the symbology may depend on a number of factors, such as, for example, the amount and/or type of information to be included in the bar code, the desired bar code density, and the cost of printing the bar code. In the preferred embodiment, the CIP in bar code form contains at least Code 3011 (e.g., "0004770037") and Code 3012 (e.g., "0003") of MCIP 41 (where such numeric codes may be translated, for example, into alpha-numeric codes to accommodate the symbology used). The bar code may include other information that may be necessary for the reading of the bar code (e.g., if employing certain of the standard symbologies, a code identifying the Service Provider). The CIP in bar code form may also contain some or all of the other information (or translations of the other information) contained in MCIP 41 in Blocks 301, 302 (i.e., the contact information data), 303, 304, and/or 305.

In the preferred embodiment, Codes 3011 and 3012 in an MCIP (or CIP) are not viewable by, or otherwise made known to, a user; meaning, for example, that a user cannot "view" such codes contained in a CIP in the form of a software file. In other embodiments, such codes may be viewable by, or otherwise made known to, a user. For example, such codes may be displayed in human-readable form on Card 50, either in addition to or instead of the bar code (where such codes in such form, whether or not they are also machine-readable by a Reader, are a CIP). For another example, the Service may communicate (e.g., verbally or in writing) such codes in human-readable form to a user—the user to whom the MCIP corresponds and/or another user—and one user may then communicate such codes in human-readable form to another user (where such codes in such form are a CIP). In such other embodiments, the Software Module on a Device 106 may enable a user to download a CIP to such device by manually inputting such codes.

The Service

With reference to FIGS. 1, 1A, and 1B, in System 10, a user may register with the Service by, for example, accessing the Service's web site via the Internet 103 through Interface 102, using any Device 106 in Category 1061 (e.g., his desktop computer). Interface 102 presents to the user a screen (or series of screens) prompting the user to enter "Registration Information." Following the prompts, the user enters, among other things, his chosen "User Name" and "Password," and, if required, his payment information (e.g., his credit card information). Once such information is entered and accepted, the user is a registered user (or "Member") of the Service, having an account with the Service. The Service assigns to the new Member a User Identification Code 301 and corresponding Storage Spaces 1011 and 1012 in Database 101; and registers the correspondence between the Member's User Identification Code 301 and his chosen User Name/Password. At this or another time, the Member may enter additional Registration Information concerning group access to the account. That is, for example, assuming the user is a distributor of medical devices (a business user), the user may define the original Password as that of the account administrator (i.e., the person or persons permitted full access to the account). Under the same User Name, the administrator may enter other passwords permitting limited access to the account, as defined by the administrator for each other password using tools provided by the Service. The administrator may disclose the User Name and one of the other passwords to each member of its sales staff, where, for example, logging in with one such password permits one member of the staff to view all incoming CIPs in the Master Contact List that are categorized (by the administrator) in a folder called "Current and Prospective Customers in Southwest Region," but does not permit that member to view other incoming CIPs in the Master Contact List or otherwise have access to the account. The administrator may deactivate any such other password at any time.

Interface 102 may then present to the new Member Display Screen 20, shown in FIG. 2, with a special instruction to click on the "My Settings" Block 205 to enter his other "Settings." At this point, the Member is said to be "engaging" the Service. Each time a Member wishes to engage the Service, through the Service's web site or otherwise, he is required to log in to the Service (i.e., enter his User Name and Password)—though, using technology that is common today, the Service may, at the Member's request, "remember" the Member's User Name and/or Password so as to streamline the log-in procedure. Clicking on Block 205 of Display Screen 20, the user is presented with another screen (or series of screens) through which he may enter his other Settings, which may include his "Device Information" and "General Preferences."

Device Information includes information about the Device(s) 106 a user registers for his account with the Service (sometimes hereinafter "registered Device(s) 106"). A user may use the Service using a Device 106 other than one of his registered Devices 106; for example, he may use a friend's laptop computer to engage the Service through Interface 102 via the Internet 103 to manage his Master Contact List. Registered Devices 106 may include, for example, for a business user's account, a device of an employee of the user, which same device may also be a registered Device 106 for the employee's (individual user) account with the Service. Device Information may include, for each registered Device 106, information sufficient to identify the type of device (e.g., "desktop computer"). The Service may assign a distinct number (or other identifier) to each of a user's registered Devices 106 (e.g., "Device 1"). Device Information may also include, for example, for each registered Device 106, the make/model of the device, the make/version of the operating system on the device, and the makeiversion of the address book on the device. The Service may provide, as it prompts the user for such information, a series of "pull-down bars" displaying for the user possible responses to the prompts and instructions for finding the requested information—where some such information may be derived by the Service from other information entered by the user.

A user's General Preferences define whether and/or how the user wishes to enjoy (or otherwise participate in) each of the variety of features offered by the Service. Again, the Service prompts the user through the process of entering his General Preferences. A user's General Preferences may include the means by which the Service may communicate, through Gateway 104 via the Internet 103 and/or Networks 105, with each of the user's registered Devices 106. That is, for example, a user may indicate that the Service may communicate with his desktop computer by e-mail at the e-mail address he specifies. The Service may enable a user to enter more than one means for such communication for each of his Devices 106; for example, for his mobile phone in Category 1061, a user may enter both his mobile phone number and an e-mail address. The same means for communication may be entered for more than one of the user's Devices 106; for example, a user may enter an e-mail address as a means for such communication for both his desktop computer and his mobile phone, where the user can access the e-mails sent to such address using both of those devices. Where a single device (e.g., an individual's desktop computer) is a registered Device 106 for more than one user (e.g., for a business user, where the individual is an employee of the business, and for the individual's own account as an individual user), the same means for communication with such device (e.g., by e-mail at the individual's professional e-mail address) may be entered for both such users.

A user's General Preferences may also include, without limitation, the following: Concerning "automatic transfer" processes (discussed in detail below), which may involve one user's retrieval of another user's outgoing CIP(s) from the Service's Directory, a user may define whether or not all of his outgoing personal, professional, personal-professional, special-purpose, and/or classified CIPs are to be compiled in the Service's Directory for retrieval by other users. Concerning "automatic update," "automatic customization," and "automatic delivery" processes (all discussed in detail below), which may involve the Service's initial sending of an updated/special-purpose/other CIP to a user, the user may choose the manner in which the Service sends such initial updated/special-purpose/other CIPs (e.g., by e-mail, with personal CIPs and special-purpose CIPs going to his personal e-mail address and professional CIPs going to his professional e-mail address), where the Service may enable a user to choose to have the Service initially send updated/special-purpose/other CIPs to one or more than one of his Devices 106 and/or via one or more than one form of communication. Concerning "automatic storage" processes (discussed in detail below), which may involve the Service's storage of a user's incoming CIPs in the user's Master Contact List, the user may opt out of such storage for any type (or all types) of incoming CIPs. Concerning "automatic portability" processes (discussed in detail below), which may involve the Service's distribution of a user's incoming CIPs to a user's multiple Devices 106, the user may, for example, opt out of such distribution for any type (or all types) of incoming CIPs, for one or more of his Devices 106, and/or under certain circumstances, and, with respect to each type of incoming CIP, each device, and/or each circumstance for which he has not opted out of distribution, define the manner in which the Service distributes such incoming CIPs to each of such devices (e.g., for personal incoming CIPs, only in batches of ten or more by a single e-mail with the subject line "Distributed Personal CIPs," which he can access [multiple times] from each of his devices, but can choose not to from the mobile phone he uses exclusively for work). For another example, the user may set preferences indicating that he wishes the Service to distribute incoming CIPs by multiple e-mail messages (addressed to one or multiple e-mail addresses), each directed to one of the user's devices and each having a distinct subject line (e.g., "Distributed CIPs for Your Desktop Computer"). Concerning "automatic radial mining" processes (discussed in detail below), which may involve the Service's mining of information contained in the CIPs stored in a user's Storage Spaces 1011 and/or 1012 in Database 101, in behalf of (at least partially) another user, the first user may, for example, define whether such mining is permitted or not for each of such processes.

Figure 6:
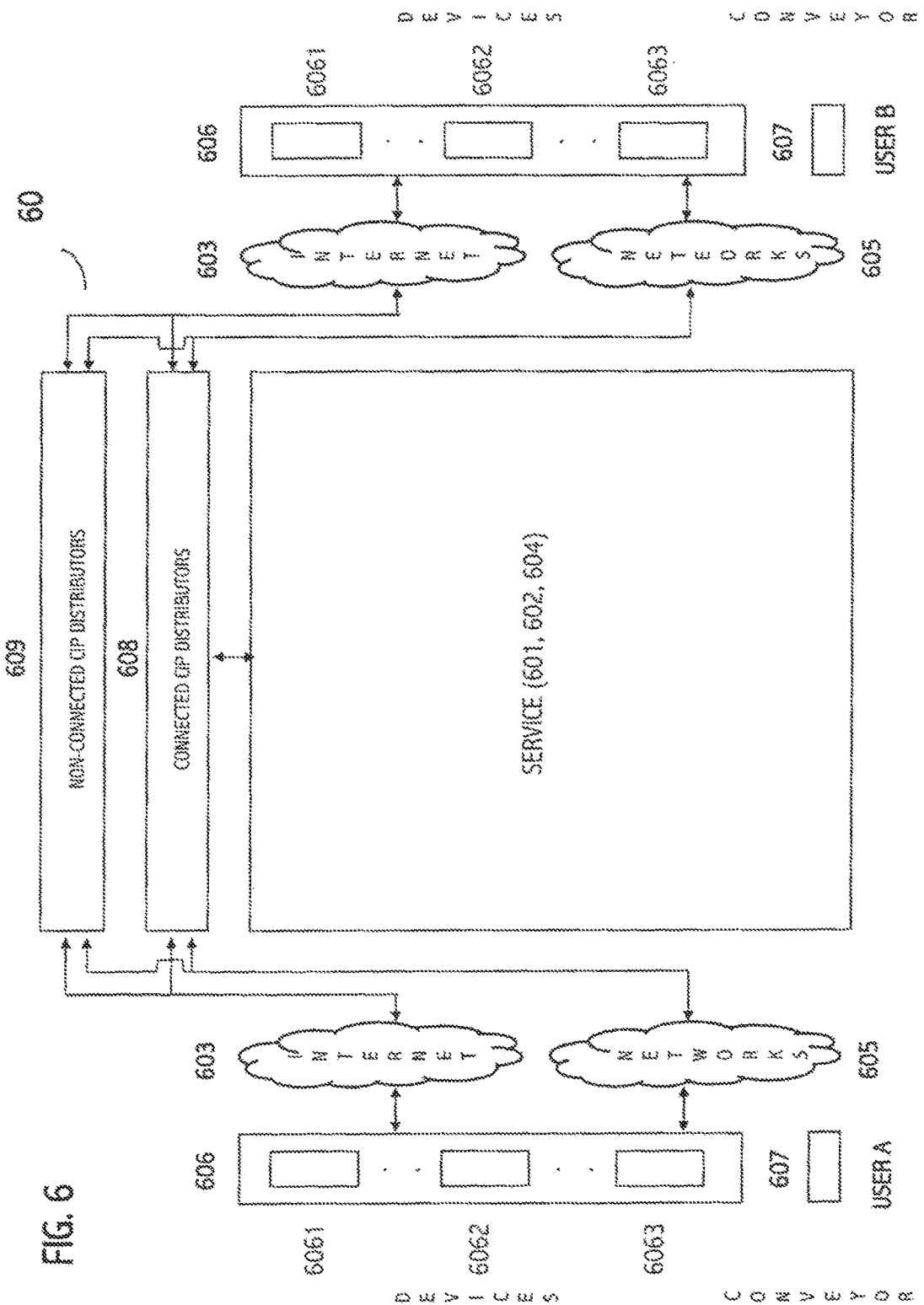
FIG. 6 is a block diagram illustrating the end-to-end architecture of another embodiment of a system for the management of contact information according to the present invention (where, as in FIG. 1B, elements 601, 602, and 604 of FIG. 1 are shown collectively as the Service, and where, arrows illustrating the means by which User A may interact and/or communicate with User B and the means by which each of such users may interact and/or communicate with the Service, as shown in FIGS. 1 and 1B, are not shown)

A user's General Preferences may also define whether and/or how a user wishes the Service to distribute his outgoing and/or incoming CIPs to other users, including Connected CIP Distributors 608 (or "Distributors 608"), shown in FIG. 6. FIG. 6 illustrates System 60, another embodiment of a system for the management of contact information according to the present invention, where components 601-607 correspond to components 101-107 of System 10 shown in FIGS. 1-1B and where, as in FIG. 1B, elements 601, 602, and 604 of FIG. 6 are shown collectively as the Service. Referring to FIG. 6, the Service may have a "connection" with one or more Distributors 608 through which it may distribute a user's outgoing and/or incoming CIPs to such distributors. Distributors 608, which are internet-based or other services (other than the Service), may then further distribute such CIPs on and/or in behalf of the user. Distributors 608 may include, without limitation, internet service providers ("ISPs") and/or internet portals (e.g., AOL); telecommunications service providers; internet and/or telephone directory services (e.g., Infospace, Sprint PCS's "411" service); internet search services (e.g., Google); postal services (e.g., the applicable local office of the United States Postal Service); national and/or state "do-not-call" and/or "do-not-e-mail" registries; retail vendors of software and/or devices; printing services (e.g., those that may print a user's Card 50 as shown in FIG. 5); newspaper, magazine, and other print publishers (e.g., those that may print a business user's CIP in machine-readable form, such as that shown in FIG. 5, as part of a printed advertisement); and many others.

Considering the example of the ISP/portal, such service typically provides for each user of that service an on-line address book (often including an on-line calendar and e-mail client). For the benefit of its Members, the Service may distribute a Member's outgoing and/or incoming CIPs to an ISP/portal of which the Member is also a user. In the case of a Member's outgoing MCIPs, for example, following the Member's creation of an MCIP at the Service, the Service may distribute a derived outgoing CIP to such ISP/portal such that it is readily available to the Member when he is engaging that other service. In the case of a Member's incoming CIPs, for example, the Service may distribute such CIPs to such ISP/portal such that the CIPs (and/or the information contained in them) are stored in the Member's on-line address book at such other service.

Consider now the example of the telecommunications service provider. In the case of a Member's (particularly a business user's) outgoing MCIPs, such Member may authorize the Service to distribute a derived outgoing CIP to such provider, for further distribution to its subscribers, under certain circumstances (including, as defined by such Member in his General and/or Specific Preferences). For example, a provider of mobile phone service may deliver to the Service (e.g., via its connection with the Service) information (e.g., location codes) concerning the current locations of its subscribers. If the current location code of one of such subscribers represents a location within a designated distance (e.g., 5 miles) from the location represented by the location code in such Member's (e.g., a 24-hour diner off a remote stretch of highway) outgoing CIP, the Service may distribute such CIP to such provider via its connection with such provider, for further distribution (e.g., via a mobile phone call) to such subscriber. Preferably, where such subscriber is also a Member of the Service, the provider delivers to the Service, together with his current location codes, information sufficient to identify such Member (e.g., one of such Member's outgoing CIPs or such Member's Code 3011). The Service may enable a user to set General and/or Specific Preferences as a would-be recipient of other users' outgoing CIPs in this manner; thus, in the example above and using such subscriber/Member's Code 3011 to retrieve and review his preferences, the Service may distribute or not such CIP to such provider, in accordance with such preferences.

Consider now the example of the internet/telephone directory service. Again in the case of a Member's outgoing MCIPs, for example, following the Member's creation of an MCIP at the Service, the Service may distribute a derived outgoing CIP to such directory service either at that time for its listing in such service's database (and/or its printing, in a format similar to that shown in FIG. 5, in such service's paper directory, e.g., the Yellow Book) or at a later time in response to a specific search request entered at the other service and forwarded to the Service (also via the connection), where such service may enable searching analogous to that described below in connection with Transfer Types 5 and/or 6. In the case of a Member's incoming CIPs, for example, the Service may distribute such CIPs to such directory service such that the Member (and only the Member) may access the CIPs in his Master Contact List through such other service in much the same way that he may access his Master Contact List through the Service.

Consider finally the example of the internet search service. In the case of a Member's outgoing MCIPs, for example, following the Member's creation of an MCIP at the Service, the Service may distribute a derived outgoing CIP to such search service, in a manner similar to that described above for the directory service, for inclusion of the CIPs in such service's index of searchable information, where such service may enable searching analogous to that described below in connection with Transfer Types 5 and/or 6.

The connection between the Service and each of Distributors 608 may be by any means for securely exchanging between them information like that described above, including via the Internet 103, Networks 105, private computing and/or communications networks, and/or other such means (including, for example, in the case of the Service's simply sharing information contained in Database 101, the periodic manual transfer of computer discs storing such information). And, as illustrated above, the exchange of information between the Service and each of Distributors 608 may be pursuant to any of a variety of possible protocols; including, for example, the Service's "push" of select information to Distributor 608 and/or Distributor 608's "pull," where permitted, of select information from the Service. As shown in FIG. 6, other users may interact and/or communicate directly with Distributors 608 via the Internet 103 and/or Networks 105 (or otherwise, as, for example, in the case of a Distributor 608 printing CIPs in a paper directory). Through such interactions/communications, a user may "obtain" CIPs distributed by Distributors 608. Also through such interactions/communications, a user may himself "post" CIPs for distribution by Distributors 608 (without the Service's distribution of such CIPs to such distributors). For example, a user may visit the web site of an internet directory service and upload from his device in use an outgoing MCIP for inclusion in the service's directory; similarly, a user may upload the incoming CIPs on his device in use to his on-line address book at an ISP/portal.

Referring still to FIG. 6, System 60 may also include one or more Non-Connected CIP Distributors 609 (or "Distributors 609"), also users of the system, which are internet-based or other services (other than the Service) that have no such "connection" with the Service but may nevertheless distribute a user's outgoing and/or incoming CIPs on and/or in behalf of the user. Distributors 609 may likewise include, without limitation, ISPs/portals; telecommunications service providers; internet and/or telephone directory services; internet search services; postal services; national and/or state "do-not-call" and/or "do-not-e-mail" registries; and many others. Other users may likewise interact and/or communicate directly with Distributors 609 via the Internet 103 and/or Networks 105 (or otherwise). Thus, a user may likewise "obtain" CIPs distributed by Distributors 609 and/or himself "post" CIPs for distribution by Distributors 609. For example, a restaurant (a business user) may post its outgoing CIP at the web site of the "Zagat" restaurant guide (in this example, a Distributor 609), where a visitor to the web site may read a review of the restaurant and, if interested, download its outgoing CIP to his device in use.

Concerning again a user's General Preferences, the Service may prompt a user through the process of entering his General Preferences with respect to Distributors 608, by, for example, identifying each such distributor, describing the nature of distribution to/by each, and inquiring whether and/or how the user wishes to have such distribution. In certain cases, it may be required that the user have a member relationship with a particular Distributor 608 in order to have distribution to/by such distributor; and, in such cases, the Service may prompt the user for information necessary to establish that such a relationship exists. For example, if the user wishes to have such distribution through an ISP/portal such as AOL, then he must establish that he is an AOL subscriber by entering his AOL user name, his AOL password, and/or other information.

Other examples of General Preferences are described or apparent elsewhere herein. Each user's General Preferences and other Settings are stored in Database 101. A user may at any time change them by engaging the Service and, for example, clicking on the "My Settings" Block 205 of Display Screen 20, shown in FIG. 2.

A user may also set "Specific Preferences," which are preferences specific to a particular CIP, outgoing and/or incoming. Where a Specific Preference conflicts with a General Preference, the Specific Preference overrides the General Preference and is the prevailing preference. A user may set Specific Preferences for each of his outgoing MCIPs in his Storage Space 1011 in Database 101, either upon a particular MCIP's creation or at any time thereafter by, for example, clicking on the "My MCIPs" Block 201 of Display Screen 20 shown in FIG. 2, which reveals another screen (or screens) for managing one's outgoing MCIPs. For each of his outgoing MCIPs, a user may set Specific Preferences defining, for example, whether and/or how it is to be distributed to/by each of Distributors 608, whether it is to be compiled in the Service's Directory for searching by others, and whether it may be mined by the Service for each automatic radial mining process involving mining of outgoing MCIPs—each case an opportunity to override a General Preference or an earlier-set Specific Preference. If, for example, a user sets for a particular outgoing MCIP a Specific Preference overriding a preference (either a General Preference or an earlier-set Specific Preference) that it be distributed to a particular Distributor 608, and the MCIP was previously distributed as per his now-overridden preference, then the Service may, through its connection with such distributor or otherwise, cease such distribution to/by such distributor on a going-forward basis. A user may also set Specific Preferences for his incoming CIPs. For incoming CIPs in a user's Storage Space 1012 in Database 101, he may do so at any time by, for example, clicking on the "My MCL" Block 202 of Display Screen 20 shown in FIG. 2, which reveals another screen (or screens) for managing one's Master Contact List. For each of these incoming CIPs, a user may set Specific Preferences defining, for example, whether it may be mined by the Service for each automatic radial mining process involving mining of incoming CIPs. Other examples of Specific Preferences are described or apparent elsewhere herein. Each user's Special Preferences are stored in Database 101. Each outgoing and/or incoming CIP in a user's Storage Spaces 1011 and/or 1012 in Database 101 having one or more Specific Preferences assigned to it may be marked as such (e.g., with the letters "SP" next to it) for the user's convenience in managing his CIPs.

Following the user's entry of certain of his Settings, the Service may inform the user that he now has the opportunity to download (or send for downloading) a Software Module to one or more of his Devices 106 (though he also may do so at any time thereafter by, for example, returning to the "My Settings" Block 205 of Display Screen 20 shown in FIG. 2). In order to do so for each of his Devices 106 on which the appropriate version of the Software Module is not already installed (through, for example, the means for installing the Software Module described above), the user follows the Service's prompts to arrange for downloading (or sending for downloading) or otherwise installing the appropriate Software Module on each such device. For example, the user may first identify his device in use (e.g., Device 1) and click on the "download" command. In response to that command, Database 101 may use information in the user's Device Information to retrieve the appropriate version of the Software Module for such device and deliver it to Interface 102, which then delivers it via the Internet 103 for downloading to the device. The user may also instruct the Service to send the Software Module to each of his other Devices 106 in categories 1061 and/or 1062 via the Internet 103 by, for example, attaching the appropriate version of the Module to an individual e-mail directed to each such device. In response to such instruction, and using information in the user's Device Information and General Preferences, Database 101 delivers to Gateway 104 the appropriate version of the Module for each such device and the e-mail address for communicating with each such device, and Gateway 104 generates and sends the individual e-mails for downloading of the Module to each such device. Where particular communications services enable the delivery of the software Module to a particular Device 106 in Category 1063 via Networks 105, the user may similarly instruct the Service to send the Software Module to each such device. Otherwise, for each of the user's Devices 106 on which the Software Module is not already installed, the Service may apprise the user of the options for installing the Module on each such device through, for example, the means for installation described above.

The Service may also inform the user that he now has the opportunity to create one or more outgoing MCIPs (though he also may do so at any time thereafter by, for example, returning to the "My MCIPs" Block 201 of Display Screen 20 shown in FIG. 2). In the preferred embodiment of System 10, a user may create or modify an outgoing MCIP only while engaging the Service, for example, using any Device 106 in category 1061 to visit and log in to the Service's web site via the Internet 103 through Interface 102. After the creation or modification of an outgoing MCIP, it may be downloaded from the Service to any or all of the user's Devices 106. An outgoing MCIP downloaded to a particular Device 106 may be programmed to expire (or be temporarily disabled) upon the occurrence of a pre-determined event; or, the Software Module for use on a particular Device 106 may be programmed to erase (or temporarily disable) an outgoing MCIP stored on such device upon the occurrence of a pre-determined event. If, for example, some or all Members of the Service are required to pay a monthly fee, the Software Module on a particular Device 106 may be programmed to erase each of the outgoing MCIPs stored on such device upon the passage of a pre-determined amount of time (e.g., one month) if the Module is not refreshed within that amount of time (in a similar manner to that described above for the expiration of the Software Module itself). The Software Module may identify the outgoing MCIPs on the particular device through a number of means; for example, the Software Module on each of a user's Devices 106 may have registered within it the user's User Identification Code 3011 (or a further-encoded such code, which the Module may decode to determine Code 3011) and, where such is the case, any MCIP stored on such device having the same Code 3011 is an outgoing CIP. In any embodiments where a user may be able to create and/or modify his outgoing MCIPs directly on a non-engaged Device 106, the Software Module and/or the CIP itself (in the case of modifying a previously-created CIP) may contain software enabling the user to create and/or modify such CIPs. Any software contained in a CIP itself for its expiring (or being disabled) upon the occurrence of a pre-determined event or its enabling its own modification is contained in Block 305 of sample MCIP 30 shown in FIG. 3.

A user may create an outgoing MCIP at the Service by, for example, clicking on the "My MCIPs" Block 201 of Display Screen 20 shown in FIG. 2, which reveals another screen (or screens) for managing (including creating) one's outgoing MCIPs. In the screen (or screens) for creating an MCIP, the Service prompts the user through the process of entering information; including, the type of MCIP, contact information data, and/or related information. The prompts for information may depend upon the type of MCIP the user wishes to create; for example, if the user has indicated he wishes to create a professional MCIP, then the Service may prompt him to enter, among other things, a business category, where such prompt may not be included, for example, in the process of creating a personal MCIP. In the preferred embodiment, in order to promote the entry of information that is complete, accurate, and in a uniform format (such that like data in all users' MCIPs is in like format), the Service prompts the user, for example, to enter contact information data separately for each field (or portion of field), employing, where possible for each field (or portion of field), a pull-down bar listing possible responses to the prompt. For example, referring to FIG. 3, the data in the "Mobile Phone Number" field may be collected in three portions. First, the Service may prompt the user to enter the area code, using a pull-down bar to select among all possible area codes in, for example, the United States (assumed by the Service because of the user's entry of "USA" in a previous field). If the mobile phone does not have a United States area code, then the user may select another country and view all possible area codes in the newly-selected country. From the United States area codes, the user selects and enters "917." Next, the Service may prompt the user to enter the three-digit extension for his mobile phone, using a pull-down bar to select among all possible extensions for his area code. Finally, the Service may prompt the user to enter manually the last four digits of his number. Thus, the data for the "Mobile Phone Number" field is not corrupted by superfluous spaces or characters (like parentheses, dots, or dashes) that people typically, though inconsistently, use when writing or manually inputting complete telephone numbers. Though collected in three portions, when, for example, a user wishes to "View" the mobile phone number (and other contact information data) contained in a CIP, that data may be displayed (as shown in FIG. 3) in a standard format (e.g., in a single filed, with dots separating the three portions of the field). By prompting the user in the above manner, the Service has generated an additional piece of data not entered directly by the user—that is, that the country code for the user's mobile phone number is "1" (for the United States). Though not shown in FIG. 3, such piece of data may be included in MCIP 30 for purposes of, for example, its viewing by another user (as needed) or its use (as needed) in another user's speed dialing of the user's mobile phone number from a device on which the CIP is stored. The Service may similarly generate and include in an MCIP other information—for example, location codes, character codes, and data-corresponding codes—where such information, like the piece of data generated in the above example, may also be used in automated processes.

After the user has completed his entry of information, the Service may present him with templates and/or tools for designing the appearance of the MCIP. The tools may include means for using an image selected from a library of images maintained by the Service and/or another image (e.g., the user's photograph) uploaded by the user to the Service. The Service may apply a default appearance where the user has designed none.

In the user's entering his information in and/or designing the appearance of his MCIP, the Service may enable him to import some or all of the information from another CIP, outgoing and/or incoming, and thereafter edit the information and/or appearance as desired. For example, if a user wishes to create a special-purpose outgoing CIP containing the contact information data of the hotel at which he will be staying during an upcoming business trip, he may select the hotel's CIP (from, e.g., his Master Contact List), import it into the special-purpose CIP he is creating, and thereafter edit his special-purpose CIP as desired.

When the user instructs the Service to "save" his newly-created MCIP, the Service assigns to it (and includes within it) the appropriate User Identification Code 3011, CIP Identification Code 3012, CIP Version Code 3013 ("01" for a newly-created MCIP), and CIP Type Code 3014, includes within it appropriate information in Blocks 302, 303, 304, and/or 305, and stores it in the storage element in the user's Storage Space 1011, in Database 101, having an address code corresponding to Codes 3011 and 3012, taken together. The Service may then prompt the user through the process of assigning Specific Preferences (if any) to the MCIP. Then, if called for in the user's prevailing preferences, the Service may distribute the MCIP to one or more Distributors 608. The Service may also present the user the opportunity to transfer his newly-created MCIP, through the Service, to other users, in a manner analogous to that described below in connection with the preferred automatic customization process.

If the user wishes, he may create one or more outgoing MCIPs containing the same information as the newly-created MCIP, but presented in different characters. That is, for example, if the newly-created MCIP is in the Arabic alphabet, he may create another outgoing MCIP in the Roman alphabet, where the Service may provide the user translation assistance. The outgoing MCIP in the Roman alphabet may be assigned the same Codes 3011-3014 and stored in such user's Storage Space 1011 as corresponding to the newly-created MCIP.

The user may, if he wishes, create an outgoing MCIP (or multiple outgoing MCIPs) for the specific purpose of having it compiled in the Service's Directory and/or distributed to one or more Distributors 608 (e.g., an internet search service), even if he chooses not to download such CIP to any of his Devices 106 (discussed below). That is, for example, the user may create an MCIP containing as much contact information data, and no more contact information data, than he is comfortable making available for search in the Directory, and set a preference permitting compilation of such CIP in the Directory. He may set preferences prohibiting the compilation in the Directory of his other outgoing MCIPs. For another example, a business user may create an outgoing MCIP displaying in its appearance a banner advertisement, like MCIP 42 shown in FIG. 4, which he has compiled in the Directory and distributed to an internet search service, but does not use for any other purpose. The user may update the MCIP as he wishes, for example, on a weekly basis to advertise weekly specials. Particularly for outgoing MCIPs that are to be compiled in the Directory, a user may wish to provide the Service with more related information (described above in connection with Block 303 of sample MCIP 30) than he might otherwise provide the Service for other outgoing MCIPs. That is, for example, a user wishing to compile a personal outgoing MCIP in the Directory may enter a maiden name, date of birth, the names of her high school and college, as well as her years of graduation, her hobbies, and so on; all information designed to make the searching of the Directory more productive (e.g., where one user is searching for the CIP of an old high school friend with whom she lost contact 20 years ago). Similarly, for example, a user wishing to compile in the Directory a classified outgoing MCIP for the sale of his used bicycle may enter the make, model, condition, and price of the bicycle. Such additional related information may be contained in the outgoing MCIP itself (in, e.g., Block 303) or, instead, stored in such user's Storage Space 1011 as corresponding to the outgoing MCIP, where such information is also searchable as described below for Transfer Types 5 and/or 6.

In addition to setting preferences defining whether his outgoing MCIPs are to be compiled in the Directory, a user may, for the outgoing MCIPs for which he has permitted compilation in the Directory (i.e., the listed CIPs), set additional privacy preferences defining, for example, how or by whom such CIPs may be retrieved from the Directory. That is, for example, for a particular listed CIP containing a user's home address, home phone number, and personal e-mail address, the user may set preferences indicating that the CIP can be retrieved from the Directory only by other individual users—not business users—so as to avoid receiving spam, junk mail, and telemarketing calls (and where, for example, as explained above, searching users' Codes 3011 may include within them a sub-code indicating the type of user, individual or business). Similarly, the user may set preferences indicating, for example, that the CIP (or the contact information data in such CIP) can be retrieved only by telephone call through Gateway 104 (as in, for example, Transfer Type 6, though not through Transfer Type 5, both described below). For another example, a user may specify that, though listed, a particular CIP itself is not to be included in any search results in Transfer Types 5 and/or 6; rather, only its related information is to be included in such search results, sufficient for a searcher to determine whether the CIP is indeed of interest. That is, for example, the related information in a search result may, with respect to the listed CIP, identify the corresponding user by name, maiden name, age, and city and state of residence, but not disclose further contact information data. If based on such information a searcher concludes that the corresponding user is indeed the individual he is searching for, then, at the searcher's request, the Service may deliver to the corresponding user a message, identifying the searcher (including, for example, by including one of the searcher's CIPs) and, for example, requesting permission to deliver the listed CIP to him. For another example, assume in the above case of the classified CIP for the sale of a used bicycle that the CIP contains as contact information data only the user's name and home phone number. Not wanting to be bothered with calls from places to which he'd have to ship the bike, the user may specify that this CIP can be retrieved from the Directory only by other users living or working within a 10-mile radius from his home. Also not wanting to disclose his home address until first talking with a prospective buyer on the phone, he may import into the related information for this CIP the location code for his home address from his personal CIP—though not the address itself. Finally, he may include in the CIP an expiration date—whether he sells the bike or not, he will be more comfortable knowing that his contact information will be erased from the address books of those who may download his CIP from the Directory.

At this point, the Service may inform the user that he now has the opportunity to download (or send for downloading) his outgoing MCIP(s) to one or more of his Devices 106 (though he also may do so at any time thereafter by, for example, returning to the "My MCIPs" Block 201 of Display Screen 20 shown in FIG. 2). The user may choose, for each outgoing MCIP, the device or devices (if any) to which he wants to download the MCIP. The user follows the Service's prompts to arrange for downloading (or sending for downloading) or otherwise installing his outgoing MCIPs on each such device, all in a manner analogous to that described above for the downloading or other installation of the Software Module on Devices 106. In addition, the user may send his outgoing CIPs from one of his Devices 106 on which the CIPs are already installed for downloading to another of his Devices 106 by, for example, employing close-proximity data transmission technologies (wired and/or wireless) or private computing and/or communications networks. Preferably, a user's outgoing MCIPs reside on his Devices 106 such that they are readily accessible to the user at each device (e.g., the appearance of the MCIP resides on the user's desktop computer screen and/or on the main display screen of his mobile phone).

At this or another time, the user may install his outgoing MCIP(s) in machine-readable and/or human-readable form on one or more Conveyors 107. Considering, for example, Card 50 shown in FIG. 5, the Service may list one or more printing services (e.g., Kinko's) among Distributors 608 for printing such card with a CIP in bar code form. At this or another time (by, for example, returning to the "My MCIPs" Block 201 of Display Screen 20 shown in FIG. 2), the user may set a preference for an outgoing MCIP calling for the Service to distribute it—and/or information necessary to print the CIP in bar code form derived from it—to a listed printing service. If the user's complete design choices for the printed card are not apparent from the MCIP itself (e.g., Card 50 is to have the same appearance as the appearance of MCIP 41 shown in FIG. 4), then the user may communicate those choices to the printing service (either directly or through the Service). If the information necessary to print the CIP in bar code form is not itself distributed to the printing service, then the printing service's Device(s) 106 may require application software for generating such information from the MCIP, where such application software may be included in a Software Module. In certain embodiments, the information necessary to print a CIP in bar code form may itself be contained in the MCIP from which the CIP in bar code form is derived (e.g., in Block 305 of MCIP 30). In a manner analogous to that described above, Card 50 may also be printed by the user himself, by a printing service not listed as a Distributor 608, or by the Service. Also in a manner analogous to that described above, outgoing MCIP(s) in machine-readable and/or human-readable form may be installed on other Conveyors 107.

If the Service Provider wishes to restrict the installation of outgoing MCIPs in such form on one or more types of Conveyors 107 only to, for example, authorized installers, then System 10 (and/or System 60) may include means for avoiding or minimizing unauthorized such installation. For example, considering Card 50 shown in FIG. 5, the Service Provider may require that an authorized printing service of such cards inform the Service of each MCIP which it prints in such form on such cards, where a list of "card-authorized" MCIPs may be maintained in Database 101. When a CIP of one user present on such a card is downloaded to a Device 106 of another user, the device may include in the corresponding Return CIP (discussed below) a code indicating that the source of the CIP was such a card; and, when that Return CIP is later uploaded to the Service (also discussed below), Database 101 may use the Codes 7011, 7012, and 7013 in the Return CIP to determine, with reference to the list of card-authorized MCIPs, whether such card was printed by an authorized printing service.

Automatic Transfer Processes

In System 10, as shown in FIG. 1, CIPs may be transferred from one user (e.g., User A) to another user (e.g., User B) by a variety of methods, including, without limitation, those discussed below. Such methods are divided into two categories—"send" functions and "fetch" functions.

Referring to FIG. 1, User A may send a CIP (outgoing and/or incoming) directly to User B by, among other methods, (1) including the CIP in an interaction and/or communication with User B via the Internet 103 ("Transfer Type 1," discussed below); (2) including the CIP in a communication with User B via Networks 105 ("Transfer Type 2," discussed below); (3) sending the CIP to User B using close-proximity data transmission technologies ("Transfer Type 3," discussed below); and/or (4) conveying the CIP in machine-readable and/or human-readable form to User B ("Transfer Type 4," discussed below). User A may also use the Service to send on his behalf a CIP (outgoing and/or incoming) to User B (where examples of this type of transfer are discussed below in connection with other processes).

Referring still to FIG. 1, User B may fetch User A's outgoing CIP by, among other methods, (1) interacting with the Service through Interface 102 via the Internet 103 and thereby retrieving the CIP from the Service's Directory, if compiled therein ("Transfer Type 5," discussed below); and/or (2) communicating with the Service through Gateway 104 via the Internet 103 and/or Networks 105 and thereby retrieving the CIP from the Service's Directory, if compiled therein ("Transfer Type 6," discussed below). Similarly, and referring also to FIG. 6, User B may also fetch User A's outgoing CIP from a Distributor 608 and/or 609, if distributed thereby. For example, assuming User A (an individual user) is an employee at a law firm and he posts his outgoing professional CIP at his firm's web site (in this example, a Distributor 609), then User B may fetch the CIP by interacting with User A's firm's web site via the Internet 103 and either searching for the CIP in a manner analogous to that described below for Transfer Type 5, browsing for the CIP, or otherwise retrieving the CIP. User B may in certain cases also fetch User A's outgoing CIP directly from User A. For example, assuming User A is itself a law firm (a business user) and it posts its outgoing CIP on its company web site (where the web site is one of User A's Devices 106), then User B may fetch the CIP by interacting with User A through its web site via the Internet 103. For another example, assuming User A posts its outgoing CIP in an automated telephone system (also one of User A's Device 106), then User B may fetch the CIP by initiating a telephone call to User A and, following the automated prompts, requesting that the system transmit the CIP over the telephone connection for downloading to User B's device in use via Networks 105. User B may also use the Service to fetch on his behalf an outgoing CIP of User A (where examples of this type of transfer are discussed below in connection with other processes).

Referring still to FIG. 1, for Transfer Type 1, where User A may send a CIP directly to User B by including the CIP in an interaction and/or communication with User B via the Internet 103, where particular communications services enable the delivery of CIPs to a particular Device 106 in Categories 1061 and/or 1062 via the Internet 103, such communication may be, for example, through e-mail. Using any Device 106 in Categories 1061 or 1062, User A may access the Internet 103 and, using either a device-based e-mail client (such as Outlook) or an on-line e-mail client (such as at AOL), draft and address an e-mail message to User B. Assuming the CIP User A wishes to transfer to User B resides on his device in use, User A may, for example, upload the CIP by attaching it the message and send the message via the Internet 103 to User B. Also using any Device 106 in Categories 1061 or 1062, User B may also access the Internet 103 and, using either such e-mail client, retrieve the message and download the CIP to his device in use. Such device-based and/or on-line e-mail clients may also enable User A to upload the CIP by copying it from his device in use into the body of the e-mail message by, for example, dragging-and-dropping it therein, such that, for example, one can view the appearance of the CIP, as illustrated in FIG. 4; similarly, such e-mail clients may also enable User B to download the CIP in the body of the message to his device in use by, for example, clicking on it. As discussed above, users' outgoing and/or incoming CIPs may reside at one or more Distributors 608 and/or 609, including such distributors providing on-line address books (including e-mail clients), like an internet TSP/portal (e.g., AOL). Such on-line address books may enable User A to upload a CIP by attaching it to, or copying it into the body of, an outgoing e-mail message by selecting the CIP residing at such distributor, in a manner analogous to that described above (independent of whether or not the CIP also resides on User A's device in use). Similarly, such on-line address books may enable User B to download a CIP attached to, or in the body of, an incoming e-mail message to such distributor (such that it resides, for example, in User B's on-line address book), in a manner analogous to that described above (independent of whether or not the CIP is also downloaded to User B's device in use). User A may send a CIP directly to User B by including the CIP in other types of communications with User B via the Internet 103, in a manner analogous to that described herein for e-mail communications. User A may also send a CIP directly to User B by including it in an interaction with User B via the Internet 103. For example, using any Device 106 in Category 1061, User A may access the Internet 103 and visit User B's web site (one of User B's Devices 106) and, where provision is made on such web site for the uploading of CIPs, select the CIP residing on his device in use and upload it to the web site (where, from User B's perspective, it is downloaded to his device in use).

Referring still to FIG. 1, for Transfer Type 2, where User A may send a CIP directly to User B by including the CIP in a communication with User B via Networks 105, where particular communications services enable the delivery of CIPs to a particular Device 106 in Category 1063 via Networks 105, such communication may be, for example, through telephone service. Using any Device 106 in Category 1063, User A and User B may establish between them a telephone connection by, for example, User B's answering a call initiated by User A. During such connection, User A may upload the CIP from his device in use for transmission over such connection for downloading to User B's device in use, by, for example, activating a push-button command instructing his mobile phone to present a copy of his outgoing CIP for such transmission. Even if User B does not answer the call initiated by User A, a telephone connection may be established between them upon User A's connection to User B's data-enabled voicemail service or answering machine (either integrated within or connected to User B's Device 106); and during such connection, User A may similarly upload the CIP for transmission over such connection to such service/machine for downloading to User B's device in use, either during the call, after the call, or upon retrieval of his data-enabled voicemail messages. User A may send a CIP to User B by including the CIP in other types of communications with User B via Networks 105, in a manner analogous to that described herein for telephone communications.

Referring still to FIG. 1, for Transfer Type 3, where User A may send a CIP directly to User B by sending the CIP to User B using close-proximity data transmission technologies, such data transmission technology may be, for example, Bluetooth. Using any Device 106 equipped with a Bluetooth transmitter, and being in close proximity to User B using any Device 106 equipped with a Bluetooth receiver, User A may upload the CIP from his device in use for transmission using such technology for downloading to User B's device in use, by, for example, activating a push-button command instructing his mobile phone to present a copy of his outgoing CIP for such transmission. User A may send a CIP directly to User B by sending the CIP to User B using other close-proximity data transmission technologies, in a manner analogous to that described herein for Bluetooth.

Referring still to FIG. 1, for Transfer Type 4, where User A may send a CIP directly User B by conveying the CIP in a machine-readable and/or human-readable form to User B, User A may convey the CIP using, for example, Card 50 shown in FIG. 5. User A may present Card 50 to User B, who then presents it to a bar code scanner for scanning and downloading of the CIP to any Device 106 equipped with such Reader. User A may also send a CIP directly to User B by using other Conveyors 107 and/or conveying the CIP in other machine-readable and/or human-readable form, all in a manner analogous to that described herein for Card 50.

Even where, for example, a CIP is not on a card, the visible contact information or other information on such card may be used to retrieve a corresponding CIP from the Service. That is, for example, a Device 106 equipped with optical character recognition or similar capabilities (though normally unreliable for "reading" contact information from a card) may scan such contact information and create from all or a portion of it a type of search request file for temporary storage on the device. Such search request file may later be uploaded to the Service (like, for example, a Return CIP, discussed below). Database 101 may use such search request file to search among the outgoing MCIPs stored in users' Storage Spaces 1011 and, where a match is found (and subject to users' preferences), present the matching CIP for downloading back to the device. Though certain information in the search request file may not accurately reflect that present on the card, other information, like an e-mail address (on which an optical character reader can be trained to focus, orienting itself around the distinctive "@" symbol, for example), may be accurately reflected in the search request and be sufficient to identify one and only one match. Preferably, where information present on a user's card (whether, for example, a CIP in machine-readable form or other information) corresponds to an outgoing MCIP stored in his Storage Space 1011, the Service is informed of that fact (like as described above). Accordingly, Database 101 may (subject to the user's preferences) compile such CIP in a "card directory" within which it may search when in receipt of such a search request file, thereby improving the efficiency, accuracy, and privacy of any such search. Finally, a user may use information present on a card to manually submit a search request file, which may then be processes by Database 101 like as described above.

Referring still to FIG. 1, for Transfer Type 5, where User B may fetch User A's outgoing CIP by interacting with the Service through Interface 102 via the Internet 103 and thereby retrieving the CIP from the Service's Directory, it is assumed User A has set preferences permitting the Service to compile the CIP in the Directory. Using any Device 106 in Category 1061, User B may engage the Service via the Internet 103 through Interface 102, which presents User B with, for example, Display Screen 20 shown in FIG. 2. Block 204 of Display Screen 20 enables User B to search the Directory for User A's outgoing CIP. Using Block 204, User B may enter his search request, entering information he knows about User A in one or more of the search fields shown in FIG. 2 and/or other search fields corresponding to the fields of information in Blocks 302 and/or 303 shown for MCIP 30 in FIG. 3. An example of a search field corresponding to a field of information in Block 303 is a business category (subcategory) search field, in which a user may enter, for example, "Restaurant (Pizza)." Using this search field and a zip code search field, a user may search for, for example, the outgoing MCIPs of all pizza parlors located in a certain zip code. Another example of a search field corresponding to a field of information in Block 303 is a location code search field. Using this search field and, for example, a business category (subcategory) search field, a user may search for, for example, the MCIPs of all pizza parlors within a specified distance from the user's current location or the MCIP of the pizza parlor closest to the user's current location, where the Service may generate matches by, among other things, comparing the location codes in Blocks 303 of the MCIPs in the Directory with a code defining the user's current location. The code defining the user's current location may be included in the location code search field by, for example, the user's selecting one of his outgoing MCIPs and the Service's extracting from Block 303 of such MCIP the location code, the user's entering the address of his current location, from which address the Service can generate a code defining the user's current location, or the uploading of a code (or other information) defining the user's current location via a GPS or similar system and, if necessary, the Service's generating a code defining the user's current location from such uploaded code (or other information).

Preferably, the Service prompts the user to enter information in his search request separately for each search field (or portion of field) and/or search instruction (which, for example, specifies the distance in the example above), employing, where possible for each search field (or portion of field) and/or search instruction, a pull-down bar listing possible responses to the prompt. For example, if the user wishes to enter information in the business category (subcategory) search field for a particular search request, the Service may provide a pull-down bar for such search field where the possible entries are the same as the possible entries in the business category (subcategory) field for the creation of outgoing MCIPs. The Service may also enable the entry of information in one or more search fields by a user's selecting a CIP (e.g., an incoming CIP in his Master Contact List), the Service importing information from such CIP into one or more search fields, and, if necessary, the user's editing the information in the search fields. The Service may also generate and/or import, and include in a search request, for some or all of the search fields containing data, and for each such field, a data-corresponding code. In embodiments where Codes 3011 and/or 3012 may be made known to a user, the Service may provide search fields for the entry of such codes in a search request.

In order to submit his search request and commence the search, User B clicks on, for example, the "Go" command shown in FIG. 2. On that command, Interface 102 delivers the search request to Database 101, which searches all outgoing MCIPs in Storage Spaces 1011 for search field matches (including matches of data-corresponding codes, if any) and generates search results for presentation to User B through Interface 102, subject to the privacy preferences (described above), if any, of the listed CIPs with respect to which there is otherwise a match.

The Service may also enable the searching of the Directory in a manner that does not require the user's entry of information in particular search fields, but instead accepts a CIP itself as a search request (where the search request may also include search instructions). That is, for example, the Service may enable User B to select an incoming personal CIP, from, for example, his Master Contact List, and submit it as a search request, where the Service may return as search results all other CIPs (e.g., a professional CIP and an updated personal CIP), if any, of the user to whom the personal CIP corresponds and for which preferences have been set permitting the compilation of such CIPs in the Service's Directory, where the Service may extract Code 3011 from the personal CIP and use it to locate such user's Storage Space 1011 in Database 101. The Service may also enable the searching of the Directory using Keyword and/or other common search techniques, apart from and/or in combination with the search techniques described above.

In order to deliver the most relevant and best categorized search results, Database 101 may be programmed to employ personalization techniques, making use of information available to it about a searching user (e.g., User B)—information gathered from User B's everyday use of the Service, rather than solicited from him in connection with a particular search. That is, for example, Database 101 may refer to information contained in (or corresponding to) a searching user's outgoing and/or incoming CIPs, stored in his Storage Spaces 1011 and/or 1012. For example, Database 101 may determine from a user's outgoing special-purpose CIP that, at the time he submits a search request, he is on a business trip in Las Vegas staying at a particular hotel for which the location code is known, all relevant to delivering localized search results. Moreover, as explained in more detail elsewhere herein, a user may, in or in connection with his outgoing and/or incoming CIPs, reveal other information relevant to delivering personalized search results—for example, one's age, gender, marital status, education level, profession, income level, hobbies, purchasing habits (e.g., from a user's special-purpose CIPs, Database 101 can gather that he prefers to stay in 4-star hotels), and more. Database 101 may, with respect to each user, regularly process and save certain information, which information may be used, but need not itself be processed, in connection with a particular search. That is, for example, Database 101 may in conducting a search refer to a user's "user profile" (described below in connection with "automatic delivery processes"), which may include information relevant to searching (whether or not it also corresponds to the segmentation parameters used in such delivery processes). For example, Database 101 may compile in a user's user profile information concerning the user's search history—that is, his search requests and/or the CIPs in the search results that were of interest to him. Finally, as Database 101 may have available to it information concerning the searching user, so too it may have available to it information concerning the users whose CIPs are compiled in the Directory; Database 101 may similarly use such information concerning other users to deliver the most personalized search results to the searching user.

The search results may include a listing of all matching MCIPs (with some or all of the contact information data contained in each presented for browsing by User B, including on-line links to the web sites of users who have them) and a "download" command for each. The search results may also involve the presentation of the appearance of each MCIP (particularly where, for example, the appearance of business users' MCIPs may include advertisements). The search results may also involve the presentation of related information in or corresponding to the matching MCIPs, like product prices for comparison-shopping. The search results may also involve, for example, the prioritization of the listing of all matching MCIPs (for example, the listing of pizza parlors in their order of their distance from the user's current location) and the opportunity to view and/or download other information (e.g., directions to each pizza parlor). The search results may also include, for each matching MCIP, a "store in my MCL" command (commanding the Service to store the CIP in the user's Master Contact List, as described below in connection with "Automatic Storage Processes"), a "distribute this CIP" command (commanding the Service to distribute the CIP to the user's registered Devices 106 and/or Distributors 608, as described below in connection with "Automatic Portability Processes"), and/or one or more other commands commanding the Service to perform one or more other functions (such as, e.g., a speed dial function) with respect to the CIP.

Upon User B's clicking on the download command for User A's outgoing MCIP in the search results, Interface 102 instructs Database 101 to derive a CIP from such MCIP in Storage Space 1011 and deliver the derived CIP to Interface 102, which then delivers it via the Internet 103 for downloading to User B's device in use. If, in response to User B's commands, the Service also stores the derived CIP in his Master Contact List and distributes it to his other Devices 106 and/or Distributors 608, then, prior to delivering the derived CIP to Interface 102, Database 101 may enable in it a "do not create a Return CIP" toggle instruction (as explained below). Also upon User B's clicking on the download command, the Service may provide User B the opportunity to send his outgoing CIP to User A and facilitate that exchange if User B elects such opportunity. For example, assume User A is a men's clothing retailer (a business user), then, based on the assumption that User B's search for and downloading of User A's CIP is an indication of User B's interest in User A's product line, the Service may at that time query User B whether he would like to be on User A's mailing list; if User B responds positively, the Service sends User B's outgoing CIP of his choosing to User A. Preferably, whether and/or how the Service performs this function is directed by the users' (User A and/or User B) preferences; that is, for example, the Service may make the request on behalf of User A only if User A has so directed the Service in his preferences, the Service will present the request to User B only if User B has so permitted in his preferences, and the Service sends CIPs retrieved in this manner to User A as directed by User A's preferences (e.g., they may be sent through Gateway 104 to one or more of User A's Devices 106 and/or stored in User A's Master Contact List in a folder called "Mailing List"). As the Service may facilitate the exchange of User B's outgoing CIP to User A, so too may certain Distributors 608 and/or 609. For example, if User B searches for and downloads User A's CIP from the Zagat web site (in this example, a Distributor 608), then such distributor may also prompt User B with the opportunity to be on User A's mailing list, where, if User B responds positively, he may upload his outgoing CIP to the distributor, who delivers it (together with, e.g., User A's outgoing CIP for the purposes of identifying User A) to the Service via its connection with the Service, which in turn sends it to User A as directed by User A's preferences.

As described herein and illustrated in FIG. 2, the opportunity to search the Service's Directory for Transfer Type 5 is available to Members who are engaging the Service; though, such opportunity may also be available to Members and/or other users who are not engaging the Service, but are simply "accessing" the Service (e.g., visiting the Service's web site without logging in to the Service).

Referring again to FIG. 1, for Transfer Type 6, where User B may fetch User A's outgoing CIP by communicating with the Service through Gateway 104 via the Internet 103 and/or Networks 105 and thereby retrieving the CIP from the Service's Directory, it is assumed User A has set preferences permitting the Service to compile the CIP in the Directory.

Where particular communications services enable the delivery of CIPs to a particular Device 106 via the Internet 103 and/or Networks 105, such communication may be, for example, through telephone service. Using any Device 106 in Category 1063 (e.g., a mobile phone), User B may initiate a call to the Service and establish a telephone connection with Gateway 104. If the Service restricts the opportunity to fetch a CIP from the Directory in this manner, for example, only to Members, then System 10 may include means for the Service's determining, prior to going forward, that User B is a Member and/or his device in use is a registered Device 106. Through such telephone connection, User B may communicate to Gateway 104 a search request, Gateway 104 may then deliver the search request to Database 101, Database 101 may then search the Directory and generate search results, Database 101 may then deliver the search results to Gateway 104 for presentation to User B, and Gateway 104 may then deliver some or all of the search results for downloading by User B, all in a manner analogous to that described above for Transfer Type 5.

User B may communicate his search request to Gateway 104 in a number of ways, including verbally and/or using touch-tones (in response, e.g., to automated voice prompts). He may also upload from his device in use a CIP, as his search request or for importation into his search request, for transmission of the CIP over such connection to Gateway 104. He may also upload from his device in use a "search request file" for transmission of such file over such connection to Gateway 104. The Software Module on his device in use may enable User B to create on such device a search request file containing a search request substantially the same as a search request that one may create at the Service in Transfer Type 5. That is, for example, the search request in the search request file may have search fields corresponding to the fields of information in Blocks 302 and/or 305 of sample MCIP 30 shown in FIG. 3 and the Software Module may prompt the user to enter information in his search request separately for each search field (or portion of field), employing, where possible for each search field (or portion of field), a pull-down bar listing possible responses to the prompt. As mentioned above, Gateway 104 may involve a live operator, who may be used to, among other things, communicate with User B to receive his search request and/or to present to him the search results (and, if necessary, to narrow the search results), where, for example, some or all of the contact information data contained in the MCIP(s) in the search results may be communicated to User B. Preferably, Gateway 104 includes automated means for performing some or all of these and other of its tasks in Transfer Type 6. For example, Gateway 104 may employ automated voice, as well as means for receiving verbal or touch-tone responses to any automated voice prompts, for communicating with User B, including, if User B wishes to download User A's MCIP in the search results, for receiving User B's "download" command. In response to such command, Gateway 104 instructs Database 101 to derive a CIP from such MCIP in Storage Space 1011 and deliver the derived CIP to Gateway 104, which then uploads it for transmission over the telephone connection for downloading to User B's device in use. User B may fetch User A's outgoing CIP by communicating with the Service through Gateway 104 via the Internet 103 and/or Networks 105 using other types of communications services (including internet communications services), in a manner analogous to that described above for telephone service.

In each of the automatic transfer processes discussed above—as well as in other cases, including other automatic transfer processes discussed below in connection with other processes and/or the "transfer" of a CIP from one of a user's Devices 106 to another of his own devices—a CIP is presented for downloading to a user's (e.g., User B's) Device 106. In some cases, the presentation of a CIP for downloading to a Device 106 is followed, without action on the part of User B, by the "saving" of such CIP in the appropriate place(s) on such device, where downloading is complete. In other cases, following the presentation of a CIP for downloading to a Device 106, User B takes action to complete (or not complete) the downloading of such CIP to such device. For example, if a CIP is presented as an attachment to an e-mail message and User B uses his desktop computer to retrieve the message, then, using an on-line e-mail client such as at AOL, User B must click on the "download" command and then the "save" command to save the CIP on his computer. In some such cases, a "download routine" may be employed where, for example, following the presentation of a CIP for downloading to his device in use, User B may indicate whether it is an outgoing CIP or an incoming CIP (and therefore, e.g., whether it is to be saved as an outgoing CIP or an incoming CIP), where it may be assumed the CIP is an incoming CIP unless otherwise indicated by the user. User B's device in use may also otherwise determine whether the CIP is an outgoing CIP or an incoming CIP (and therefore, e.g., whether it is to be saved as an outgoing CIP or an incoming CIP). That is, the CIP itself may include information based on which the device determines it is an outgoing CIP; where such information is not present, the device assumes it is an incoming CIP. For example, in cases where the Service, as instructed by User B, presents User B's outgoing CIP for downloading to one of User B's own Devices 106 (e.g., while User B is engaging the Service via the Internet 103 through Interface 102), Database 101 may, prior to presenting for downloading the CIP derived from User B's outgoing MCIP, enable in it a "treat as an outgoing CIP" toggle instruction (based on which, e.g., the device saves the CIP as an outgoing CIP). Similarly, where User B "transfers" his outgoing CIP from one of his Devices 106 to another of his own devices, he may (in certain embodiments), prior to presenting the outgoing CIP for downloading to such other device, himself enable in it a "treat as an outgoing CIP" toggle instruction. For another example, where User B's device in use has on it a Software Module and the Module has registered within it User B's User Identification Code 3011, the device treats (and, e.g., saves) any CIP containing the same Code 3011 as an outgoing CIP.

Preferably, when a CIP is saved as an outgoing CIP on a user's Device 106, the CIP is stored on the device such that it resides in a place (or places) that is readily accessible to the user at such device (e.g., the appearance of the CIP resides on the "desktop" screen of his personal computer and/or in an "outgoing CIPs" folder in his device-based e-mail client, such that he may easily attach it to outgoing e-mail messages); the outgoing CIP overwrites (or causes the deletion of) any corresponding outdated outgoing CIP previously saved thereon (where the correspondence between the outdated CIP and updated CIP is established by their matching Codes 3011 and 3012, and where the updated CIP's preference over the outdated CIP is established by the stepped-up CIP Version Code 3013 in the updated CIP); and a "Return CIP" (discussed in detail below) is not created for such outgoing CIP. Preferably, when a CIP is saved as an outgoing CIP on a user's Device 106 and another CIP previously saved thereon has the same Codes 3011, 3012, and 3013, but a different character code (if any) in, for example, Block 303, such CIP is saved on the device without overwriting such other CIP.

When a CIP is saved as an incoming CIP on a Device 106, a "Return CIP" (discussed in detail below) may be created and temporarily stored on such device, where the Return CIP may contain, among other information, certain Specific Preferences and/or "supplementary information" (e.g., a voice activation stamp) for such incoming CIP. Thus, a download routine may provide User B the opportunity, in the process of saving a CIP as an incoming CIP on his device in use, to set such Specific Preferences and/or supplementary information for such CIP. Certain of such supplementary information may be stored on the device (in addition to within a Return CIP), for example, in the address book, as corresponding to the saved incoming CIP. Certain supplementary information (e.g., a voice activation stamp) may also be set for, and stored on a device as corresponding to, a saved outgoing CIP. A download routine may also provide User B the opportunity, following the presentation of an incoming CIP for downloading to one of his Devices 106, not only to "accept" the CIP (where it is saved on his device), but also to affirmatively "reject" the CIP (where it is not saved on his device). A Return CIP may be created and temporarily stored on his device in use even if the incoming CIP is rejected (and not saved on the device). Accordingly, a download routine may provide the opportunity to set Specific Preferences and/or supplementary information for such incoming CIP even if it is rejected (and not saved on the device). Similarly, User B may have the opportunity to set such Specific Preferences and/or supplementary information for an incoming CIP that is not affirmatively rejected by him, but is otherwise "rejected" (e.g., for lack of storage space in the address book on a device, like a mobile phone, having limited such storage space). Where the CIP is not saved on the device, the supplementary information corresponding to it is not stored on the device (other than in a Return CIP). Moreover, where a CIP is rejected at a device, such rejection may cause the deletion from the device of any corresponding (including outdated) CIP previously saved thereon (where the correspondence between the rejected CIP and the corresponding CIP is established by their matching Codes 3011 and 3012).

Preferably, when a CIP is saved as an incoming CIP on a user's Device 106, the CIP is stored in the address book and/or elsewhere on such device; also, the incoming CIP overwrites (or causes the deletion of) any corresponding outdated incoming CIP previously saved thereon (where the correspondence between the outdated CIP and updated CIP is established by their matching Codes 3011 and 3012, and where the updated CIP's preference over the outdated CIP is established by the stepped-up CIP Version Code 3013 in the updated CIP). Preferably, when a CIP is saved as an incoming CIP on a user's Device 106 and another CIP previously saved thereon has the same Codes 3011, 3012, and 3013, but a different character code (if any) in, for example, Block 303, such CIP is saved on the device without overwriting such other CIP. Where the incoming CIP itself is stored in the address book, it may be stored such that, for example, the contact information data (and data-corresponding codes) contained in each field of Block 302 of the CIP occupies (i.e., is copied into) and/or is displayed in a corresponding field in a corresponding address book entry (e.g., an entry for User A in the contact list portion of User B's address book); the related information (and data-corresponding codes) contained in each field of Block 303 of the CIP occupies and/or is displayed in a corresponding field in a corresponding address book entry, or otherwise causes information to occupy and/or be displayed in the address book (e.g., User A's incoming CIP causes the display of certain text on a certain date in the calendar portion of User B's address book); and/or the appearance of the CIP is displayed, for example, next to the corresponding address book entry. Where the CIP itself is stored not in the address book, but rather elsewhere on the device (e.g., in a folder on User B's "desktop" screen called "incoming CIPs"), it may nevertheless be stored such that, for example, as described above, a correspondence is established between the stored CIP and an address book entry, and, for example, the contact information data contained in each field of Block 302 of the CIP occupies and/or is displayed in a corresponding field in the corresponding address book entry. Preferably, in such case, the address book displays, for each address book entry for which a corresponding CIP is stored elsewhere on the device, a marker informing the user of that fact.

In either of the above cases, if, for example, the address book on a device stores and displays only telephone numbers, then only the contact information data contained in the telephone numbers fields in Block 302 of the CIP occupies and/or is displayed in corresponding fields in the corresponding address book entry. If, for example, Block 303 of the CIP contains different effective dates for different segments of contact information data contained in different ranges of fields in Block 302 of the CIP (e.g., effective dates of "March 3 through March 8" for the contact information data in "field 1 through field 4" and "March 9 through March 18" for the contact information data in "field 8 through field 12"), then each such segment of contact information data occupies and/or is displayed in corresponding fields in the corresponding address book entry during its effective dates. Where a user has stored on a device multiple incoming CIPs (e.g., a personal CIP and a professional CIP) corresponding to a single other user, he may, for example, have the contact information data contained in each CIP displayed separately in separate address book entries or displayed as merged in a single address book entry (where the correspondence between the multiple CIPs is established by the common Code 3011); even where multiple CIPs are displayed as merged in a single address book entry, each such CIP is stored separately on the device. If, for example, a user wishes to modify or delete some or all of the contact information data from the CIP as displayed in his address book, he may do so in the address book (e.g., he may delete an entry in his calendar), though, any such modification or deletion of such information in the address book does not modify or delete the CIP itself; if he wishes to restore the information in the address book, he may, for example, right-click on the CIP and select a "restore" operation. If, for example, the CIP contains a single expiration date, then, when such date is reached, the CIP is erased from the device and the information contained in it occupying and/or being displayed in the address book is also erased from the address book. (Similarly, on such expiration date, such CIP may also be erased from other components of System 10; for example, for the user to whom such CIP corresponds, such CIP may also be erased from his Devices 106 and/or his Storage Space 1011 in Database 101). If a user deletes a CIP on his device (or deletes an address book entry corresponding to a CIP on his device), then the CIP is erased from the device and the information contained in it occupying and/or being displayed in the address book is also erased from the address book; supplementary information stored on the device as corresponding to the deleted CIP may also be erased from the device.

Where, as preferred, outgoing and incoming CIPs are stored on a Device 106, a user may operate upon any such CIP at any time, either directly (by, e.g., right-clicking on the appearance of the CIP and selecting the desired operation) or indirectly (by, e.g., for an incoming CIP, selecting an address book entry and clicking on the desired command in the address book, which in turn operates upon the corresponding stored CIP). By, for example, right-clicking on the appearance of a CIP, a user may be presented with a selection of operations that may be commonly performed on such CIP; for example, "view" the contact information data and/or certain other contents of the CIP, "print" the CIP (the appearance of the CIP, certain of the contents of the CIP, and/or the CIP in machine-readable form), "set/re-set supplementary information" for the CIP, "send (it) to," for example, an "infrared recipient" or "mail recipient," "restore" the address book with information from the CIP, "delete" the CIP, and/or other operations.

Even if, when a CIP is saved as an incoming CIP on a Device 106, the incoming CIP itself is not stored on the device in use, some or all of the information contained in it may occupy and/or be displayed in the address book on such device, as described above. In such case, where, for example, a particular address book entry does not have a corresponding CIP stored on the device, it is preferred that the address book entry accommodate, in addition to information from Blocks 302 and/or 303 of the CIP, at least information from Block 301 of the CIP, where codes 3011, 3012, 3013, and/or 3014 of the CIP may also occupy (if not be displayed) in corresponding fields in the address book entry. In this manner, much of the functionality of saving an incoming CIP on a Device 106 as described above, for the cases where the CIP itself is stored on the device, is preserved even where the CIP is not stored on the device. For example, when saving an updated CIP to a device on which a corresponding outdated CIP was previously saved, where information from the outdated CIP occupies a particular address book entry, the address book overwrites the information in that address book entry with information from the updated CIP (where the correspondence between the outdated CIP and updated CIP is established by the matching Codes 3011 and 3012 in the updated CIP and the address book entry, and where the updated CIP's preference over the outdated CIP is established by the stepped-up CIP Version Code 3013 in the updated CIP). Of course, when an incoming CIP is not itself stored on a Device 106, a user may not operate on such CIP as described above (e.g., the CIP may not be uploaded from such device and sent to another user). When saving an incoming CIP to a Device 106, even if the CIP itself is not stored on the device in use, a Return CIP may be created and temporarily stored on such device, as described above.

Where, as described above, CIPs are saved on a Device 106 and/or a Device 106 is equipped with a Software Module, the functionality of the address book and/or other application software on such device may be enhanced in other ways as well. That is, for example, many common device-based address books may enable a user to search, browse, sort, categorize, and print the entries; they may enable the automatic addressing of an outgoing e-mail message; they may enable speed dialing of a selected (including by voice activation) number for an outgoing telephone call; they may enable Caller ID; they may enable the synchronization of information with that in another device-based, or on-line, address book; and they may provide protections against the receipt of spam e-mail, based in part on the incoming contact information saved on the device. These and other common functions may be enhanced—and still other functions may be enabled—by the fact that, among other things, CIPs contain contact information data and other information that is complete, accurate, and in a uniform format. For example, a user may search the incoming CIPs saved on his mobile phone for that of the florist nearest to his current location (where such function employs the business category codes and location codes in Blocks 303 of the CIPs, and where a code for the user's current location may be defined in a manner analogous to that described above in connection with Transfer Type 5). Similarly, the user's mobile phone may alert him whenever he is within a designated distance (e.g., one mile) from any of the addresses contained in a selected group of incoming CIPs saved on his device (e.g., those of his personal friends). Moreover, the user's mobile phone may inform him of the distance between his current location and the address contained in any selected CIP or the distance between the addresses contained in any two selected CIPs. In the above examples, the Software Module includes software for computing distances between two locations defined by location codes. The Software Module may also include software for computing a code for the user's current location from, for example, GPS information available on the device. Where the Software Module also includes mapping software, the device may also inform the user of the directions between two locations defined by location codes. Concerning other device-based application software, such as, for example, Microsoft's Word, a user creating a mass mailing (conventional mail) can simply select the incoming CIPs of the mail recipients for merging of the information from the appropriate fields in Blocks 302 (e.g., title, first name, middle initial, last name, street number, street name, etc.) into the corresponding fields in the letter document, as well as into the document for the envelopes/courier labels, and where, on each such envelope/courier label, a CIP (or certain information, e.g., a zip code, contained in a CIP) may also be printed in machine-readable form (e.g., bar code form) for use by the postal/courier service.

In certain embodiments and/or in certain cases, as described elsewhere herein, an incoming CIP saved to a Device 106 may not contain, for example, contact information data. Nevertheless, when saving such incoming CIP to such device, a Return CIP may be created and temporarily stored on such device and, as described below in connection with "Automatic Portability Processes," the Service may distribute a corresponding incoming CIP (containing, among other things, the contact information data) for downloading and saving to that same device, as described above.

Automatic Update Processes

In System 10 (and/or System 60), as shown in FIGS. 1-1B, in the event a user's outgoing contact information changes (and/or a user wishes to modify one or more of his outgoing MCIPs), such user may update one or more other users by a variety of methods, including, without limitation, those discussed below.

Figure 7:
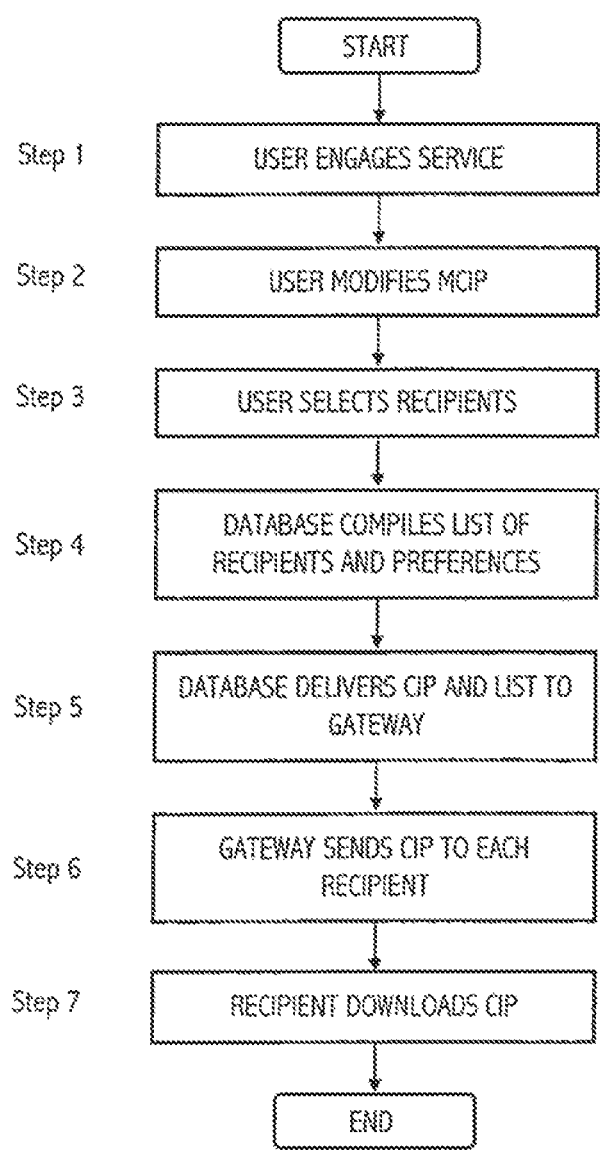
FIG. 7 is a flow diagram illustrating the sequence of steps in an automatic update process according to one embodiment of the present invention.

System 10 may enable, and such user may employ, the "preferred" automatic update process involving the multiple steps shown in FIG. 7. Referring initially to FIGS. 1 and 7, in Step 1, a user (e.g., "User A") uses any Device 106 in Category 1061 to engage the Service through Interface 102 via the Internet 103, where he is presented with, for example, Display Screen 20 shown in FIG. 2. As described above, in the preferred embodiment of System 10, a user may create or modify an outgoing MCIP only while engaging the Service.

In Step 2, in order to modify his outgoing MCIP, User A clicks on "My MCIPs" Block 201 of Display Screen 20, where he is presented with another screen (or series of screens) enabling him to, among other things, view, modify, and transfer his outgoing MCIP(s), previously created at the Service and stored in his Storage Space 1011 in Database 101, shown in FIGS. 1 and 1A. User A selects the MCIP he wishes to modify and the Service presents him the opportunity to modify (i.e., add to, subtract from, and/or change) the information in Blocks 302, 303, and/or 304 of sample MCIP 30 shown in FIG. 3. The Service prompts User A through the process of modifying the MCIP in much the same way as it prompts him through the process of creating an MCIP, employing, where possible, pull-down bars, and presenting him with templates and/or tools for redesigning the appearance of the MCIP, if he wishes. After completing his modifications, User A instructs the Service to save the "updated" MCIP. In the updated MCIP, Codes 3011, 3012, and 3014 remain the same as in the "outdated" MCIP (i.e., the MCIP User A modified). However, in the updated MCIP, the Service steps up the CIP Version Code 3013 by one; for example, from "01" (as shown in MCIP 30) to "02." The Service stores the updated MCIP in User A's Storage Space 1011 in Database 101, in the same storage element in which it stored the now outdated MCIP, overwriting the outdated MCIP. User A may now, if he wishes, download (or otherwise install) the updated MCIP to one or more of his Devices 106, where on each such device the updated CIP may also overwrite the outdated CIP (where the correspondence between the outdated CIP and updated CIP is established by their matching Codes 3011 and 3012, and where the updated CIP's preference over the outdated CIP is established by the stepped up CIP Version Code 3013 in the updated CIP). User A may also now, if he wishes, set Specific Preferences for the updated MCIP; where a Specific Preference previously set for the outdated MCIP may remain as set for the updated MCIP unless re-set for the updated MCIP.

In Step 3, the Service presents User A the opportunity to transfer the updated MCIP, through the Service, to other users; where, in doing so at any time, User A selects the recipients (or would-be recipients). Again, the Service prompts User A through the process of selecting recipients, which may be done, for example, in one of two ways (or a combination of both). In a "first selection process," the Service may present for User A's viewing his Master Contact List, stored in his Storage Space 1012 in Database 101, shown in FIGS. 1 and 1A, from which he may select the recipients. User A may, for example, scroll through the entire Master Contact List, selecting or not each incoming CIP (or each user to whom one or more incoming CIPs corresponds). He may also, for example, browse the Master Contact List by folder (or subfolder), selecting one folder (in effect, all incoming CIPs in the selected folder) and not another (e.g., if the updated MCIP is a personal MCIP, he may select his "Friends and Family" folder and not his "Clients" folder). Certain users selected in the first selection process may not have User A's outdated CIP (or any other of User A's CIPs) in their Master Contact Lists. In a "second selection process," the Service may enable User A to select as a group users who have User A's outdated CIP (or another of User A's CIPs) in their Master Contact Lists, either independent of or dependent upon whether an incoming CIP of each of such other users is in User A's Master Contact List. (The Service does not, as a general rule, identify to User A such other users, with certain exceptions, including where such other users may set a General Preference authorizing the Service to do so.) For example, assume User A's updated CIP is a personal CIP, User B is a personal friend of User A, and User B has User A's outdated CIP in his Master Contact List; but also assume User A does not have any of User B's CIPs in his Master Contact List. By User A's selecting all users having his outdated CIP in their Master Contact Lists, User B is selected as a recipient (where, if User A were to select solely from his own Master Contact List, then User B would not be selected as a recipient). The Service may (but need not) impose service restrictions on the second selection process; for example, enabling User A to select as a group each user who has User A's outdated CIP in his Master Contact List and whose outgoing CIP (any one, even an outdated MCIP) is present as an incoming CIP in User A's Master Contact List. User A may impose his own restrictions in this second selection process—for example, selecting as a group each individual user (but not business user) who has User A's outdated CIP in his Master Contact List, so as to avoid updating spammers, junk mailers, and telemarketers who may have gotten hold of his CIP; and where, for example, as explained above, users' Codes 3011 may include within them a sub-code indicating the type of user (individual or business). After User A's selection is completed, the Service may (but need not) enable him to compose one or more notes, each to a group (one, some, or all) of the selected recipients. The notes may be in written, recorded voice, and/or other form. The notes will reach the selected recipients only insofar as, among other things, the recipients, in their General Preferences, have chosen to receive updated CIPs from the Service through means of communication in which a note may be included. The Service may store User A's "selection" for his future reference (where appropriate and if the user wishes, setting his preferences to reflect the choices made in his selection). User A then commands the Service to send the updated MCIP to the selected recipients.

In Step 4, referring again to FIGS. 1, 1A, 3, and 7, Interface 102 delivers User A's command (which, among other things, identifies the updated MCIP) and his selection to Database 101, which then compiles a "final list" of recipients, where such list also contains, for each listed recipient, his preferences defining how he is to receive the updated CIP. In order to do so, Database 101 may first extract the User Identification Code 3011 from each of the incoming CIPs in User A's Master Contact List (stored in his Storage Space 1012 shown in FIG. 1A) that User A selected in the first selection process (if any), creating a "first interim list" of recipients (where multiple entries of the same Code 3011, if any, are merged into a single entry). Database 101 may then search for User A's outdated CIP (or another of User A's CIPs) in other users' Master Contact Lists (stored in other users' Storage Spaces 1012), in accordance with choices made in User A's second selection process (if any), creating a "second interim list" of recipients containing the User Identification Code 3011 of each user in whose Master Contact List a match was found. For example, if User A has selected "each user having my outdated CIP in his Master Contact List," then Database 101 searches through all users' Master Contact Lists for the outdated CIP (i.e., a CIP containing the same Codes 3011 and 3012 as those contained in the updated CIP, and containing a CIP Version Code 3014 lower than that contained in the updated CIP), thereby creating the second interim list. For another example, if User A has selected "each user having any one of my personal CIPs in his Master Contact List and whose outgoing CIP (any one, even an outdated CIP) is present as an incoming CTP in my Master Contact List," then Database 101 extracts the Code 3011 from each of the incoming CIPs in User A's Master Contact List and searches through the Master Contact Lists of the users identified by such codes for any of User A's personal CIPs (i.e., any CIP containing the same Code 3011 as that contained in the updated CIP and containing a Code 3014 of "01"), thereby creating the second interim list. Database 101 may then create a "third interim list" of recipients containing each Code 3011 in the first interim list plus each non-duplicate Code 3011 in the second interim list.

For each of the users whose User Identification Code 3011 is in the third interim list, Database 101 may then review his General Preferences and/or Specific Preferences concerning whether he wishes to receive the updated CIP. That is, the Service may enable each user to impose in his preferences his own restrictions on this automatic update process as it concerns him as a would-be recipient of updated MCIPs. For example, a user may direct the Service to transfer to him only updated CIPs for which he has the outdated CIPs in his Master Contact List; in which case, Database 101 can identify (or not) outdated CIPs in the recipient's Master Contact List in the same manner as described above. For another example, a user may indicate that he wishes to receive updated personal CIPs only from other users who have his current personal CIP(s) in their Master Contact Lists; in which case, Database 101 can make such determination by retrieving from the would-be receiver's Storage Space 1011 the CIP(s) having a Code 3014 of "01" and searching the would-be sender's Storage Space 1012 for a CIP having the same Codes 3011, 3012, and 3013. For another example, a user may set preferences indicating that he does not wish to receive updates from certain users, certain groups of users, and/or certain types of users (e.g., business users, which may be identified, e.g., by a Code 3011, extracted from the updated CIP, beginning with "1"); by doing so, a user may, among other things, avoid being inconvenienced by users who may abuse the system, such as a business user who attempts to send solicitations or advertisements disguised as updated CIPs. Moreover, a user may set preferences indicating that he does not wish to receive from any users, certain users, certain groups of users, and/or certain types of users "promotional updates," where he may accept other updates from such users. That is, a promotional update may be defined, for example, as an update for which the contact information data in Block 302 of the updated CIP is the same as that in the corresponding outdated CIP, but where information in Block 303 and/or 304 has been modified with respect to that in the outdated CIP. The Service may enable would-be recipients of such updates to block their delivery to them, as described above. However, the Service may otherwise permit the delivery of promotional updates, as they may be of particular value to their senders and recipients. That is, for example, by modifying the appearance of a CIP, a business user may notify recipients of seasonal discounts or its latest product offerings. And, using, for example, the second selection process described above, he may target such updated CIP at would-be recipients he may not otherwise be able to reach, users likely to have a high level of interest in receiving the updated CIP. That is, assuming such user's outdated CIP was previously compiled in the Directory, he may reach those users who downloaded that CIP therefrom (evidencing such other users' interest in the business user's goods or services), even though the business user likely does not have such other users' CIPs in his Master Contact List. Similarly, assuming the business user previously sent the outdated CIP to targeted others using the preferred automatic delivery process discussed below, he may now direct the updated CIP to those among the originally targeted group of others who then downloaded the outdated CIP (reaching now a further targeted group of others), even though, again, the business user likely does not have such other users' CIPs in his Master Contact List. If, for example, the Service is to charge fees for launching a promotional update, where the fee may be based on the number of users to whom the update is delivered, then, the Service may enable the launching user to restrict the delivery of the promotional update—for example, assuming the launching user is a restaurant advertising its special menu, prices, and entertainment for the upcoming July 4$^{th}$ holiday, it may restrict delivery of the update only to those users selected in the second selection process and whose home, summer home, or office is within a 5-mile radius of the restaurant (as determined, e.g., using location codes). In this step, therefore, where an update is a promotional update, Database 101 may remove from the second interim list the Codes 3011 of the users whose outgoing CIPs indicate that they do not meet the location restriction included in the second selection process and may remove from the third interim list the Codes 3011 of those whose promotional update preferences indicate that they do not wish to receive the subject update. A user may set certain of the above-described and other preferences as a Specific Preference for a particular incoming CIP (or for the user corresponding to a particular incoming CIP) in his Master Contact List; or, if he has set such preference as a General Preference, he may set a Specific Preference for a particular incoming CIP (or for the user corresponding to a particular incoming CIP) overriding the General Preference. Therefore, for example, for each would-be receiver of an updated CIP, Database 101 may first search for the corresponding outdated CIP in his Storage Space 1012 (in the manner described above), if found, retrieve the relevant Specific Preferences (if any) for the outdated CIP, and compare them against the relevant General Preferences (if any) to determine the prevailing preferences—and only then take further action (if any) in accordance with such preferences. From the third interim list, Database 101 may remove the Code 3011 for each user who it has determined does not wish to receive User A's updated CIP, and, for each remaining Code 3011, Database 101 may retrieve and add to the list the corresponding user's prevailing preferences concerning how he wishes to receive the updated CIP (examples of which are described above), thereby compiling the final list. The final list may also include User A's composed note, if any, for each user on the list. For each such user to whom User A has not composed a note, Database 101 may include in the final list a Service-standard note, which may be selected from several such notes depending on the user to whom it is directed. For example, for each such user not having User A's outdated CIP in his Master Contact List (if any), the Service may include a note saying, for example, "attached to this e-mail message is an updated CIP for which you do not have the outdated CIP in your Master Contact List."

Database 101 may at this point generate for User A a report concerning this automatic update process, which may be delivered, for example, through Interface 102 to User A while he is still engaging the Service. The report may state, for example, that in the overall selection process, User A selected 600 recipients, 350 in the first selection process and 250 in the second selection process; that his updated CIP will be delivered to 525 of the selected recipients; that his updated CIP is not deliverable through the Service to 75 of the selected recipients, due to preferences set by such users; and that, of the selected recipients to whom his updated CIP is not deliverable, 25 were selected in the first selection process and 50 were selected in the second selection process. Such report may or may not identify (by name alone or otherwise) the non-deliverable users selected in the first selection process and/or in the second selection process, where the Service may enable each user to set preferences concerning the disclosure of his identity in such a report.

Database 101 may also maintain for each user a "running report" concerning, among other things, preferred automatic update processes for which such user was selected (in Step 3) as a recipient of other users' updated CIPs. For example, referring to FIGS. 1 and 7, if User B was selected by User A (in Step 3) as a recipient of his updated CIP, and Database 101 (in Step 4) did not include User B on the final list of recipients due to User B's preferences, then Database 101 may generate a message for User B's running report informing User B of the above facts (preferably, identifying User A by name) and giving him another opportunity to receive the updated CIP. The running report may also keep a tally of the number and percentage of times User B's preferences have so blocked attempts of other users to send him updated CIPs through this preferred process. For another example, assuming User A is employing the preferred process to send through the Service his updated personal CIP, if User B was both selected by User A (in Step 3) and included on the final list by Database 101 (in Step 4), and Database 101 also determined (in Step 4) that User A does not have in his Master Contact List User B's current personal CIP, then Database 101 may generate a message informing User B of that fact and giving him the opportunity to send User A his current personal CIP. When, for example, User B is next engaging the Service through Interface 102 via the Internet 103, Interface 102 may (either on a periodic basis or upon User B's command) deliver to Database 101 a request to retrieve the running report for User B's viewing of it through Interface 102. Each message in the running report may include automatic action items. In the first example above, the message to User B may include a "download User A's updated CIP now" action item; in response to User B's clicking on such action item, Database 101 may deliver the updated CIP through Interface 102 for downloading to User B's device in use via the Internet 103. In the second example above, the message to User B may include a "send my current personal CIP to User A now" action item; in response to User B's clicking on such action item, Database 101 may retrieve User B's personal CIP from his Storage Space 1011, retrieve User A's preferences concerning whether and/or how he wishes to receive the "updated" CIP, and deliver (or not) the updated CIP to User A in accordance with User A's preferences.

In Step 5, referring again to FIGS. 1, 1A, and 7, Database 101 delivers the final list to Gateway 104, together with User A's updated CIP, derived from the updated MCIP in User A's Storage Space 1011 in Database 101.

In Step 6, referring still to FIGS. 1 and 7, Gateway 104, as directed by the information in the final list, generates and sends a separate communication(s) to each recipient via the Internet 103 and/or Networks 105, including in each such communication User A's updated CIP and thereby presenting the CIP for downloading to one or more of such recipient's Devices 106. Where particular communications services enable the delivery of CIPs to a particular Device 106 via the Internet 103 and/or Networks 105, such communication may be, for example, through e-mail. Assuming the first recipient in the final list has set preferences indicating that he wishes to receive updated CIPs as attachments to e-mail messages sent to a certain e-mail address and having a certain subject line, Gateway 104 generates and addresses such an e-mail message, includes in it either User A's composed note or a Service-standard note, attaches to it User A's updated CIP, and sends it to such recipient via the Internet 103. Gateway 104 may send updated CIPs to recipients via the Internet 103 and/or Networks 105 through other internet or other communications services, in a manner analogous to that described herein for e-mail service.

Finally, in Step 7, referring still to FIGS. 1 and 7, for each recipient, User A's updated CIP may be downloaded to one or more of such recipient's Devices 106, as described above. For example, for the first recipient in the final list, he may use any Device 106 in Category 1061 or 1062 to access the Internet 103, retrieve the e-mail message, and download and save User A's uploaded CIP (the attachment) to his device in use. On those Devices 106 on which the outdated CIP was previously saved, the updated CIP overwrites the outdated CIP (where the correspondence between the outdated CIP and updated CIP is established by their matching Codes 3011 and 3012, and where the updated CIP's preference over the outdated CIP is established by the stepped up CIP Version Code 3013 in the updated CIP).

System 10 (and/or System 60) may also enable, and users may also employ, other automatic update processes (some of which are discussed below), either as alternatives or supplements to the preferred process. For example, User A may engage the Service by means other than that described in connection with Step 1 of the preferred process; for example, as described above, he may engage the Service using a Device 106 in Category 1063 through Gateway 104 via Networks 105, and, by communicating with Gateway 104 (which in turn communicates with Database 101), he may modify an outgoing MCIP, select recipients, and/or otherwise command the Service to perform an update process analogous to the preferred process. For another example, in Step 2 of the preferred process, following the Service's saving of the updated MCIP (and, preferably, following User A's opportunity to set Specific Preferences for the updated MCIP), the Service may distribute the updated CIP to one or more Distributors 608, in accordance with User A's preferences and as necessary (e.g., if User A modified his address in his updated MCIP, then, if permitted by User A's preferences, the Service may distribute the updated CIP to the applicable local office of the United State Postal Service to notify that office of User A's change of address), where at each such distributor the updated CIP may also overwrite the outdated CIP, as described above. For another example, in other embodiments of System 10, where a user may create and/or modify an outgoing CIP directly on a non-engaged Device 106, User A may, for example, modify an outgoing CIP directly on a Device 106 in Category 1061, use such device to engage the Service through Interface 102 via the Internet 103, click on "My MCIPs" Block 201 of Display Screen 20, shown in FIG. 2, to upload the updated CIP to the Service (where it is stored in his Storage Space 1011 in Database 101, as shown in FIGS. 1 and 1A, overwriting the outdated MCIP), and then commence an automatic update process through the Service, employing Steps 3-7 of the preferred process shown in FIG. 7. For another example, having the updated CIP on a Device 106 (whether modified on such device or modified elsewhere, including at the Service, and downloaded to such device), User A may send such CIP to other users using one or more of automatic Transfer Types 1, 2, and 3; where, for the recipients of the updated CIP having the corresponding outdated CIP on their devices in use, the updated CIP may overwrite the outdated CIP, as described above. For another example, concerning again automatic update processes through the Service and referring to Step 3 shown in FIG. 7, if User A, by his own choosing, does not have stored his incoming CIPs in his Storage Space 1012 (i.e., he does not maintain at the Service a Master Contact List), then, in selecting recipients of his updated CIP, he may make such selection by either employing the second selection process alone or by uploading from his device in use to the Service the CIPs of the users he wishes to receive his updated CIP (where the Service may make temporary use of the uploaded CIPs to perform the automatic update process, but not permanently store such CIPs in User A's Storage Space 1012). For another example, the Service may enable a user (e.g., User B) to set a General Preference indicating that he wishes, where possible, to receive updated CIPs in a particular alphabet (e.g., the Roman alphabet). Assuming, then, that User A, in Step 2 of the preferred process, updated an outgoing MCIP in the Arabic alphabet (having, e.g., a character code of "010") and also translated and stored at the Service the updated CIP in the Roman alphabet (having, e.g., a character code of "001"), then, in Step 5, Database 101 may deliver the updated CIP in the Arabic alphabet to Gateway 104 with a list of certain of the recipients and also deliver the updated CIP in the Roman alphabet to Gateway 104 with a list of certain other recipients (including, e.g., User B). For another example and referring to FIG. 1, the Service may enable a user to set a General Preference indicating that he wishes to receive updated CIPs from the Service through Interface 102 (i.e., while he is engaging the Service via the Internet 103), either instead of or in addition to receiving them through Gateway 104. In such case, referring to the steps of the preferred process, in Step 4, Database 101 may, for each recipient who has set such preference indicating that he wishes to receive the updated CIP through Interface 102 instead of through Gateway 104, not include the User Identification Code 3011 of such user on the final list; also in Step 4, Database 101 may, for each recipient who has set such preference indicating that he wishes to receive the updated CIP through Interface 102 (either instead of or in addition to through Gateway 104), store the updated CIP in another storage space dedicated to such user for the temporary storage of updated CIPs received in this process. When such user is next engaging the Service through Interface 102 via the Internet 103, Interface 102 may (either on a periodic basis or upon such user's command) deliver to Database 101 a request to search such storage space and return all updated CIPs contained in it to Interface 102 for downloading by the user via the Internet 103. For another example, Database 101 may, with respect to, for example, the incoming CIPs in a particular user's (e.g., User B's) Master Contact List (stored in his Storage Space 1012, shown in FIG. 1A), search the Storage Spaces 1011 of other users for updated CIPs (if any) corresponding to such incoming CIPs and, if such updated CIPs are found, fetch them for User B. Database 101 may perform this automatic update process either on a periodic basis or upon User B's command, with respect to all such incoming CIPs or only certain such CIPs. That is, referring to FIGS. 1 and 1A, and assuming User A's outgoing personal CIP is stored as an incoming CIP in the first storage element in User B's Storage Space 1012, Database 101 may extract from such CIP the Codes 3011, 3012, and 3013; use Code 3011 to locate User A's Storage Space 1011; within such storage space, search among User A's outgoing CIPs for a corresponding updated CIP (i.e., one having the same Code 3012 as the extracted Code 3012, and having a Code 3013 higher than the extracted Code 3013), if any; and, if a corresponding updated CIP is found, retrieve it from User A's Storage Space 1011 for delivery to User B. Database 101 may deliver such updated CIP to User B by storing it in the first storage element in User B's Storage Space 1012 (overwriting the outdated CIP) and/or as otherwise described herein, where the manner of such delivery may be in accordance with preferences set by User B. The Service may also enable User A and/or User B to set preferences governing Database 101's performance of such process; for example, the Service may enable User A to set a General Preference prohibiting Database 101 from searching his Storage Space 1011 in connection with such process. In such case, the Service may, on behalf of one user (e.g., User B), make a request of another user or users for an updated CIP. That is, for example, if User B has a personal CIP of User A but discovers that the contact information data contained in it is no longer valid (and User A has set preferences prohibiting the compilation of his CIPs in the Directory), User B may select the invalid CIP and command the Service to make a request of User A for an updated CIP, if any; then, using the Code 3011 in the selected invalid CIP, the Service may determine the means through which it may communicate with User A and send him a communication, with User B's outgoing CIP attached, informing User A that User B requests an updated CIP.

In the preferred process, as described above and shown in FIG. 7, (1) User A's updated CIP is not stored in the recipients' Master Contact Lists, and (2) User A's updated CIP, though included in one or more communications to each recipient from Gateway 104, is not necessarily distributed by the Service to all of such recipient's Devices 106 or to such recipient's chosen Distributors 608 of his incoming CIPs (if any). That is because, in the preferred process, it is assumed that each user would prefer to have the opportunity to, among other things, accept or reject an updated CIP prior to such storage and/or such distribution. Therefore, the storage (or not) of an updated CIP in a recipient's Master Contact List and the distribution (or not) of an updated CIP to all of a recipient's Devices 106 or Distributors 608 are treated herein as processes separate from this automatic update process, discussed below in connection with "Automatic Storage Processes" and "Automatic Portability Processes." However, it should be understood that such storage and/or distribution of updated CIPs may be included in this preferred process (and/or other automatic update processes); for example, with respect to such storage of updated CIPs, in Step 4 shown in FIG. 7, Database 101 may also store the updated CIP in the Master Contact List of each user whose User Identification Code 3011 appears in the final list (or each of such users who has requested such storage in his preferences).

Automatic Customization Processes

In System 10 (and/or System 60), as shown in FIGS. 1-1B, a user may customize his outgoing contact information for special purposes and transfer his customized contact information to one or more other users by a variety of methods, including, without limitation, those discussed below.

Figure 8:
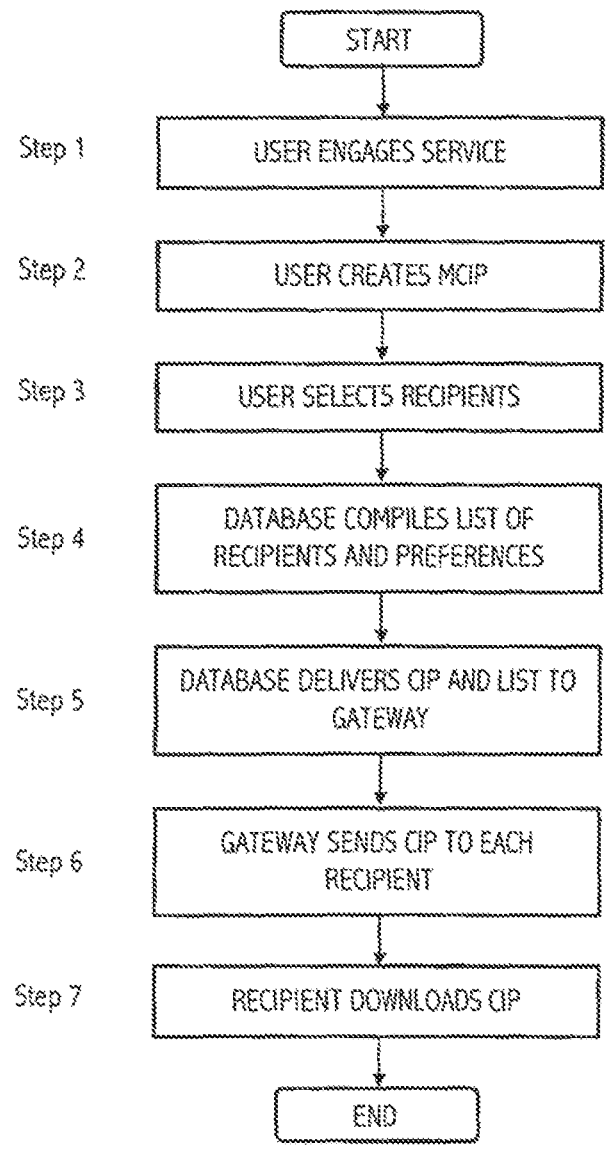
FIG. 8 is a flow diagram illustrating the sequence of steps in an automatic customization process according to one embodiment of the present invention.

System 10 may enable, and such user may employ, the "preferred" automatic customization process involving the multiple steps shown in FIG. 8. Referring initially to FIGS. 1 and 8, in Step 1, a user (e.g., "User A") uses any Device 106 in Category 1061 to engage the Service through Interface 102 via the Internet 103, where he is presented with, for example, Display Screen 20 shown in FIG. 2. As described above, in the preferred embodiment of System 10, a user may create or modify an outgoing MCIP only while engaging the Service.

In Step 2, in order to create a special-purpose outgoing MCIP, User A clicks on "My MCIPs" Block 201 of Display Screen 20, where he is presented with another screen (or series of screens) enabling him to, among other things, create and transfer outgoing MCIP(s). User A indicates he wishes to create a special-purpose MCIP and the Service prompts him through the process of doing so, described above, where the Service may also provide the user with a choice of templates to assist him in creating a special-purpose MCIP for his particular special purposes (e.g., an upcoming business trip). After completing the MCIP, User A instructs the Service to save it. The Service assigns the MCIP User A's User Identification Code 3011, the appropriate CIP Identification Code 3012, a CIP Version Code 3013 of "01," and a CIP Type Code 3014 of "04," and stores it in a new storage element in User A's Storage Space 1011 in Database 101, shown in FIGS. 1 and 1A. User A may now, if he wishes, download (or otherwise install) the special-purpose MCIP to one or more of his Devices 106. User A may also now, if he wishes, set Specific Preferences for the special-purpose MCIP.

In Step 3, the Service presents User A the opportunity to transfer the special-purpose MCIP, through the Service, to other users; where, in doing so at any time, User A selects the recipients (or would-be recipients). Again, the Service prompts User A through the process of selecting recipients, which, as in the preferred automatic update process, may be done using a first selection process (the same as or analogous to that described above) or a second selection process (the same as or analogous to that described above), or a combination of both. The overall selection process available to User A in this process may be different from that available in the preferred automatic update process; for example, the Service may impose service restrictions enabling User A to select recipients using only a first selection process (i.e., selecting recipients from his Master Contact List). Like in the preferred automatic update process, after User A's selection is completed, the Service may (but need not) enable him to compose one or more notes and/or the Service may store his selection for his future reference. User A then commands the Service to send the special-purpose MCIP to the selected recipients.

In Step 4, referring again to FIGS. 1, 1A, 3, and 8, Interface 102 delivers User A's command (which, among other things, identifies the special-purpose MCIP) and his selection to Database 101, which then compiles a "final list" of recipients, where such list also contains, for each listed recipient, his General Preferences and/or Specific Preferences defining how he is to receive the special-purpose CIP. Database 101 may compile the final list in this process in a manner the same as or analogous to the manner in which it compiles the final list in Step 4 of the preferred automatic update process. That is, Database 101 may first create a first interim list in accordance with choices made in User A's first selection process (if any), next create a second interim list in accordance with the choices made in User A's second selection process (if any), and, from such lists, next create a third interim list. For each of the users whose User Identification Code 3011 is in the third interim list, Database 101 may then review his General Preferences concerning whether he wishes to receive the special-purpose CIP. That is, the Service may enable each user to impose in his preferences his own restrictions on this automatic customization process as it concerns him as a would-be recipient of special-purpose CIPs; and, such preferences (if any) may be different from those (if any) set by such user for the preferred automatic update process. For example, a user may direct the Service not to transfer to him any special-purpose CIPs in this process; whereas, for the preferred automatic update process, he may direct the Service to transfer to him updated CIPs. From the third interim list, Database 101 may remove the Code 3011 for each user who it has determined does not wish to receive User A's special-purpose CIP, and, for each remaining Code 3011, Database 101 may retrieve and add to the list the corresponding user's preferences concerning how he wishes to receive the special-purpose CIP (examples of which are described above), thereby compiling the final list. The final list may also include User A's composed note or a Service-standard note for each such user.

Database 101 may at this point generate for, and deliver to, User A a report concerning this automatic customization process, like as described above for the preferred automatic update process. Database 101 may also generate messages for the running reports of the recipients and/or would-be recipients of User A's special-purpose CIP in this process, again like as described above for the preferred automatic update process.

In Step 5, referring again to FIGS. 1, 1A, and 8, Database 101 delivers the final list to Gateway 104, together with User A's special-purpose CIP, derived from the special-purpose MCIP in User A's Storage Space 1011 in Database 101.

In Step 6, referring still to FIGS. 1 and 8, Gateway 104, as directed by the information in the final list, generates and sends a separate communication(s) to each recipient via the Internet 103 and/or Networks 105, including in each such communication User A's special-purpose CIP and thereby presenting the CIP for downloading to one or more of such recipient's Devices 106, all in a manner analogous to that described above for Step 6 of the preferred automatic update process (noting again that a user's preferences concerning how he wishes to receive special-purpose CIPs may differ from those concerning how he wishes to receive updated CIPs).

Finally, in Step 7, referring still to FIGS. 1 and 8, for each recipient, User A's special-purpose CIP may be downloaded to one or more of such recipient's Devices 106, as described above.

System 10 (and/or System 60) may also enable, and users may also employ, other automatic customization processes, either as alternatives or supplements to the preferred process, where such other automatic customization processes are analogous to the other (i.e., not "preferred") automatic update processes discussed above and are therefore not further discussed here.

In the preferred process, as described above and shown in FIG. 8, (1) User A's special-purpose CIP is not stored in the recipients' Master Contact Lists, and (2) User A's special-purpose CIP is not necessarily distributed by the Service to all of a recipient's Devices 106 or to a recipient's chosen Distributors 608 of his incoming CIPs (if any). Under similar reasoning as discussed above in connection with automatic update processes, the storage (or not) of a special-purpose CIP in a recipient's Master Contact List and the distribution (or not) of a special-purpose CIP to all of a recipient's Devices 106 or Distributors 608 are treated herein as processes separate from this automatic customization process. However, it should be understood that such storage and/or distribution of special-purpose CIPs may be included in this preferred process (and/or other automatic customization processes).

Automatic Delivery Processes

In System 10 (and/or System 60), as shown in FIGS. 1-1B, a user may transfer his contact information to targeted other users by a variety of methods, including, without limitation, those discussed below.

Figure 9:
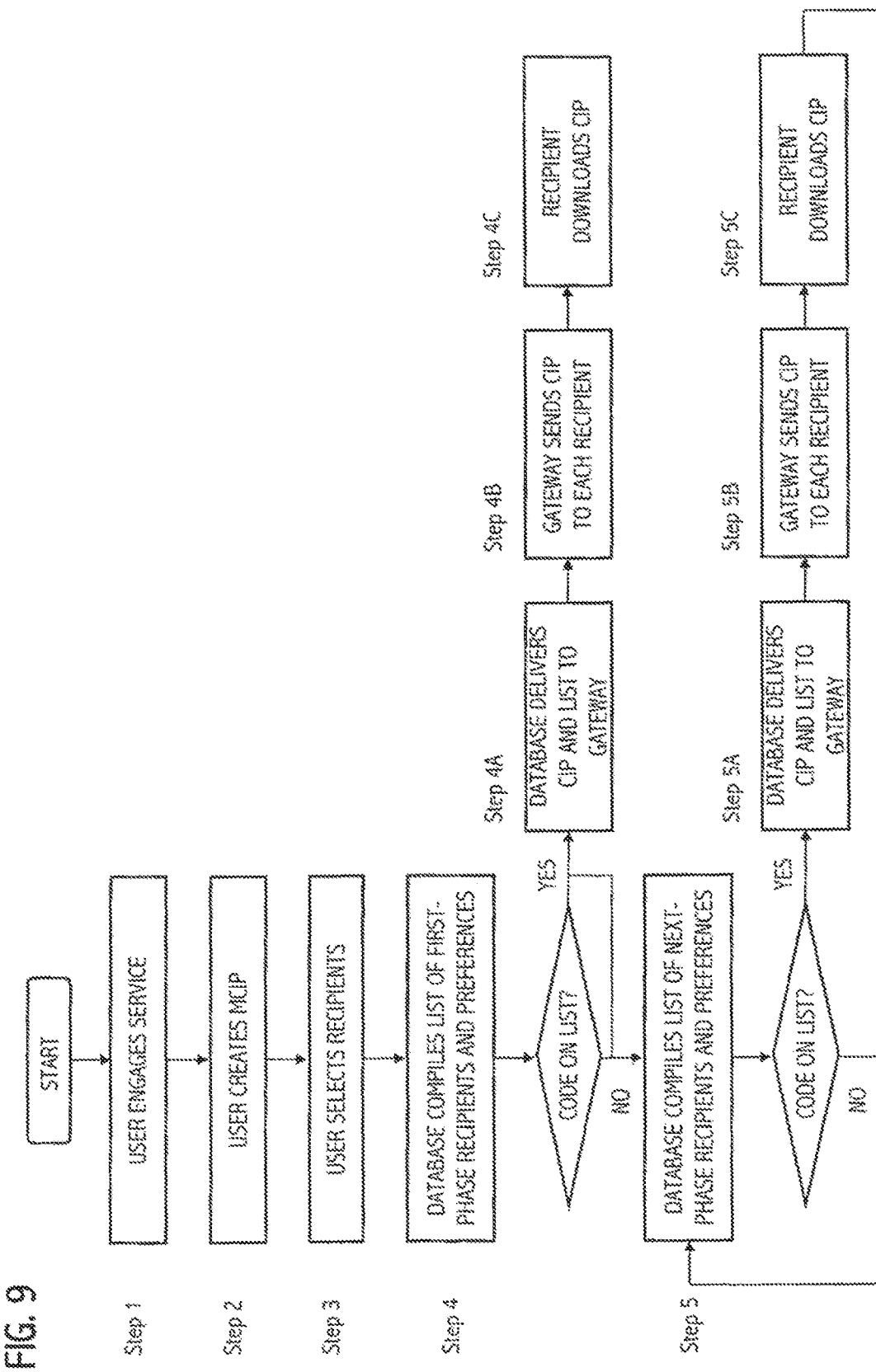
FIG. 9 is a flow diagram illustrating the sequence of steps in an automatic delivery process according to one embodiment of the present invention.

System 10 may enable, and such user may employ, the "preferred" automatic delivery process involving the multiple steps shown in FIG. 9. Referring initially to FIGS. 1 and 9, in Step 1, a user (e.g., "User A") uses any Device 106 in Category 1061 to engage the Service through Interface 102 via the Internet 103, where he is presented with, for example, Display Screen 20 shown in FIG. 2. As described above, in the preferred embodiment of System 10, a user may create or modify an outgoing MCIP only while engaging the Service.

In Step 2, in order to create an outgoing MCIP, User A clicks on "My MCIPs" Block 201 of Display Screen 20, where he is presented with another screen (or series of screens) enabling him to, among other things, create and transfer outgoing MCIP(s). User A indicates he wishes to create an MCIP and the Service prompts him through the process of doing so, described above. The MCIP may be of any type and it may contain, in addition to contact information data (which itself is promotional in nature), other promotional information (e.g., a banner advertisement for display in its appearance, like shown for MCIP 42 shown in FIG. 4). After completing the MCIP, User A instructs the Service to save it, as described above. User A may now, if he wishes, download (or otherwise install) the MCIP to one or more of his Devices 106. User A may also now, if he wishes, set Specific Preferences for the MCIP—for example, he may set a Specific Preference for his newly-created MCIP permitting its compilation in the Service's Directory.

In Step 3, the Service presents User A the opportunity to transfer the MCIP, through the Service, to other users; where, in doing so at any time, User A selects the recipients (or would-be recipients). Again, the Service prompts User A through the process of selecting recipients, which may be done, for example, using a "third selection process." In such process, the Service presents User A with a list of segmentation parameters from which User A may select one or more such parameters, and make further selections within each such selected parameter, to define a "recipient profile," that is, a profile of a user who is likely to have an interest in receiving such MCIP. The segmentation parameters on such list correspond to information the Service knows or may assume about some or all of its users—for example, information contained in (or corresponding to) users' outgoing and/or incoming CIPs, stored in their Storage Spaces 1011 and/or 1012 in Database 101. Preferably, the Service employs, where possible for each selected segmentation parameter, a pull-down bar listing possible further selections within such selected parameter. That is, for example, if User A selects an "Age" segmentation parameter, a pull-down bar may be employed to select among possible age groups. Also preferably, the Service enables a user, where possible, to himself define his further selection within a selected segmentation parameter. That is, for example, if User A selects a "Distance" parameter, he may enter any distance (e.g., 2 miles) that he believes best suits his purposes.

It is best demonstrated through examples the ways in which a user may use segmentation parameters to target his MCIP at other users who may have an interest in it. For a first example, assume User A is a car service based in Las Vegas and it has created an outgoing professional MCIP advertising its services from the airport into town; User A may define a recipient profile by selecting two parameters—namely, any user (1) "who does not live or work in Las Vegas" (which information can be gathered, e.g., from users' outgoing personal and professional CIPs), but (2) "who is planning to visit Las Vegas" (which information can be gathered from users' outgoing special-purpose CIPs). For a second example, assume User A is a dry cleaner in a particular neighborhood in New York City and it has created an outgoing professional MCIP displaying the message, "Welcome to the Neighborhood"; User A may define a recipient profile by selecting four parameters—namely, any user (1) "aged 18 and over" (which information can be gathered, e.g., from related information in or corresponding to outgoing CIPs compiled in the Service's Directory), (2) "who is a newcomer (i.e., within the last 2 weeks)" to the neighborhood, where neighborhood is defined as the area (3) "within a ¼-mile radius" from (4) "my store location" (where information corresponding to the second through fourth parameters can be gathered, e.g., from users' updated personal and professional outgoing CIPs [including the date such CIPs were updated and the location codes contained in such CIPs] and User A's professional CIP). For a third example, assume User A is a retailer of new home furnishings (like Pottery Barn) and it has created an outgoing professional MCIP offering a twenty percent discount on its products, where such CIP (and such discount) is to expire, with respect to a particular recipient of it, thirty days after its delivery to that particular recipient, and an alert/reminder is to be displayed 7 days before such expiration; User A may define a recipient profile by selecting two parameters—namely, any user (1) "who has changed home address" (2) "within the last 14 days" (which information can be gathered, e.g., from users' updated personal CIPs). For a fourth example, assume User A is a toy retailer (like Toys-R-Us) and it has created an outgoing professional MCIP containing a link to the page on the store's web site displaying the most popular items for girls ages five through eight; User A may define a recipient profile by selecting four parameters—namely, any user (1) "who is a parent," (2) "of a girl", (3) "aged 5 through 8," (4) "whose birthday is less than 2 weeks away" (where, as explained above, all such information may be gathered, e.g., from users' outgoing personal CIPs). For a fifth example, assume User A is a retailer of sporting goods and it has created an outgoing professional MCIP advertising its high-end bicycling equipment and gear; User A may define a recipient profile by selecting three parameters—namely, any user (1) "who has created in the last 2 days," (2) "a classified CIP," (3) "for the sale of a used bicycle" (which information can be gathered, e.g., from users' outgoing classified CIPs). For a sixth example, assume User A is retiring landscaper and he has created an outgoing classified MCIP for the sale of his landscaping equipment, for which he has set a Specific Preference permitting its compilation in the Service's Directory; User A may define a recipient profile by selecting three parameters—namely, any user (1) "who is a landscaper" and (2) "who lives or works within a 10-mile radius" from (3) "my home" (which information can be gathered, e.g., from users' outgoing personal and professional CIPs [including the business category codes and location codes contained therein]). For a final example, assume User A is an organizer of package travel tours and it has created an outgoing professional MCIP advertising an upcoming golfing package to Scotland, departing from O'Hare airport; User A may define a recipient profile by selecting three parameters—namely, any user (1) "who is an avid golfer" (which information can be gathered, e.g., from users' incoming CIPs [including, e.g., the golf course business category codes, if any, contained in such CIPs) and (2) "who lives within a 100-mile radius" from (3) "O'Hare airport" (where information corresponding to the second and third parameters can be gathered, e.g., from users' outgoing personal CIPs).

The Service may (but need not) impose service restrictions on the selection process—for example, requiring that selections be sufficiently narrow (or targeted) to best assure that recipients will find of interest the CIPs delivered to them in this preferred process. Like in the preferred automatic update and customization processes, after User A's selection is completed, the Service may (but need not) enable him to compose one or more notes and/or the Service may store his selection for his future reference. User A then commands the Service to send his CIP to the selected recipients, subject to any limitations imposed by User A or by additional service restrictions. That is, for example, the Service may enable User A to impose limitations on this automatic delivery process—for example, instructing that deliveries automatically cease on a certain date, after delivery of his CIP to a certain number of recipients, or after delivery of his CIP to only "first-phase recipients" (defined below). User A may at any time himself put an end to the process. (For purposes of simplicity herein, however, it is assumed that, once commanded, the Service runs this process indefinitely.)

In Step 4, referring again to FIGS. 1, 1A, 3, and 9, Interface 102 delivers User A's command (which, among other things, identifies the subject MCIP) and his selection to Database 101, which then compiles a "final list" of "first-phase recipients," where such list also contains, for each listed recipient, his preferences defining how he is to receive the subject CIP. In order to do so, Database 101 may first search for "recipient profile matches," creating an "interim list" of first-phase recipients containing the User Identification Codes 3011 for each user with respect to whom there is such a match. In this preferred process, there is a recipient profile match with respect to a particular user when, from information stored in such user's Storage Spaces 1011 and 1012, or information stored elsewhere in the database corresponding to such user, Database 101 knows or assumes such user meets each of the selected segmentation parameters (and the further selection, if any, within each selected parameter). For example, in the third example above, there is a recipient profile match with respect to any user who has updated the home address fields in an outgoing CIP within the last 14 days; however, there is no such match with respect to a user who updated the home address fields in an outgoing CIP 15 days ago.

For each of the users whose User Identification Code 3011 is on the interim list, Database 101 may then review his General Preferences and/or Specific Preferences concerning whether he wishes to receive the subject CIP. That is, the Service may enable each user to impose in his preferences his own restrictions on this automatic delivery process as it concerns him as a would-be recipient of MCIPs; and, such preferences (if any) may be different from those (if any) set by such user for other processes (e.g., the preferred automatic update process, described above). For example, a user may set preferences opting out of receiving particular types or all types of CIPs in this process. For another example, a user may direct the Service to transfer to him only CIPs of users for whom he has another CIP in his Master Contact List; in which case, Database 101 can identify (or not) such other CIP in the recipient's Master Contact List with reference to the User Identification Code 3011 in the subject CIP. For another example, a user may set preferences indicating that he does not wish to receive CIPs in this process from certain users; by doing so, a user may, for example, avoid being further inconvenienced by users who have delivered to him in the past CIPs that were not of interest to him. For a final example, a user may set preferences indicating that he wishes to receive in this process only, for example, highly-targeted CIPs (as opposed to, e.g., moderately-targeted CIPs), where, for example, the Service may deliver to him only such CIPs for which the sending users selected (and there was a recipient profile match with respect to) at least three segmentation parameters. From the interim list, Database 101 may remove the Code 3011 for each user who it has determined does not wish receive User A's CIP, and, for each remaining Code 3011, Database 101 may retrieve and add to the list the corresponding user's prevailing preferences concerning how he wishes to receive the CIP (examples of which are described above), thereby compiling the final list. The final list may also include User A's composed note or a Service-standard note for each such user.

Database 101 may at this point generate for, and deliver to, User A a report concerning this automatic delivery process, like as described above for the preferred automatic update process. Database 101 may also generate messages for the running reports of the recipients and/or would-be recipients of User A's CIP in this process, again like as described above for the preferred automatic update process.

Preferably, Database 101 is programmed to employ the most efficient processing techniques. For example, in this Step 4, it may be more efficient for Database 101 to first determine users' preferences concerning whether they wish to receive the subject CIP in this process, thereby reducing the number of users with respect to whom Database 101 need search for a recipient profile match. Moreover, Database 101 may, with respect to each user, regularly process and save certain information, which information may be used, but need not itself be processed, in this Step 4 (or in other steps in this process or in steps in other processes). That is, for example, Database 101 may maintain for each user a "user profile," which compiles information about such user corresponding, for example, to the segmentation parameters presented by the Service in Step 3 in this process. Where, for example, one of the presented segmentation parameters is "Hobbies," and one of the further selections in such parameter is "Avid Golfer," Database 101 may compile information in a user profile indicating whether such user "is" or "is not" an avid golfer. With respect to such user, Database 101 may at any time perform the processing (if any) necessary to compile this piece of information; for example, Database 101 may make an assumption that such user is an avid golfer based on the fact that he has stored in his Master Contact List 25 incoming CIPs containing the "golf course" business category code. Then, considering the recipient profile described in the final example above, where this piece of information is relevant and compiled in advance in users' user profiles, in this Step 4, Database 101 has such information available to it without having to perform the processing necessary to compile it.

Where there is one or more Code 3011 on the final list, in Step 4A, referring again to FIGS. 1, 1A, and 9, Database 101 delivers the final list to Gateway 104, together with User A's CIP, derived from the MCIP in User A's Storage Space 1011 in Database 101. The Service may maintain and store in Database 101, for each user, a "delivery log," which, for each outgoing CIP that the Service has delivered in this process to any other user, logs, for each such CIP, the User Identification Codes 3011 of all users to whom the Service has delivered such CIP. Such delivery log may be employed, for example (and if desired), to assure that, in this process, the subject CIP is delivered no more than once to a particular recipient. Therefore, Database 101 may log in User A's delivery log the subject CIP and, corresponding to it, the Codes 3011 on the final list.

In Step 4B, referring still to FIGS. 1 and 9, Gateway 104, as directed by the information in the final list, generates and sends a separate communication(s) to each recipient via the Internet 103 and/or Networks 105, including in each such communication User A's CIP and thereby presenting the CIP for downloading to one or more of such recipient's Devices 106, all in a manner analogous to that described above for Step 6 of the preferred automatic update process (noting again that a user's preferences concerning how he wishes to receive CIPs in this process may differ from those concerning how he wishes to receive CIPs in other processes).

In Step 4C, referring still to FIGS. 1 and 9, for each recipient, User A's CIP may be downloaded to one or more of such recipient's Devices 106, as described above.

In Step 5, referring again to FIGS. 1, 1A, 3, and 9, Database 101 compiles a "final list" of "next-phase recipients." In order to do so, Database 101 may, like in Step 4 above, first create an interim list, then remove from the list the Code 3011 for each user who it has determined does not wish to receive User A's CIP (as well as, if desired, the Code 3011 for each user whose such code appears in User A's delivery log as corresponding to the subject CIP), and, for each remaining Code 3011, retrieve and add to the list the corresponding user's prevailing preferences concerning how he wishes to receive the CIP. In creating the interim list of next-phase recipients, Database 101 again searches for recipient profile matches. After completing a search for recipient profile matches (as in Step 4), Database 101 conducts a new search either on a periodic basis or upon the occurrence of a "triggering event"—that is, activity taking place in connection with another user (not User A) indicating a possibility of a recipient profile match with respect to such other user where none was before. With respect to such other user, triggering events may include, for example, his creating an outgoing MCIP, his updating an outgoing MCIP, and/or the Service's updating his user profile. For example, where, in the first example above, such other user creates a new special-purpose outgoing MCIP, Database 101 may regard that activity as a triggering event and therefore conduct a search for a recipient profile match with respect to such user to determine, among other things, whether such special-purpose outgoing MCIP indicates that such user "is planning to visit Las Vegas."

Database 101 may be programmed to employ additional processing techniques with the aim of increasing the efficiency of processing in this Step 5. For example, with respect to a particular subject CIP, Database 101 may not conduct a search for a recipient profile match, or monitor triggering events, with respect to users whose Codes 3011 appear on User A's delivery log as corresponding to the subject CIP. For another example, as another measure to reduce the overall population of users with respect to whom Database 101 may conduct a search, or monitor triggering events, in this Step 5, Database 101 may, in the previous step, compile a list of users with respect to whom, though there was no recipient profile match, there was a "near match." A near match may mean, for example, that such user meets most (though not all) of the selected segmentation parameters (and the further selection, if any, within each selected parameter); particularly where, for example, the segmentation parameter such user does not meet is temporal. That is, considering the fourth example above, assume that in Step 4 Database 101 found that a particular user met three of the four segmentation parameters, but that, with respect to the fourth such parameter, found that such user's daughter's birthday was three weeks away, not "less than 2 weeks away"; assume further that Database 101 included such user's Code 3011 on a list of near matches. Then, in this Step 5, Database 101 may be programmed to search for recipient profile matches, or monitor triggering events, only with respect to users appearing on such list.

Database 101 may at this point generate or update the report for User A, and generate or update messages for other users, all as described above in connection with Step 4.

Where there is one or more Code 3011 on the final list, in Steps 5A, 5B, and 5C, respectively, Database 101 delivers the final list to Gateway 104, Gateway 104 presents the CIP for downloading to one or more of each recipient's Devices 106, and each recipient downloads such CIP to one or more of such devices, all as described above for Steps 4A, 4B, and 4C. The process continues with Database 101's compiling a final list of still next-phase recipients.

System 10 (and/or System 60) may also enable, and users may also employ, other automatic delivery processes (some of which are discussed below), either as alternatives or supplements to the preferred process, where certain such other automatic delivery processes are analogous to the other (i.e., not "preferred") automatic updated processes discussed above and are therefore not further discussed here. For example, where the overall selection process of Step 3 (as described above) involves only a "third selection process," such overall selection process may also involve, as in the preferred automatic update process, a first selection process (the same as or analogous to that described above) or a second selection process (the same as or analogous to that described above), or a combination of both. That is, for example, assuming User A is an on-line seller of fine wines and it has created an outgoing special-purpose MCIP promoting a special wine-tasting event it is hosting at a hotel in Las Vegas, including in it an expiration date for the day after the event is to take place; User A may define a recipient profile by selecting four parameters—namely, any user (1) "in my Master Contact List," (2) "who does not live or work in Las Vegas," but (3) "who will be in Las Vegas," (4) "on June 20" (where information corresponding to the second through fourth parameters can be gathered, e.g., from users' outgoing CIPs). Preferably, in such example, Database 101 would first identify users meeting the first parameter, and thereafter search for recipient profile matches, or monitor triggering events, only with respect to such users. For another example, in the third example above, where such CIP (and such discount) is to expire, with respect to a particular recipient of it, thirty days after its delivery to that particular recipient, in Step 4A or 5A, Database 101 may, in deriving from User A's MCIP a CIP for delivery to a particular recipient, include in it the appropriate expiration date. For another example, where, as in the third example above, the sending user may wish to specify that the subject CIP or, for example, the discount represented by such CIP be "non-transferable," System 10 may include means for avoiding or minimizing the unauthorized further transfer or use of such CIP. That is, for example, Database 101 may include in such CIP an "enable downloading" toggle instruction (in, e.g., Block 305 of sample MCIP 30 shown in FIG. 3), in effect enabling the downloading of such CIP to the Devices 106 of intended recipients, but disabling the downloading of such CIP to the Devices 106 of unintended recipients (to whom the intended recipients may attempt to transfer, or forward, such CIP). For another example, in Step 4A or 5A, Database 101 may, in deriving from User A's MCIP a CIP for delivery to a particular recipient, include in the appearance of it the name of the intended recipient (as in, e.g., "a special discount for Peter Leung"), in effect enabling the use of the discount represented by such CIP only to the user (i.e., the intended recipient) whose credit card displays the same name as displayed in the CIP. For another example, in same Step 4A or 5A, Database 101 may include in the subject CIP another form of "intended recipient identifier"—for example, a code (either the intended recipient's User Identification Code 3011 or another code) sufficient to distinguish one intended recipient from other intended recipients. When, for example, such CIP is uploaded to the web site of the sending user in the course of redeeming such discount in an on-line transaction, such intended recipient identifier is made known to the sending user, in effect enabling the sending user to limit use of such discount only to the intended recipient or to limit use of such discount only to a one-time redemption (either by the intended recipient or another user to whom such CIP was transferred). These or analogous means may be employed as well in other processes to avoid or minimize the unauthorized further transfer or use of a particular CIP, whether the CIP is presented for downloading to the intended recipient by the Service (as in, e.g., Transfer Type 5) or by another user (as in, e.g. Transfer Type 1). For another example, like as explained above in the example of the telecommunications service provider as a Connected CIP Distributor 608, the Service may enable a sending user (e.g., User A) to select, and User A may select, a segmentation parameter targeting other users based on their current locations while using mobile devices, either alone or together with other segmentation parameters, specifying that, if a recipient profile match is found with respect to a particular other user (and subject to such other user's preferences), the subject CIP be delivered to the mobile Device 106 in use. In such case, the generation or provision of information concerning the current location of one or more other users may be regarded by the Service as a triggering event. This and other information concerning other users may be generated by the Service and/or provided to the Service; and the delivery of the subject CIP may be made by the Service and/or by a Connected CIP Distributor 608.

In the preferred process, as described above and shown in FIG. 9, (1) User A's CIP is not stored in the recipients' Master Contact Lists, and (2) User A's CIP, though included in one or more communications to each recipient from Gateway 104, is not necessarily distributed by the Service to all of such recipient's Devices 106 or to such recipient's chosen Distributors 608 of his incoming CIPs (if any). Under similar reasoning as discussed above in connection with automatic update processes, the storage (or not) of a CIP in a recipient's Master Contact List and the distribution (or not) of a CIP to all of a recipient's Devices 106 or Distributors 608 are treated herein as processes separate from this automatic delivery process. However, it should be understood that such storage and/or distribution of CIPs may be included in this preferred process (and/or other automatic delivery processes).

Automatic Storage Processes

In System 10 (and/or System 60), as shown in FIGS. 1-1B, a user's contact information may be stored in a database by a variety of methods, including, without limitation, those discussed below.

Figure 10:
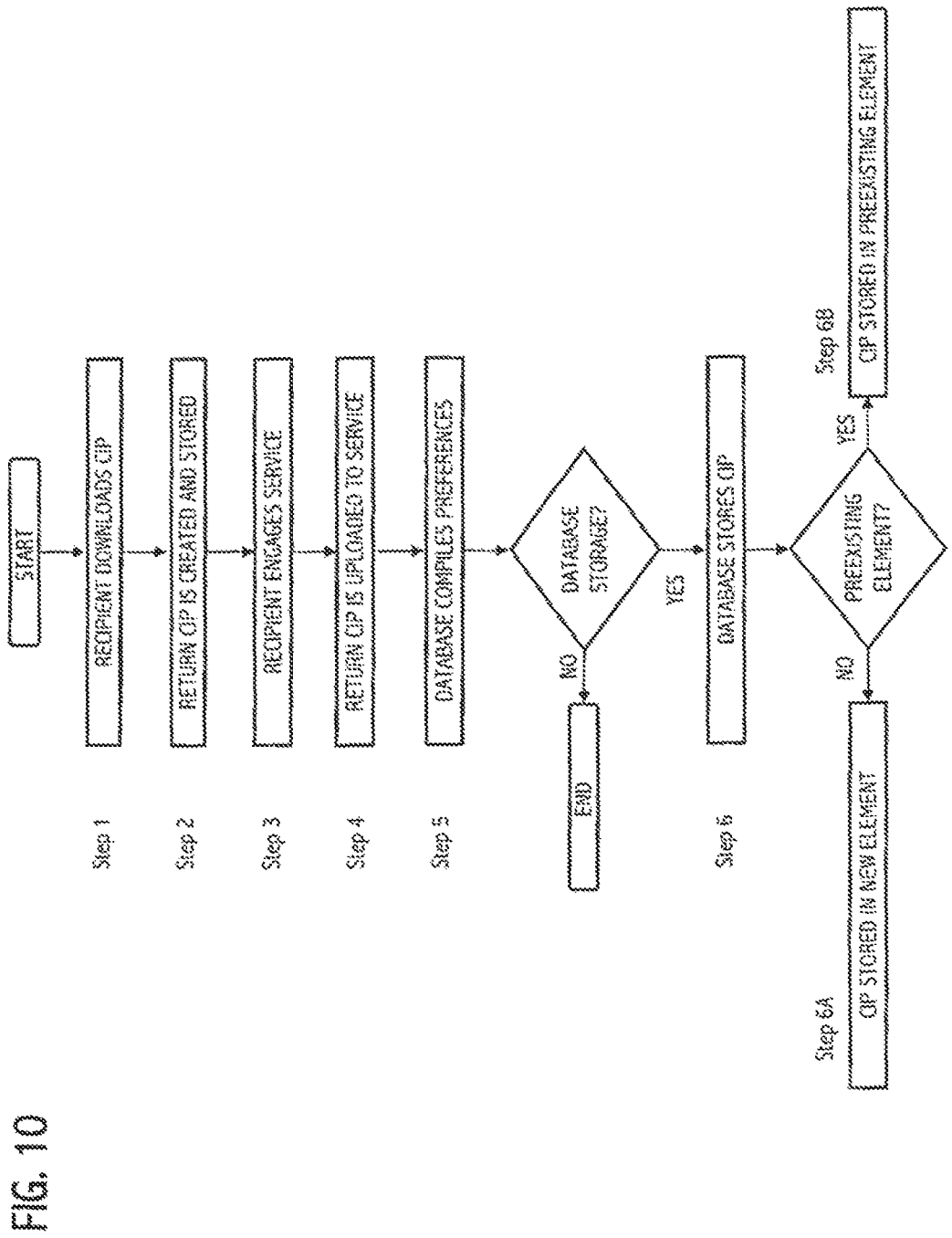
FIG. 10 is a flow diagram illustrating the sequence of steps in an automatic storage process according to one embodiment of the present invention.

System 10 may enable, and such user may employ, the "preferred" automatic storage process involving the multiple steps shown in FIG. 10. Referring initially to FIGS. 1 and 10, in Step 1, a user (e.g., User B) downloads and saves an incoming CIP to a Device 106 in Category 1061, as described above, where such CIP may have been presented for downloading to such device through, among other means, any of the automatic transfer processes described above.

Figure 11:
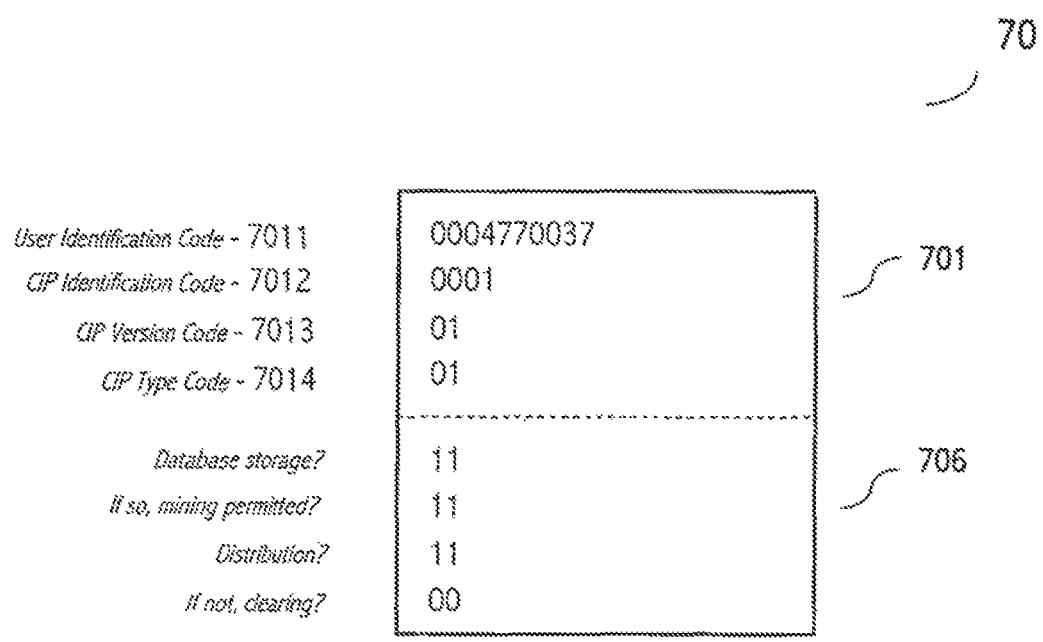
FIG. 11 illustrates the contents of a sample "Return Contact Information Profile" (described below), according to one embodiment of the present invention.

In Step 2, the Software Module on such device and/or software in the incoming CIP itself (in, for example, Block 305 of sample MCIP 30 shown in FIG. 3) creates and temporarily stores on the device a "Return CIP," a sample of which is shown in FIG. 11. Referring to FIG. 11, Return CIP 70 is a software file corresponding to the downloaded incoming CIP (e.g., sample MCIP 30 shown in FIG. 3) and may include in Information Block 701 (or "Block 701") a User Identification Code 7011 (or "Code 7011"), CIP Identification Code 7012 (or "Code 7012"), CIP Version Code 7013 (or "Code 7013"), and/or CIP Type Code 7014 (or "Code 7014") corresponding, respectively, to Codes 3011-3014 of the downloaded incoming CIP. For example, if, as shown in FIG. 3, Code 3011 in the downloaded incoming CIP is "0004770037," then Code 7011 in corresponding Return CIP 70 is also "0004770037." A Return CIP may contain contact information data and/or other information contained in the corresponding incoming CIP; however, sample Return CIP 70 does not contain the information contained in Blocks 302-305 of sample MCIP 30. A Return CIP may, but need not, also contain other information. For example, as shown in FIG. 11, Return CIP 70 contains in Information Block 706 (or "Block 706") certain of User B's Specific Preferences for the corresponding incoming CIP. User B may have the opportunity to set such preferences, for example, during a download routine as described above. For example, during downloading, User B may be queried whether he wishes the incoming CIP to be stored in Database 101 (and if so, whether he permits the mining of the CIP for automatic radial mining processes) and/or whether he wishes the incoming CIP to be distributed by the Service as in, for example, the preferred automatic portability process described below (and if not, whether he wishes to take advantage of a clearing process, also described below, that may be included in an automatic portability process); where, for example, as shown in FIG. 11, code "11" means "Yes," code "01" means "No," and code "00" means "no response." If User B indicates during downloading that he wants neither database storage nor distribution of the incoming CIP, then, though the downloaded incoming CIP may be saved on his device, a corresponding Return CIP may not be created and stored thereon. The Return CIP may be stored on the device in, for example, a "Return CIPs folder." Preferably, User B may at any time determine the number of Return CIPs stored on a Device 106; for example, the Software Module may include a counter of such Return CIPs that can be viewed at any time by User B.

In Step 3, referring to FIGS. 1 and 10, User B uses such Device 106 to engage the Service through Interface 102 via the Internet 103, where he is presented with, for example, Display Screen 20 shown in FIG. 2.

In Step 4, User B may, for example, click on "My MCL" Block 202 of Display Screen 20, where he is presented with another screen (or series of screens) enabling him to, among other things, upload to the Service the Return CIP(s) stored on such device. The Service prompts User B through the process of uploading Return CIPs, which are, for example, retrieved from the Return CIPs folder on User B's device and transferred via the Internet 103 through Interface 102 to Database 101. Preferably, the uploaded Return CIPs are then erased from such device.

In Step 5, Database 101 may first use User B's User Identification Code 3011 to retrieve and review his General Preferences concerning the storage of incoming CIPs in his Master Contact List (in his Storage Space 1012 in Database 101, as shown in FIG. 1A). As the Service may enable a user to set different General Preferences for each type of incoming CIP, Database 101 may extract from the Return CIP(s) the CIP Type Code 7014 to determine, for each Return CIP, the applicable General Preferences. Database 101 may then, for each Return CIP, compile the Specific Preference (if any) concerning whether User B wants the corresponding incoming CIP stored in his Master Contact List, comparing such Specific Preference with such General Preferences to determine, for each corresponding incoming CIP, the prevailing preference. In compiling such Specific Preference, Database 101 may (1) retrieve it from the Return CIP, and/or (2) in such cases where the General Preferences call for no storage of the corresponding incoming CIP and either the Return CIP does not contain any Specific Preferences (i.e., the Return CIP does not have a Block 706 as shown for Return CIP 70 in FIG. 11) or the Return CIP contains a "no response" code for such Specific Preference, search User B's Master Contact List for a CIP having, for example, a Code 3011 and a Code 3012 the same as, respectively, the Code 7011 and the Code 7012 contained in the Return CIP, and, if such CIP is found, assign such Specific Preference (if any) assigned to it to the corresponding incoming CIP. For each Return CIP, if the prevailing preference for the corresponding incoming CIP indicates that User B does not want the corresponding incoming CIP stored in his Master Contact List, then, for such Return CIP, the process ends without the storage of the corresponding incoming CIP in User B's Master Contact List. However, for each Return CIP, if the prevailing preference for the corresponding incoming CIP indicates that User B wants the corresponding incoming CIP stored in his Master Contact List, then, for such Return CIP, the process continues with Step 6.

In Step 6, referring additionally to FIG. 1A, Database 101 may use Code 7011 in the Return CIP to locate the Storage Space 1011 of the user (e.g., User A) having the same User Identification Code 3011 and may use Code 7012 in the Return CIP to retrieve from such storage space the outgoing CIP having the same CIP Identification Code 3012 (i.e., the corresponding incoming CIP). Database 101 may then determine whether there is a preexisting storage element by searching User B's Master Contact List in his Storage Space 1012 for an incoming CIP having the same Codes 3011 and 3012 as those in the corresponding incoming CIP. If none such CIP is found, then the process continues and ends with Step 6A, where Database 101 stores the corresponding incoming CIP in a new storage element; and, if the Return CIP contains Specific Preferences, in, for example, Block 706 of Return CIP 70 shown in FIG. 11, extracts such preferences from the Return CIP and stores such preferences as assigned to the corresponding incoming CIP. If such CIP is found, then the process continues and ends with Step 6B, where Database 101 stores the corresponding incoming CIP in the same storage element in which such CIP is stored (the preexisting element), overwriting such CIP (except where such CIP has a CIP Version Code 3013 equal to or greater than that in the corresponding incoming CIP, in which case, such CIP is not overwritten and Database 101 may discard the corresponding incoming CIP); and, if the Return CIP contains Specific Preferences, extracts such preferences from the Return CIP and stores them as assigned to the corresponding incoming CIP (together with any Specific Preferences previously stored as assigned to such CIP and not duplicative of, or overridden by, any such preference extracted from the Return CIP). Preferably, where such CIP is found and it has the same Codes 3011, 3012, and 3013, but a different character code (if any) in, for example, Block 303, as those in the corresponding incoming CIP, the corresponding incoming CIP is stored in a new storage element.

System 10 (and/or System 60) may also enable, and a user may also employ, other automatic storage processes (some of which are discussed below), either as alternatives or supplements to the preferred process. For example, a Return CIP may be created and temporarily stored on another Device 106 (not just in Category 1061) upon the downloading of an incoming CIP to such other device; and, User B may use such other device to engage, and upload Return CIPs to, the Service (e.g., using a Device 106 in Category 1063, through Gateway 104 via Networks 105). For another example, in a download routine as described above, a Return CIP may contain an "accepted/rejected indicator" (where, e.g., a code of "11" in the indicator means "accepted" and a code of "00" means "rejected"). That is, for example, a "rejected" code may be treated by Database 101 as a "Specific Preference" indicating that User B does not want the corresponding incoming CIP stored in his Master Contact List (absent a Specific Preference to the contrary). For another example, as discussed above, a Return CIP may include supplementary information, such as a voice activation stamp, a digital photograph, information concerning the manner in which a user wishes to categorize the incoming CIP in the folders of his Master Contact List (which may be derived from the manner in which he categorizes the incoming CIP in the folders of his device-based address book), and/or other information. That is, for example, when User B downloads and saves an incoming CIP of User A (e.g., a friend named "Bob") on his mobile phone, he may record a voice activation stamp for the CIP as a whole (e.g., "Bob's CIP") and/or for one or more of the fields of information in the CIP (e.g., "Bob's cell," for a mobile telephone number field) to be used in voice-activated speed dialing; he may assign to the CIP a photograph of his friend to be used as a caller ID; and he may save the CIP in the "Friends and Family" folder in his device-based address book. On the device in use, such supplementary information may be stored as corresponding to the downloaded incoming CIP. Such supplementary information may also be included in the corresponding Return CIP, such that when the Return CIP is uploaded to the Service, such information may also be stored in User B's Master Contact List as corresponding to the corresponding incoming CIP. For another example, a Return CIP stored on a Device 106 may be modified (or even deleted) before it is uploaded to the Service. That is, for example, if during such time User B re-sets (i.e., adds to, subtracts from, or changes) the supplementary information for the incoming CIP saved on such device, the corresponding Return CIP may be modified to reflect his re-setting of such supplementary information. For another example, the Service may, at any time that may be appropriate for User B to upload Return CIPs from his device in use to the Service (e.g., each time he engages the Service), suggest that he do so and enable him to do so without, for example, clicking on "My MCL" Block 202 of Display Screen 20 shown in FIG. 2. Indeed, at any such time, the Service may itself initiate the uploading of Return CIPs (subject to User B's preferences), where it may, for example, retrieve and upload Return CIPs (if any) stored on User B's device in use. For another example, in Step 6 of the preferred process, for each Return CIP, if, when retrieving the corresponding incoming CIP from User A's Storage Space 1011, Database 101 determines that such CIP has a CIP Version Code 3013 that is greater than the CIP Version Code 7013 in the Return CIP, Database 101 may (unlike as described above) not store such CIP in User B's Master Contact List. Further, in such case, if the corresponding incoming CIP is not already stored in a preexisting element in User B's Master Contact List, Database 101 may, for example, generate a message for inclusion in User B's running report stating that the downloaded incoming CIP is an outdated CIP and/or generate a message for inclusion in User A's running report requesting permission to send to User B the updated CIP in a manner analogous to that described in the preferred automatic update process. For another example, the Service may enable a user (e.g., User B) to set a General Preference indicating that he wishes, where possible, to have stored in his Master Contact List CIPs in a particular alphabet (e.g., the Roman alphabet). Assuming, then, in retrieving the corresponding incoming CIP from User A's Storage Space 1011 in Step 6 of the preferred process, Database 101 finds one corresponding incoming CIP having one character code and another corresponding incoming CIP having another character code, then Database 101 may retrieve the corresponding incoming CIP having the character code (e.g., "001") indicating that such CIP is in the Roman alphabet. For another example, for each Return CIP, if the prevailing preference for the corresponding incoming CIP indicates that User B does not want the corresponding incoming CIP stored in his Master Contact List, then, for such corresponding incoming CIP, Database 101 may determine whether there is a preexisting storage element and, if there is a preexisting element, clear from it the incoming CIP stored therein. In embodiments that include this clearing process, a Return CIP may be created and stored on User B's device during downloading of the incoming CIP even if, during such downloading, he sets Specific Preferences indicating that he wants neither database storage nor distribution of the corresponding incoming CIP. For another example, a Return CIP may be created and temporarily stored on a Device 106 at times other than during the downloading of the corresponding incoming CIP to such device. That is, for example, when User B deletes from his device an incoming CIP previously saved thereon, where the corresponding Return CIP (if any) previously created during the saving of the incoming CIP is no longer stored on the device (e.g., it was already uploaded to the Service), a new corresponding Return CIP may be created and temporarily stored on the device containing, for example, a "rejected" indicator meaning that, in an embodiment that includes the clearing process, when the Return CIP is uploaded to the Service and absent a Specific Preference to the contrary, the corresponding incoming CIP is cleared from the preexisting storage element (if any) in User B's Master Contact List. For a final example, a Return CIP may be created upon User B's downloading of an incoming CIP (in a manger analogous to that described above for Devices 106) to, for example, an on-line address book maintained at a Distributor 608 (e.g., AOL) and/or upon the deletion of an incoming CIP from such on-line address book, where such distributor's delivery of such Return CIP to the Service via the connection between them is analogous to Step 4 of the preferred process, as shown in FIG. 10. In such case, a Return CIP may include some form of "recipient identifier" (discussed below) and/or some form of "distributor identifier" (analogous to a "device identifier," also discussed below).

Preferably, whether the uploading of Return CIPs is initiated by User B or the Service, the Service advises User B (prior to such uploading) that he should abandon the process if he is not using one of his own Devices 106 (e.g., he is using a friend's desktop computer to engage the Service) or he does not otherwise wish to upload Return CIPs, to avoid, for example, the storage in his Storage Space 1012 of corresponding incoming CIPs intended for another (e.g., his friend). As another means to avoid the Service's processing for one user of Return CIPs "intended" for another user, a Return CIP may include a "recipient identifier." The recipient identifier may be the User Identification Code 3011 of the user to whose device the incoming CIP is downloaded. That is, where a user's Device 106 has on it a Software Module and the Module has registered within it the user's User Identification Code 3011, a Return CIP created on such device may include the Code 3011 as a recipient identifier. Therefore, for example, if User B is using one of User A's Devices 106 to engage the Service and Return CIPs are uploaded from the device to the Service, then, for each Return CIP that includes a recipient identifier, Database 101 associates such Return CIP not with the user who is engaging the Service (User B), but with the user whose Code 3011 is the recipient identifier in the Return CIP (User A), and Database 101 therefore stores (or not) the corresponding incoming CIP in User A's Master Contact List. For another example, if User B has an individual account with the Service and is using one of his own Devices 106 to engage the Service for limited access to his employer's business account, uploaded Return CIPs containing as a recipient identifier User B's individual account Code 3011 are associated by Database 101 with User B's individual account, not with his employer's business account. If such device is a registered Device 106 for both User B's individual account and his employer's business account, and User B uses such device for both personal and professional purposes, then, preferably, the Software Module on such device has registered within it User B's individual account Code 3011 (not his employer's business account Code 3011), whereby Return CIPs created on such device contain such code as a recipient identifier. The Service may also disable the uploading of Return CIPs under certain circumstances; for example, from a device being used to engage the Service for only limited access to an account.

A user may at any time upload one or more CIPs (or the Codes 3011 and 3012 of one or more CIPs, for Database 101's retrieval of such CIPs from Storage Space 1011) from a device to the Service and/or download one or more CIPs from the Service to a device, where, if applicable, at both the Service and on the device, an updated CIP overwrites an outdated CIP. That is, for example, a user may use a Device 106 in Category 1061 to engage the Service through Interface 102 via the Internet 103, where he is presented with, for example, Display Screen 20 shown in FIG. 2; he may click on "My MCL" Block 202, where he is presented with another screen (or series of screens) enabling him to, among other things, synchronize (in whole or in part) the address book on his device in use with his Master Contact List stored in his Storage Space 1012 in Database 101. The Service prompts the user through this process of uploading and/or downloading CIPs, where the user may, for example, select from his Master Contact List CIPs to be downloaded to his device in use, select from his device CIPs to be uploaded to his Master Contact List, and/or command the Service to perform a complete synchronization, which may be done employing one of a number of possible protocols (preferably selected by the user) and which may involve, among other things, a combination of uploading and downloading, as well as Database 101's comparison of Codes 3011, 3012, and/or 3013 in multiple CIPs. Where, for example, a user selects from his Master Contact List CIPs to be downloaded to his device in use, he may select CIPs individually and/or in groups (e.g., all CIPs in his Master Contact List). That is, for example, assuming a user is engaging the Service using a mobile phone newly issued to him by his employer, and he is to use this device for professional purposes only, he may select as a group of CIPs to be downloaded to the device all professional and personal/professional incoming CIPs (i.e., those having a Code 3014 of "02" or "03"). While engaging the Service using a particular Device 106, a user may, in a manner analogous to that described immediately above, command the Service to send one or more CIPs stored in his Master Contact List for downloading to one or more of his other Devices 106, upon which command, Database 101 delivers the selected CIP(s) together with the user's preferences to Gateway 104 and, according to the user's preferences, Gateway 104 generates and sends the user one or more communications via the Internet 103 and/or Networks 105, including in such communication(s) the selected CIP(s). Similarly, while engaging the Service using a particular Device 106, a user may command the Service to send him one or more CIPs stored in his Master Contact List for storage at one or more of his Distributors 608 (e.g., in an on-line address book), following which command, the Service delivers the selected CIP(s) to such Distributor(s) 608 via the connection(s) between the Service and such distributor(s), as shown in FIG. 6. In delivering CIPs, as described above in this paragraph, for downloading to a user's Devices 106 and/or for storage at a user's Distributors 608, Database 101 may, for each such CIP, first enable in it in Block 305 a "do not create a Return CIP" toggle instruction. The Service may maintain and store in Database 101, for each user, a "distribution log," which, for each outgoing CIP and/or incoming CIP that the Service has sent (through any of the processes described herein) to any of such user's registered Devices 106 and/or Distributors 608, logs, for each such CIP, all of such devices and/or distributors to which the Service has sent such CIP. Such distribution log may be employed, for example, to streamline the downloading of incoming CIPs in the user's Master Contact List from the Service to a particular Device 106. That is, for example, the user can instruct the Service to send to a particular Device 106 only those incoming CIPs stored in his Master Contact List that the Service has not previously sent to such device. In certain embodiments, the Service may also enable the uploading to the Service and/or the downloading from the Service of contact information data that is not contained in and/or represented by a CIP; moreover, the Service may enable the storage of such non-CIP incoming contact information data in a user's Master Contact List in his Storage Space 1012 in Database 101. Preferably, the Service may at any time (in a process initiated by the user or the Service itself), automatically construct from the information in such non-CIP incoming contact information data one or more search requests for searching the Directory for CIPs that may correspond to such non-CIP information, in a manner analogous to that described above for Transfer Types 5 and/or 6, and thereby assist a user in replacing non-CIP incoming contact information data with incoming CIPs.

A user may otherwise manage his Master Contact List in a manner analogous to the way he manages a device-based or on-line address book, where common address book functions may be enhanced—and still other functions may be enabled—as described above for device-based address books. He may do so, for example, using any Device 106 in Category 1061 to engage the Service through Interface 102 via the Internet 103, where he is presented with, for example, Display Screen 20 shown in FIG. 2; clicking on "My MCL" Block 202, he is presented with another screen (or series of screens) enabling him to, among other things (and in addition to functions previously described for device-based address books), set/re-set Specific Preferences for incoming CIPs, delete incoming CIPs (whereupon the Service may, according to the user's preferences, distribute "Clearing CIPs" to his other Device(s) 106, as shown in Steps 6A through 9A of FIG. 12A and discussed below), and/or command the Service to transfer (or forward) one or more incoming CIPs to another user. Where a user has stored in his Master Contact List multiple incoming CIPs (e.g., a personal CIP and a professional CIP) corresponding to a single other user, he may (for any or all such other users) view such CIPs as separate entries or merge them for viewing only as a single entry (where such correspondence is established by the common User Identification Code 3011 contained in each such CIP). A user may also arrange for group access to all or a portion of his Master Contact List, not in this case by permitting another user limited access to his account (as described in an example above), but rather by permitting access to his Master Contact List through another account. That is, for example, using again the example of the distributor of medical devices (a business user), the user may assign a certain Specific Preference to an incoming CIP not only by assigning it directly to the particular CIP, but alternatively by assigning it to a particular folder in the Master Contact List and then categorizing the CIP in that folder. Then, for example, each incoming CIP categorized in the folder called "Current and Prospective Customers in Southwest Region" is assigned a Specific Preference permitting designated other users to access that CIP through their own accounts. Here, the business user may designate a certain member of its sales staff by selecting that individual's personal or professional CIP. The Service uses the Code 3011 in the CIP to establish the "link" between the business user's account and the individual user's account. Therefore, the individual user is permitted access to the incoming CIPs in that particular folder in the business user's Master Contact List. Such access may mean that, when engaging the Service through his individual account and accessing his own Master Contact List, such individual may view (and only view) such incoming CIPs. Alternatively, such access may mean that, when the individual is next engaging the Service through his own account, the Service presents such incoming CIPs for storage in his Master Contact List and/or downloading to his device in use. In still another alternative, the business user's categorizing of a particular incoming CIP in that folder may be treated by the Service as a request to transfer the CIP to the individual user through Gateway 104 via the Internet 103 and/or Networks 105, where the Service may do so in the manner defined by the individual user's preferences.

Automatic Portability Processes

In System 10 (and/or System 60), as shown in FIGS. 1-1B, a user's contact information may be available on and/or accessible through multiple devices by a variety of methods, including, without limitation, those discussed below.

Figure 12:
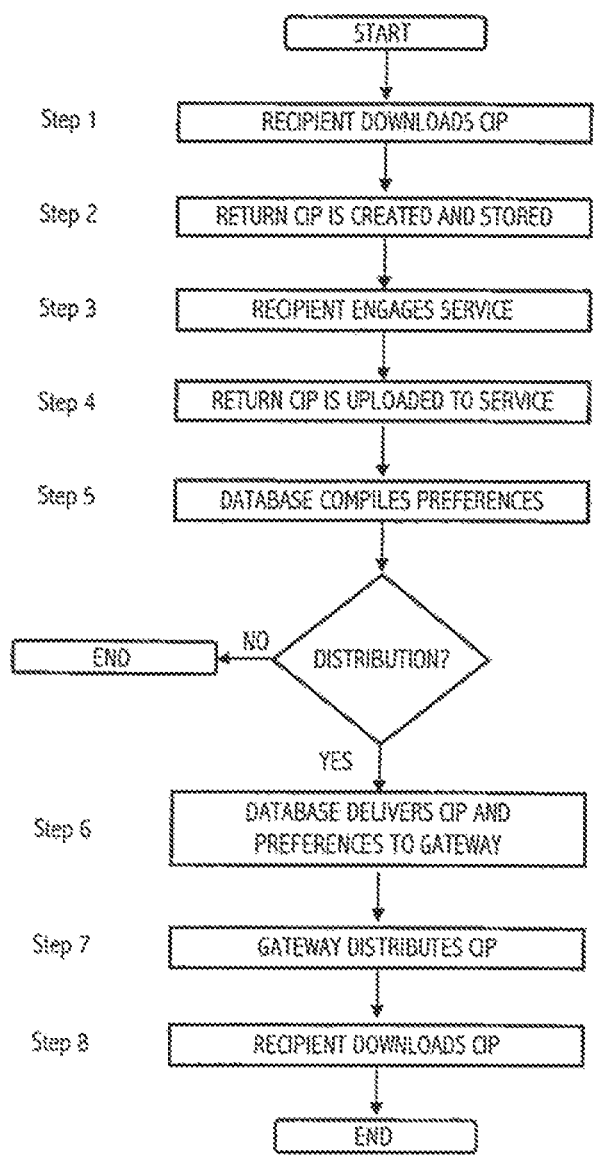
FIG. 12 is a flow diagram illustrating the sequence of steps in an automatic portability process according to one embodiment of the present invention.

System 10 may enable, and such user may employ, the "preferred" automatic portability process involving the multiple steps shown in FIG. 12. Referring initially to FIGS. 1, 11, and 12, in Step 1, a user (e.g., User B) downloads and saves an incoming CIP to a Device 106 in Category 1061; in Step 2, a Return CIP is created and temporarily stored on the device, which Return CIP may contain certain Specific Preferences indicating, among other things, whether User B wishes the corresponding incoming CIP to be distributed by the Service as described below; in Step 3, User B uses such Device 106 to engage the Service through Interface 102 via the Internet 103; and in Step 4, the Return CIP(s) stored on such device are uploaded to the Service, all as described above for Steps 1 through 4 of the preferred automatic storage process shown in FIG. 10.

In Step 5, Database 101 may first use User B's User Identification Code 3011 to retrieve and review his General Preferences concerning the distribution of incoming CIPs to his Devices 106, including whether he wants such distribution (e.g., "Yes") and/or how he wants such distribution (e.g., "personal incoming CIPs going to my personal e-mail address and professional incoming CIPs going to my professional e-mail address"). In a System 10 where the Service may perform both this process and the preferred automatic storage process discussed above and shown in FIG. 10, the Service may perform both such processes simultaneously; for example, in this Step 5, where Database 101 retrieves User B's General Preferences concerning the distribution of incoming CIPs to his Devices 106, Database 101 may simultaneously retrieve his General Preferences concerning the storage of incoming CIPs in his Master Contact List, as described above in Step 5 of the preferred automatic storage process. As the Service may enable a user to set different General Preferences for each type of incoming CIP, Database 101 may extract from the Return CIP(s) the CIP Type Code 7014 to determine, for each Return CIP, the applicable General Preferences. Database 101 may then, for each Return CIP, compile the Specific Preferences (if any) concerning whether and/or how User B wants the corresponding incoming CIP distributed to his Devices 106, comparing such Specific Preferences with such General Preferences to determine, for each corresponding incoming CIP, the prevailing preferences. In compiling such Specific Preferences, Database 101 may (1) retrieve them from the Return CIP, (2) in such cases where either the Return CIP does not contain any Specific Preferences (i.e., the Return CIP does not have a Block 706 as shown for Return CIP 70 in FIG. 11) or the Return CIP contains a "no response" code for such Specific Preferences, search User B's Master Contact List for a CIP having, for example, a Code 3011 and a Code 3012 the same as, respectively, the Code 7011 and the Code 7012 contained in the Return CIP, and, if such CIP is found, assign such Specific Preferences (if any) assigned to it to the corresponding incoming CIP, and/or (3) where the user wishes to store the corresponding incoming CIP in his Master Contact List, the Return CIP contains within it (as described above) information concerning the manner in which he wishes to categorize the CIP in the folders of his Master Contact List, and the folder in which he wishes to categorize such CIP has assigned to it (as also described above) such Specific Preferences, assign such Specific Preferences to the corresponding incoming CIP. For example, assume User B is a member of the sales team for a distributor of medical devices and, in downloading an incoming CIP to a particular device, he categorizes the CIP in his device-based address book in a folder called "promising sales leads," where such information may be included in the corresponding Return CIP. When such Return CIP is uploaded to the Service while User B is engaging the Service through his individual account, the Service may use such information to store and categorize the corresponding incoming CIP in his Master Contact List, in a folder also called "promising sales leads." Assuming further that User B previously assigned to such folder a Specific Preference indicating that all corresponding incoming CIPs categorized therein are to be distributed to, among other of his registered Devices 106, his registered device number "4," which is his regional manager's desktop computer, then, User B's prevailing preferences concerning distribution of the corresponding incoming CIP will include the means for Gateway 104's communicating with such device. (If the corresponding incoming CIP is not initially categorized in such folder in User B's Master Contact List, but in managing his Master Contact List he later categorizes such CIP in such folder, then the Service may at that time, with reference to, among other things, User B's distribution log, distribute such CIP to all devices (if any) identified in the folder's Specific Preferences to which such CIP was not previously distributed.) For each Return CIP, if the prevailing preference for the corresponding incoming CIP indicates that User B does not want the corresponding incoming CIP distributed to his Devices 106, then, for such Return CIP, the process ends without such distribution of the corresponding incoming CIP. However, for each Return CIP, if the prevailing preference for the corresponding incoming CIP indicates that User B wants the corresponding incoming CIP distributed to his Devices 106, then, for such Return CIP, the process continues with Step 6.

In Step 6, referring additionally to FIG. 1A, for such Return CIP, Database 101 retrieves the corresponding incoming CIP and delivers it to Gateway 104, together with User B's preferences concerning how such CIP is to be distributed to his Devices 106. In order to retrieve such CIP, Database 101 may use Code 7011 in the Return CIP to locate the Storage Space 1011 of the user (e.g., User A) having the same User Identification Code 3011 and may use Code 7012 in the Return CIP to retrieve from such storage space the outgoing CIP having the same CIP Identification Code 3012 (i.e., the corresponding incoming CIP). If, in this Step 6, Database 101 were to retrieve two or more different corresponding incoming CIPs (i.e., corresponding to two or more different Return CIPs), then, using User B's preferences concerning how each of such CIPs is to be distributed to his Devices 106, Database 101 may compile a list defining each selected means of communication with User B (e.g., e-mail at personal e-mail address) and, for each such means of communication, identifying the corresponding incoming CIP(s) (one or more) to be included in a communication with User B by such means (in Step 7 below); and, if such were the case, Database 101 may in this step deliver such list to Gateway 104. However, it is assumed herein for purposes of simplification that, in this Step 6, Database 101 retrieves one corresponding incoming CIP.

In Step 7, referring still to FIGS. 1 and 11, Gateway 104, as directed by such preferences, generates and sends one or more separate communications to User B via the Internet 103 and/or Networks 105, including in each such communication the corresponding incoming CIP for downloading to one or more Devices 106. Where particular communications services enable the delivery of CIPs to a particular Device 106 via the Internet 103 and/or Networks 105, such communication may be, for example, through e-mail service. Assuming User B has set preferences indicating that he wishes to receive distributed CIPs as attachments to e-mail messages sent to a certain e-mail address and having a certain subject line (e.g., "Distributed CIPs"), Gateway 104 generates and addresses such an e-mail message, includes in it, for example, a Service-standard note, attaches to it the corresponding incoming CIP, and sends it to User B via the Internet 103. For another example, assuming User B's preferences also indicate that he wishes to receive distributed CIPs through telephone calls placed to his mobile phone at the number he specified, Gateway 104 may initiate a call to such mobile phone and, after a connection is established, either by User B's answering the call or by connection to the his data-enabled voicemail service or answering machine, Gateway 104 may transmit a short automated voice message indicating that the Service is sending a distributed CIP and then upload the corresponding incoming CIP for transmission over such connection via Networks 105. Gateway 104 may send distributed CIPs to recipients via the Internet 103 and/or Networks 105 through other internet or other communications services, in a manner analogous to those described herein for e-mail and telephone services.

Finally, in Step 8, referring still to FIGS. 1 and 11, User B may download the corresponding incoming CIP to one or more of his other Devices 106, as described above. If the corresponding incoming CIP is an updated CIP, then, on those Devices 106 on which the outdated CIP was previously saved, the updated CLP overwrites the outdated CIP (where the correspondence between the outdated CIP and updated CIP is established by their matching Codes 3011 and 3012, and where the updated CIP's preference over the outdated CIP is established by the stepped up CIP Version Code 3013 in the updated CIP).

Figure 12A:
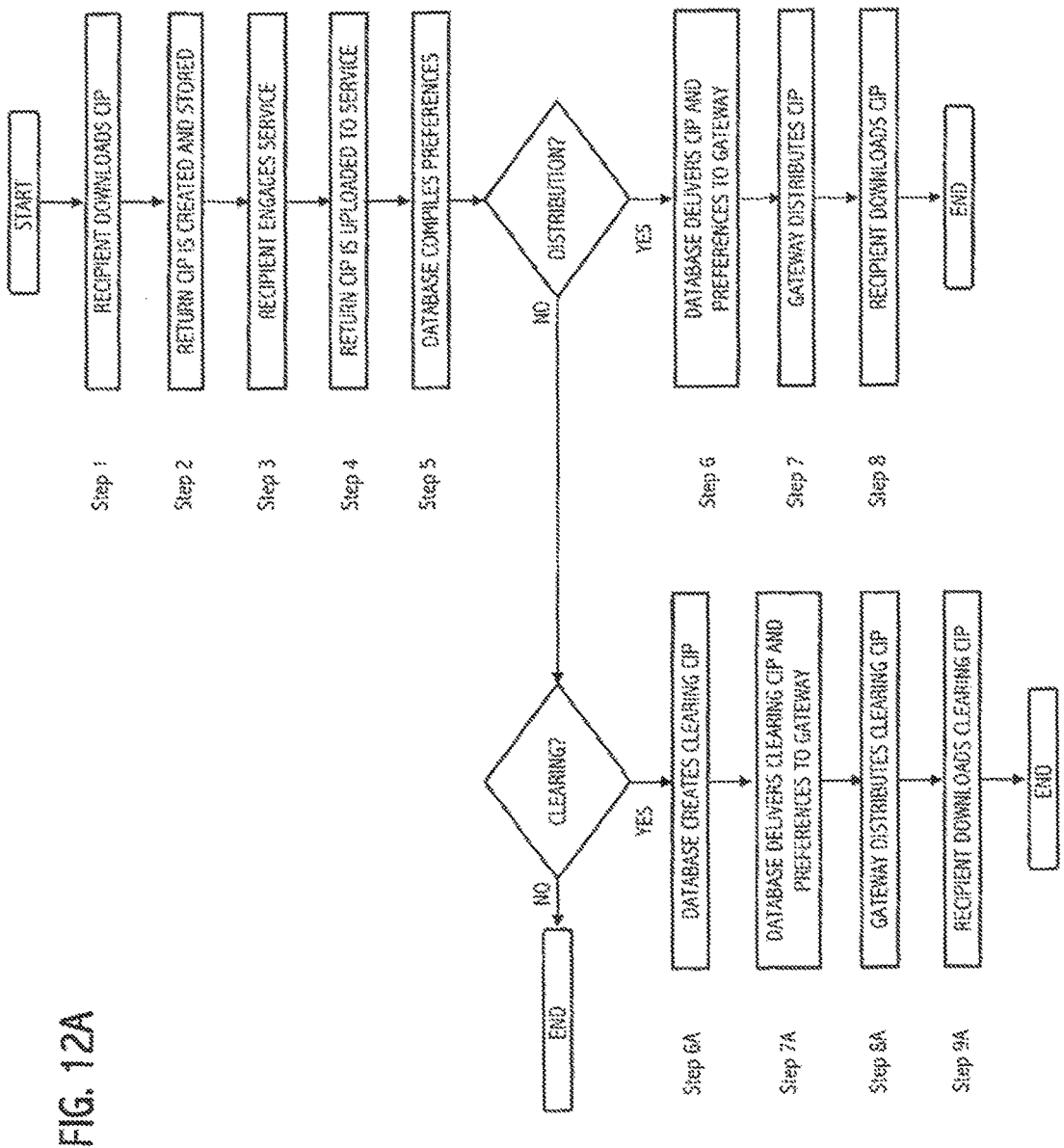
FIG. 12A is a flow diagram illustrating the sequence of steps in an automatic portability process according to another embodiment of the present invention.

System 10 (and/or System 60) may also enable, and a user may also employ, other automatic portability processes (some of which are discussed below), either as alternatives or supplements to the preferred process (where certain of the "other" automatic portability processes are analogous to certain of the "other" automatic storage processes described above, and are therefore not repeated here). For example, in a manner analogous to that described above for the preferred automatic portability process (either apart from or in conjunction with such process), the Service may, for each Return CIP, distribute the corresponding incoming CIP (or a "Clearing CIP," described below) to one or more Distributors 608 (e.g., AOL, where User B may maintain an on-line address book), in accordance with the User B's preferences and via the connection between the Service and each such distributor. Where CIPs are saved at such a distributor and/or such a distributor is equipped with a Software Module, the functionality of the address book and/or other application software at such distributor may also be enhanced (as described above for device-based address books and/or other application software). For another example, for each Return CIP, if the prevailing preference for the corresponding incoming CIP indicates that User B does not want the corresponding incoming CIP distributed to his other Device(s) 106, then, for such corresponding incoming CIP, the Service may include in the preferred process a process for clearing such CIP (or any other CIP having the same Codes 3011 and 3012) from User B's other Device(s) 106, as shown in FIG. 12A. Preferably, the Service enables a user to set General and/or Specific Preferences (including in a Return CIP, as shown in FIG. 1) concerning whether and/or how he wishes the Service to perform this clearing process in his behalf; and, in Step 5 as shown in FIG. 12A, in compiling User B's preferences and if necessary, Database 101 also compiles his preferences concerning this clearing process. If Database 101 determines that User B wants the corresponding incoming CIP cleared from his other Device(s) 106, then the process continues with Step 6A. In Step 6A, Database 101 creates a "Clearing CIP," also a software file, containing (1) Codes 7011 and 7012 from the Return CIP, and (2) instructions directing that any CIP having Codes 3011 and 3012 the same as, respectively, Codes 7011 and 7012 in the Clearing CIP, be erased from the device to which the Clearing CIP is downloaded. In Steps 7A and 8A, Database 101 delivers the Clearing CIP and User B's preferences to Gateway 104 and Gateway 104 distributes the Clearing CIP to User B's other Device(s) 106, all in a manner analogous to that described above for Steps 6 and 7 shown in FIG. 12. If, in the overall process shown in FIG. 12A, Database 101 processes more than one Return CIP, then, in Steps 7 and/or 8A, each communication from Gateway 104 to User B may include within it one or more Clearing CIPs, one or more corresponding incoming CIPs, or a combination of both. The Service may enable a user to indicate, in his preferences, that any communication to him from Gateway 104 including within it a Clearing CIP also include a notice of that fact (e.g., by including "Clearing CIPs" in an e-mail subject line). In Step 9A, User B may download a Clearing CIP to a Device 106 (in a manner analogous to that described above for downloading an incoming CIP), where any CIP having the specified Codes 3011 and 3012 is erased from the device and where the Clearing CIP is discarded (i.e., it is not stored on the device and it does not cause the creation of a Return CIP). In embodiments that include this clearing process, a Return CIP may be created and stored on User B's device during downloading of the incoming CIP even if, during such downloading, he sets Specific Preferences indicating that he wants neither database storage nor distribution of the corresponding incoming CIP. For another example, where a Return CIP includes supplementary information and the Service is to distribute the corresponding incoming CIP to User B's other Devices 106 and/or Distributors 608, the Service may extract from the Return CIP certain of such supplementary information and distribute it together with the corresponding incoming CIP to such devices and/or distributors, where such information may be stored as corresponding to the corresponding incoming CIP. For another example, referring to FIG. 12, where (e.g., according to User B's preferences) the Service is to distribute corresponding incoming CIPs to User B only in batches of, for example, ten or more, then Database 101 may maintain for User B additional storage space for temporarily storing corresponding incoming CIPs retrieved in Step 6, but not delivered to Gateway 104 because the number of such CIPs plus the number of such CIPs previously stored in such storage space, if any, did not total ten or more. In Step 6 of any later run through the process for User B (on additional uploaded Return CIPs), Database 101 may retrieve the temporarily-stored CIPs from such storage space and deliver them to Gateway 104 together with the CIPs (if any) newly retrieved from Storage Space 1011, if the number of temporarily-stored CIPs plus the number of newly-retrieved CIPs totals ten or more. For another example, in embodiments where the downloading of a CIP to a user's Devices 106 may involve a download routine enabling a user to accept or affirmatively reject a CIP presented for downloading to such a device, in Step 6 of FIG. 12 (and/or Step 6A of FIG. 12A), Database 101 may enable in the corresponding incoming CIP a "treat as a pre-accepted CIP" toggle instruction (or, in a Clearing CIP, enable an analogous instruction) in order to streamline or bypass such a download routine.

For still another example, System 10 (and/or System 60) may include means for avoiding or minimizing Gateway 104's distributing in Step 7 (or Step 8A) of a corresponding incoming CIP (or Clearing CIP) to a device (or distributor) to which the corresponding incoming CIP was already presented for downloading—for example, the Device 106 that User B is using to engage the Service and from which the Return CIP was uploaded to the Service. That is, for example, the Service may seek to determine which (if any) of User B's registered Devices 106 he is using to engage the Service—where, in Step 3, the Service may automatically detect from the device in use information sufficient to make that determination, in Step 4, the Service may prompt User B to identify the device in use, and/or, in Step 4, the Service may extract from the Return CIP uploaded from the device in use a "device identifier." Where, as described above, the Service may assign to each of a user's registered Devices 106 a distinct number, the Software Module on each such device may have registered within it the number assigned to that device. When a user downloads an incoming CIP to one such device and a Return CIP is created and stored thereon, the Software Module may include the assigned number in the Return CIP as a device identifier. Therefore, for example, if a corresponding incoming CIP is to be distributed to User B, then, in Step 5 (prior to delivering User B's preferences to Gateway 104), Database 101 may remove from User B's preferences (if present in the first place) the means for communicating with the device identified by the device identifier or otherwise, unless such means is the same means for communicating with other of his registered Devices 106. Similarly, if, as described above, the Service maintains for each user a distribution log and the corresponding incoming CIP appears in the log, then, the Service may not in this process distribute such CIP to the device(s) identified in the log for such CIP. For example, if, in Step 6 of the preferred automatic update process shown in FIG. 7 (and according to User B's preferences), the Service sent User A's updated CIP to User B via a single communication (e.g., a single e-mail) where such communication is the listed means for communicating with two of User B's registered Devices 106 (e.g., he may access that e-mail through both his desktop and laptop computers), then, the Service may list User A's updated CIP in User B's distribution log and identify for such CIP both such devices. If the Return CIP for User A's updated CIP is later uploaded to the Service from User B's desktop computer and the prevailing preference calls for distribution of the corresponding incoming CIP in this process, then, the Service may not distribute such CIP to either his desktop computer or laptop computer, but the Service may distribute such CIP to other of his registered Devices 106 (if any). Preferably, where a Return CIP is created on a device upon the downloading to such device of an incoming CIP not containing, for example, contact information data, such Return CIP may also include an "indicator" of that fact. That is, for example, if User B engages the Service and uploads a Return CIP including such an indicator, then the Service may distribute the corresponding CIP (now containing, for example, contact information data) to the device in use (irrespective of a device identifier, if any, in such Return CIP) and/or present the corresponding CIP for downloading to the device in use while User B is engaging the Service. For another example, referring to FIG. 12A, System 10 (and/or System 60) may include means for avoiding or minimizing the distribution of Clearing CIPs to devices (or distributors) on which corresponding incoming CIPs were not previously saved. That is, for example, Database 101 may be programmed to make certain assumptions concerning whether a corresponding incoming CIP is or is not already saved on a particular device—and, if assumed such CIP is not saved on a particular device, not distribute a Clearing CIP to such device—where Database 101 may derive information from, among other things, the user's Master Contact List, preferences, distribution log, "log of unresolved CIPs" (described below), and/or "log of resolved CIPs" (also described below).

System 10 (and/or System 60) may also include means for avoiding or minimizing the unnecessary creation and/or temporary storage, on a user's Device 106 (and/or at a user's Distributor 608), of Return CIPs (some of which means were previously described above, e.g., in connection with a user's saving his outgoing CIPs on his own Device(s) 106, and therefore are not repeated here). For example, in Step 6 of the preferred automatic portability process shown in FIG. 12, Database 101 may, after retrieving a corresponding incoming CIP but prior to delivering it to Gateway 104, enable in the retrieved CIP (but not in the MCIP in Storage Space 1011 from which was copied the retrieved CIP) a "do not create a Return CIP" toggle instruction, such that a Return CIP is not created upon the downloading of the corresponding incoming CIP to User B's other registered Device(s) 106 (and/or Distributor(s) 608) in Step 8. (If, for example, one of User B's other registered Devices 106 to which such corresponding incoming CIP is to be distributed is a device of another user [e.g., User B's regional manager's desktop computer], then, with respect to that device, Database 101 may not enable such instruction in such corresponding incoming CIP.) As such instruction is a toggle instruction (described above), during downloading of such CIP to User B's other Device(s) 106 (where no Return CIP is created), the instruction is toggled so that, for example, in such CIP as stored on such device(s), such instruction is again disabled. Thus, for example, if User B later forwards (i.e., transfers) such incoming CIP to another user and such other user downloads it to one of his Devices 106, a Return CIP may be created and temporarily stored on such other user's device. For another example, if an incoming CIP is stored on one of a user's Devices 106 (on which a corresponding Return CIP was already created and temporarily stored) and that user "transfers" such incoming CIP to another of his own such devices (including, e.g., in a device-to-device synchronization process), then, where the creation of a corresponding Return CIP on the receiving device is not desired, the user may (in certain embodiments), for example, set a preference in the Software Module on the receiving device temporarily disabling the creation of Return CIPs and/or himself enable in the incoming CIP on the sending device a "do not create a Return CIP" toggle instruction. The Software Module on one or more of a user's Devices 106 may also be programmed such that, in a device-to-device synchronization process, the creation of Return CIPs is automatically disabled (without the user's having to set a preference to that effect). For another example, the Software Module on certain Devices 106 (for example, those in Category 1064) may be programmed, or have a preference set in it, such that is does not create a Return CIP during the downloading of any outgoing and/or incoming CIP. For another example, if, during downloading of an incoming CIP to a Device 106, the Software Module determines that the same CIP is already saved on such device, then, the Software Module may inform the user of that fact and query the user whether he wishes that a corresponding Return CIP then be created and temporarily stored on such device. For another example, if, on a particular Device 106, a Return CIP is created (a "new" Return CIP), then, in temporarily storing such Return CIP on such device, the Software Module may first scan the other Return CIPs (if any) at that time stored on such device, and, if another such Return CIP contains the same Codes 7011, 7012, and 7013 as those in the new Return CIP (an "old" Return CIP), then the Software Module may temporarily store such new Return CIP on such device by overwriting such old Return CIP.

System 10 (and/or System 60) may also include means for avoiding or minimizing the unnecessary processing, at the Service (e.g., as described above in the preferred automatic storage process and/or in the preferred automatic portability process), of Return CIPs uploaded to the Service from a user's Device(s) 106 (and/or Distributor(s) 608) (some of which means were previously described above and therefore are not repeated here). For example, if a user has stored on one of his registered Devices 106 a Return CIP corresponding to one of his own outgoing CIPs (an unnecessary Return CIP) and such Return CIP is uploaded to the Service for would-be processing with respect to such user, then, because such Return CIP contains a Code 7011 the same as such user's User Identification Code 3011, the Service may discard such Return CIP without processing it (e.g., without storing the corresponding CIP [i.e., the user's own outgoing CIP] in his Master Contact List and/or distributing it to his other registered Device(s) 106). For another example, the Service may maintain and store in Database 101, for each user, a "log of resolved CIPs," which logs each Return CIP that has been uploaded to, and processed by, the Service with respect to such user (even if, in processing such Return CIP, the Service did not store the corresponding CIP in the user's Master Contact List or distribute it to his other Devices 106 or Distributors 608); where such log also logs, by correspondence with the logged Return CIPs, the corresponding CIPs (or "resolved CIPs"). Then, upon the uploading to the Service of a Return CIP for would-be processing with respect to User B, Database 101 may scan the already-processed Return CIPs in User B's log of resolved CIPs to determine whether the Service has already processed a Return CIP identical (at least in most respects) to the newly-uploaded Return CIP (e.g., a Return CIP containing the same Codes 7011, 7012, and 7013 as the newly-uploaded Return CIP, as well as, in certain embodiments, the same Specific Preferences and/or supplementary information, if any). (For these purposes, the Return CIPs are considered identical even if, for example, the device identifiers, if any, contained in them are different.) If such an already-processed Return CIP is found, then the Service may discard the newly-uploaded Return CIP without processing it. The Service may log already-processed Return CIPs in a user's log of resolved CIPs either permanently or temporarily (e.g., for a set period of time, until such user next changes his Device Information and/or General Preferences, or, with respect to a particular Return CIP in the log, until such user next changes his Specific Preferences for the corresponding CIP).

The Service may also maintain and store in Database 101, for each user, a "log of unresolved CIPs," which logs each incoming CIP that the Service has sent (through any of the processes described herein) to any of such user's registered Devices 106 and/or Distributors 608, but for which the Service has not processed a corresponding Return CIP with respect to such user. For example, assume that, in Step 6 of the preferred automatic update process as shown in FIG. 7, the Service sends User A's updated CIP to User B via e-mail directed to his mobile phone (one of User B's four registered Devices 106) and logs such CIP in User B's log of unresolved CIPs; assume also that, in Step 8, User B downloads the updated CIP to his mobile phone (on which is created and temporarily stored a corresponding Return CIP), but he next engages the Service using his desktop computer. In such case, while User B is engaging the Service, the Service may advise him (e.g., through his running report) that such CIP is in his log of unresolved CIPs and present him the opportunity to attend to it. If User B elects to do so, he may, for example, download such CIP to his device in use and/or set Specific Preferences for it; upon which, the Service may (but need not) create for such CIP a corresponding Return CIP and process such Return CIP with respect to User B in accordance with User B's prevailing preferences (e.g., in the preferred automatic storage process and/or in the preferred automatic portability process); and, thereafter, the Service may remove such CIP from User B's log of unresolved CIPs and log such Return CIP in User B's log of resolved CIPs. Assuming User B wishes to download the updated CIP to his device in use while he is engaging the Service and his preferences indicate he wants both storage and distribution of it, then the Service may present the updated CIP for downloading to User B's desktop computer (e.g., through Interface 102 via the Internet 103), store the CIP in his Master Contact List, and distribute the CIP to his other two registered Devices 106 (i.e., other than his mobile phone and desktop computer), where it may enable in the distributed CIP a "do not create a Return CIP" toggle instruction. If the corresponding Return CIP created and temporarily stored on User B's mobile phone is at some time thereafter uploaded to the Service, the Service may, with reference to User B's log of resolved CIPs, discard and not process it.

In other cases as well, for incoming CIPs received by a user through the Service—as in, for example, Transfer Type 5, Transfer Type 6, the preferred automatic update process, the preferred automatic delivery process, or the preferred automatic customization process—the Service may enable, and the recipient may elect (in his preferences or otherwise), that the received incoming CIP be stored (or not) in the recipient's Master Contact List (as in, e.g., the preferred automatic storage process) and/or distributed (or not) to his registered Devices 106 or Distributors 608 (as in, e.g., the preferred automatic portability process), without the uploading to the Service of a corresponding Return CIP from any of the recipient's Devices 106 or Distributors 608. That is, for example, for Transfer Type 5, if a user is using a Device 106 in Category 1061 to search the Directory through Interface 102 via the Internet 103, and if such user so elects, then, upon his clicking on the "download" command to download to his device in use an incoming CIP appearing in the search results, the Service may enable such user to set certain Specific Preferences for such incoming CIP, after which the Service may (but need not) create a corresponding Return CIP for such incoming CIP and process such Return CIP with respect to such user in accordance with such user's prevailing preferences (e.g., store the incoming CIP in his Master Contact List and distribute it to his other Devices 106 and/or Distributors 608). In such case, for example, the Service may enable in the incoming CIP to be downloaded to the device in use and/or in the incoming CIP(s) to be distributed to the other Devices 106 or Distributors 608, a "do not create a Return CIP" toggle instruction; and, the Service may log such corresponding Return CIP in the log of resolved CIPs.

In System 10 (and/or System 60), as shown in FIGS. 1-1B, even if a user's outgoing and/or incoming CIPs may not be available on (e.g., saved on) one or more of his Devices 106, such user's outgoing and/or incoming CIPs may be accessible through one or more of such devices (including non-registered Devices 106, such as a friend's mobile phone). For example, a user may, using a Device 106, access his Master Contact List by engaging the Service, as described above, by interacting with the Service through Interface 102 via the Internet 103 and/or by communicating with the Service through Gateway 104 via the Internet 103 and/or Networks 105. When accessing his Master Contact List by interacting with the Service through Interface 102, a user may, among other things, retrieve from it incoming CIPs in a manner analogous to that described above for retrieving incoming CIPs from the Directory in Transfer Type 5 (described above). When accessing his Master Contact List by communicating with the Service through Gateway 104, a user may, among other things, retrieve from it incoming CIPs in a manner analogous to that described above for retrieving incoming CIPs from the Directory in Transfer Type 6 (also described above). In either case, a user may retrieve from his Master Contact List any CIP stored therein, even if such CIP is not compiled in the Service's Directory. In certain cases, a user may retrieve from his Master Contact List an incoming CIP through voice activation—that is, by stating orally a voice activation stamp previously recorded for a particular incoming CIP (or a particular field in a particular incoming CIP) and stored in his Master Contact List as corresponding to the incoming CIP, as described above.

Automatic Radial Mining Processes

In System 10 (and/or System 60), as shown in FIGS. 1-1B, contact information may be mined to yield for one user intelligence concerning his relations to other users by a variety of methods, including, without limitation, those discussed below.

Such automatic radial mining processes, performed in behalf of (at least partially) one user, may involve the Service's mining of information contained in other users' Storage Spaces 1012 in Database 101 (i.e., other users' Master Contact Lists). For example, System 10 may enable, and such user may employ, a "first preferred" radial mining process involving the multiple steps shown in FIG. 13. In the discussion of the first process and referring to FIG. 1, assume User A "knows of" User B (e.g., User B is a prospective client of User A), but User A does not "know" User B; therefore, User A is seeking one or more other users to assist in making a personal introduction to User B and/or a series of personal introductions culminating in a personal introduction to User B.

Referring additionally to FIG. 13, in Step 1, User A uses any Device 106 in Category 1061 to engage the Service through Interface 102 via the Internet 103, where he is presented with, for example, Display Screen 20 shown in FIG. 2. By, for example, clicking on "Mining Processes" Block 203, User A is presented with another screen (or series of screens) from which he may select, and command the Service to commence, this first process. As mentioned above, the Service may enable a user to set General and/or Specific Preferences preventing the Service's mining of information contained in the CIPs stored in his Master Contact List in behalf of (at least partially) another user, for each process (including this process) or all processes in which such mining is involved. If the Service enables the setting of such preferences, then it may also, for example, for each user who has set such preferences for this process (and for a period of time after such user's removal of such preferences) prohibit such user from initiating this process in his own behalf. If such were the case, then, upon User A's selection of this process, Interface 102 may deliver to Database 101 a request to determine whether User A has set such preferences, and, if such preferences are found, the Service may inform User A that he is prohibited from initiating this process. Here, however, it is assumed either that the Service has not enabled the setting of such preferences or that User A (though enabled) has not set such preferences.

In Step 2, the Service instructs User A to select the "target" CIP(s); that is, the outgoing CIP(s) of the user (e.g., User B) to whom he wishes to establish a link through one or more other users. The Service again prompts User A through the process of selecting the target CIP(s), presenting him the opportunity, for example, to select User B's CIP(s) from his Master Contact List and, if not already present in the Master Contact List, to fetch and then select User B's CIP(s) (if compiled in the Directory) through Transfer Type 5 (with or without downloading such CIP(s) to User A's device in use). User A may select any one or more of User B's outgoing CIPs; for example, if User A wishes to identify a "final link" (defined below) who is either a personal link or a professional link to User B, or both, he may select both User B's personal and professional CIPs. Assume User A selects both User B's personal CIP (which he fetched through Transfer Type 5) and professional CIP (which he fetched from User B's company's web site and uploaded to his Master Contact List as described above); moreover, assume User A informs the Service that he wishes to identify a final link who is both a personal and professional link to User B.

The Service may (but need not) enable a user to set General and/or Specific Preferences preventing one or more of his outgoing CIPs from being used as a target CIP in this process. If such is the case, then, following User A's selection of User B's CIPs as target CIPs and in response to a request from Interface 102, Database 101 may extract the Codes 3011 and 3012 from the selected CIPs, use the Code 3011 to locate User B's Storage Space 1011 shown in FIG. 1A, retrieve User B's General Preferences, use in addition the Codes 3012 to identify the selected CIPs in User B's Storage Space 1011, retrieve the Specific Preferences (if any) for each of the selected CIPs, and compare the General and Specific Preferences to determine User B's prevailing preference for each of the selected CIPs. If, for example, the prevailing preference for either of the selected CIPs prevents its use as a target CIP, then the Service may inform User A that the process (as selected) may not go forward. (Analogous to that mentioned above, due to User B's setting of preferences preventing the use of his outgoing CIPs as target CIPs in this process, the Service may prohibit User B from initiating this process.) Here, however, it is assumed either that the Service has not enabled the setting of such preferences or that User B (though enabled) has not set such preferences.

In Step 3, referring still to FIGS. 1, 1A, 1B, and 12, the Service instructs User A to select the "first-degree users"; that is, the user(s) whose outgoing CIPs are stored as incoming CIPs in User A's Master Contact List and through whom he wishes to establish a link to User B. The Service again prompts User A through the process of selecting the first-degree users, presenting him the opportunity, for example, to view and select from his Master Contact in a manner analogous to that described above for the first selection process of Step 3 of the preferred automatic update process, shown in FIG. 7. The Service may impose a limit on the numbers of users User A may select as first-degree users; otherwise, User A may select all users whose outgoing CIPs are stored in his Master Contact List, subject to other service restrictions (if any) that the Service may impose on this selection process. That is, the Service may disable User A's selection of CIPs in his Master Contact List that do not comply with any such service restrictions. For example, the Service may disable the selection of CIPs of business users, on the assumption that business users would not serve to establish the desired link from one individual user (User A) to another individual user (User B); and where, for example, as explained above, the Codes 3011 in the CIPs (including the target CIP(s)) may include within them a sub-code indicating the type of user (individual or business) to whom a CIP corresponds. For another example, on a more-narrow assumption, the Service may disable the selection of any CIP of a business user that does not include the name of an individual "contact person" in the appropriate field in, for example, Block 302 of sample MCIP 30 shown in FIG. 3. User A may himself exclude from his selection the outgoing CIPs of single users and/or groups of users whom he believes would not serve to establish the desired link to User B and/or whom he would not want to receive a message in the Service's reporting of positive results (if the Service is to generate and deliver such messages, as described below for Step 4A). For example, User A may exclude from his selection the CIPs of individual users whom he considers to be only casual acquaintances and whom he would not be comfortable asking for an introduction to User B (even if such users were determined to be links to User B). For another example, User A may exclude from his selection the CIPs of the group of business users whose CIPs he maintains in a folder called "My Favorite Restaurants." In this first process, Database 101 searches, if necessary, for a "CIP Match" (defined below) in the Master Contact Lists of up to the "Nth-degree users," where "N" is defined either by the Service or by the user initiating this process within parameters defined by the Service (e.g., "N may be 1, 2, 3, 4, 5, or 6"). It is assumed herein that N=6. After his selection of first-degree users is completed, User A commands the Service to conduct its search.

In Step 4, Interface 102 delivers User A's command (which, among other things, identifies the target CIP(s)) and his selection to Database 101, which may then compile a "final list" of first-degree users and search for a CIP Match in the Master Contact Lists of such users. In order to compile the final list, Database 101 may first extract the User Identification Code 3011 from each of the CIPs in User A's Master Contact List that User A selected in Step 3, creating an "interim list" of first-degree users (where multiple entries of the same Code 3011, if any, are merged into a single entry). For each of the users whose Code 3011 is on the interim list, Database 101 may then retrieve and review his General and/or Specific Preferences concerning whether he permits his selection as a "first-degree user" (or, as explained below, a "second-degree user," "third-degree user." and so on) in this process as initiated by User A, creating the final list by removing from the interim list the Code 3011 of each user who has set preferences prohibiting such selection. Such General Preferences may involve a general prohibition against such selection for this first process in all cases or in certain cases. Such certain cases may include, for example, that where the process as initiated by a user involves a target CIP that is a personal CIP. Such certain cases may also include, for example, that where a CIP of the user initiating the process is not stored in the Master Contact List of the would-be first-degree user (and/or, in connection with the review of the General Preferences of would-be second-degree users [and so on], as explained below, that where a CIP of the first-degree user establishing the link to the would-be second-degree user is not stored in the Master Contact List of the would-be second-degree user). In the latter case, for each would-be first-degree user who has set such General Preference, Database 101 may use User A's User Identification Code 3011 to search for any of User A's CIPs in such user's Master Contact List and, if no such CIP is found, remove such user's Code 3011 from the interim list. The Service may also enable a user to set Specific Preferences for the CIPs in his Master Contact List overriding any general prohibition against such selection. That is, for example, a user whose General Preferences indicate a general prohibition against such selection may set Specific Preferences for the CIPs of his close friends and business colleagues indicating that he permits his selection as a first-degree user in this process where initiated by any of such other users (and/or, he permits his selection as a second-degree user [and so on] where any of such other users is the first-degree user establishing the link to him as a would-be second-degree user). In such case, for each would-be first-degree user whose General Preferences indicate a general prohibition against such selection, Database 101 may use User A's User Identification Code 3011 to search for any of User A's CIPs in such user's Master Contact List; and, if no such CIP is found or such CIPs are found but such Specific Preferences are not set for them, remove such user's Code 3011 from the interim list.

Database 101 may then search for a CIP Match in the Master Contact Lists of the first-degree users (whose User Identification Codes 3011 are on the final list). For each such user, Database 101 uses his Code 3011 to locate his Storage Space 1012 shown in FIG. 1A, in which is stored his Master Contact List. Within the Master Contact List, Database 101 searches for the target CIP(s); that is, for each target CIP, Database 101 searches for a CIP having the same Codes 3011 and 3012 as those in the target CIP. (In certain embodiments, Database 101 may search for a CIP having the same Code 3011 as the target CIP, without reference to Code 3012, or, Database 101 may search for a CIP having not only the same Codes 3011 and 3012, but also the same CIP Version Code 3013, as those in the target CIP.) For each first-degree user, a "CIP Match" requires that (1) the target CIP(s) are found in his Master Contact List in the manner defined by the user initiating this process (an "interim" CIP Match), and (2) the first-degree user has not set Specific Preferences for the target CIP(s) prohibiting the finding of a CIP Match in this process as defined by the user initiating this process. That is, for example, in this process as defined by User A, a CIP Match first requires that both of the target CIPs (i.e., User B's personal CIP and professional CIP) be found in a first-degree user's Master Contact List. If none is found, or only one of the two is found, then there is no CIP Match. For each first-degree user in whose Master Contact List both of the target CIPs are found (i.e., where there is an interim CIP Match), Database 101 may then retrieve such first-degree user's Specific Preferences (if any) for such target CIPs to determine whether such user nevertheless prohibits the finding of a CIP Match in this process as defined by User A. That is, for example, if such first-degree user has set a Specific Preference for User B's personal CIP prohibiting the mining of such CIP in such user's Master Contact List in this first process, then there is no CIP Match (even if such user has set no such Specific Preference for User B's professional CIP). Database 101 thus searches for a CIP Match with respect to all of the first-degree users. If Database 101 determines there is a CIP Match with respect to one or more of the first-degree users, the process continues with Step 4A shown in FIG. 13 (discussed immediately below). If Database 101 determines there is no CIP Match with respect to any of the first-degree users and N≠1, the process continues with Step 5 shown in FIG. 13 (also discussed below).

In Step 4A, referring to FIGS. 1 and 12, Database 101 may generate for User A a report of positive results, which report may be delivered, for example, through Interface 102 to User A while he is still engaging the Service. The report may state, among other things, the number of other users in whose Master Contact Lists a CIP Match was found—each such user a "final link"—and the degrees of separation between User A and User B (in this case, one degree of separation). The report may also identify each final link— and, for each final link, the "interim link(s)" (defined below), if any—either by name alone or otherwise (including by the provision of one or more CIPs), facilitating User A's contacting one or more of such users to assist in making a personal introduction to User B and/or a series of personal introductions culminating in a personal introduction to User B. For example, assuming in this case that User C is a final link, the report to User A may state that "User C (in your Master Contact List) appears to have both a personal and a professional relationship with User B." The Service may enable a user, as a would-be final link and/or interim link, to set preferences ("identity preferences") restricting the disclosure of his identity in such a report to another. For that reason and others, Database 101 may also generate appropriate messages for inclusion in the running reports of each of the final links and/or interim links (as well as, perhaps, other users, e.g., those in whose Master Contact Lists an interim CIP Match was found but whose Specific Preferences prohibited a CIP Match). Such messages may identify User A, User B, and/or other final/interim links, facilitating the links' contacting User A and/or other links to assist in making a personal introduction to User B and/or a series of personal introductions culminating in a personal introduction to User B. For example, assuming again User C is a final link, the message to User C may state that "User A will be interested in the fact you appear to have both a personal and a professional relationship with User B (though User A has not been informed of that fact); please contact User A if you are willing and able to make an introduction for him to User B." The Service may also enable a user to set preferences (also "identity preferences") restricting the disclosure of his identity in such messages. Preferably, if the Service enables, in whole or in part, either or both of the above-described identity preferences, it does so in a manner that assures that, in the report to User A and/or the messages to the final/ interim links, sufficient identity information is disclosed to facilitate such users' contacting other such users to assist in making the above-described introduction(s). That is, preferably, the report and messages, separately or taken together, disclose each complete chain of links between User A and User B; where, for cases involving two or more degrees of separation between User A and User B, each report and/or message may disclose either the complete chain of links or only a part of the chain of links (where the complete chain of links is established by the report and/or messages taken together).

In Step 5 (reached if Database 101 determines there is no CIP Match with respect to any of the first-degree users and N≠1), Database 101 may compile a final list of second-degree users and search for a CIP Match in the Master Contact Lists of such users. In order to compile the final list, Database 101 may first review the CIPs in each first-degree user's Master Contact List for compliance with service restrictions (if any) imposed by the Service on the "selection" of second-degree users, extracting the User Identification Code 3011 from each of the complying CIPs to create, for each first-degree user, a "first interim list" of second-degree users (where multiple entries of the same Code 3011, if any, are merged into a single entry). The service restrictions (if any) in this Step 5 may be, in whole or in part, the same as or different from (but analogous to) those described above as examples in Step 3 (as well as those employed in the compilation, if necessary, of the final lists of third-degree users, fourth-degree users, and so on); and, the service restrictions (if any) in this Step 5 may depend upon choices made by User A in Steps 2 and/or 3. For example, if User A had selected by choice in Step 3 only those users for whom he had stored in his Master Contact List both a personal CIP (having a CIP Type Code 3014 of "01") and a professional CIP (having a Code 3014 of "02"), then, in this Step 5, Database 101 may include in a particular first interim list only the Codes 3011 of the users for whom a particular first-degree user has stored in his Master Contact List both a personal CIP and a professional CIP—even though such service restriction was not present in Step 3. Database 101 may then create a "second interim list" of second-degree users by combining into a single list the Codes 3011 on all of the first-degree users' first interim lists (where multiple entries of the same Code 3011, if any, are merged into a single entry). Database 101 may add to the second interim list, for each Code 3011 of a would-be second-degree user on the list, a "first-degree identity tracker" listing the Code(s) 3011 of the first-degree user(s) on whose first interim list(s) the corresponding Code 3011 of the would-be second-degree user appeared. For each of the would-be second-degree users whose Code 3011 is on the second interim list, Database 101 may then retrieve and review his General and/or Specific Preferences concerning whether he permits his selection as a second-degree user in this process as initiated by User A, creating the final list by removing from the second interim list the Code 3011 (and the corresponding first-degree identity tracker(s)) of each user who has set preferences prohibiting such selection (all in a manner analogous to that described above for Step 4). For each of the second-degree users (whose User Identification Codes 3011 are on the final list), Database 101 may then search for a CIP Match in his Master Contact List (all in a manner analogous to that described above for Step 4). Database 101 thus searches for a CIP Match with respect to all of the second-degree users. If Database 101 determines there is a CIP Match with respect to one or more of the second-degree users, the process continues with Step 5A shown in FIG. 13 (discussed immediately below). If Database 101 determines there is no CIP Match with respect to any of the second-degree users and N≠2, the process continues with Step 6 (also discussed below).

In Step 5A, Database 101 may generate for and deliver to User A a report of positive results and/or generate for and deliver to other users appropriate messages (all in a manner analogous to that described above for Step 4A). Here, there are two degrees of separation between User A and User B, and, for each final link there is at least one "interim link" (in this case, a first-degree user in whose Master Contact was stored at least one CIP of the final link). For each final link, Database 101 may determine the identity of the interim link(s) in a number of ways. For example, Database 101 may search for the final link's User Identification Code 3011 in each of the first interim lists of second-degree users (created in Step 5 for each first-degree user), where each first-degree user in whose first interim list such code is found is an interim link. For another example, where in Step 5 the final list of second-degree users includes first-degree identity trackers, Database 101 may extract from the first-degree identity tracker corresponding to the final link's User Identification Code 3011 the Code(s) 3011 of the interim link(s).

In Step 6 (not shown in FIG. 13, but reached if Database 101 determines there is no CIP Match with respect to any of the second-degree users and N≠2), Database 101 repeats the process described in Step 5 (with respect to second-degree users) with respect to third-degree users. In compiling the final list of third-degree users, Database 101 may similarly create, for each second-degree user, a "first interim list" of third-degree users; and then similarly create a "second interim list" of third-degree users. Database 101 may add to the second interim list, for each User Identification Code 3011 of a would-be third-degree user on the list, a "second-degree identity tracker" listing the User Identification Code(s) 3011 of the second-degree user(s) on whose first interim list(s) the corresponding User Identification Code 3011 of the would-be third-degree user appeared. Database 101 may also add to the second interim list, for each User Identification Code 3011 of a second-degree user listed in the second-degree identity trackers, the first-degree identity tracker corresponding to such User Identification Code 3011 and retrieved from the final list of second-degree users. Database 101 may then similarly create the final list of third-degree users and, for each of such users (whose Codes 3011 are on the list), search for a CIP Match in his Master Contact List (all in a manner analogous to that described above for Step 5). If Database 101 determines there is a CIP Match with respect to one or more of the third-degree users, the process continues with Step 6A (not shown in FIG. 13), where the Service reports positive results to User A and/or the final/interim links (all in a manner analogous to that described above for Steps 4A and 5A). Here, there are three degrees of separation between User A and User B, where, for each final link there are at least two interim links (one a second-degree user in whose Master Contact List was stored at least one CIP of the final link and the other a first-degree user in whose Master Contact List was stored at least one CIP of the other interim link). For each final link, Database 101 may determine the identities of the interim links by, for example, extracting their User Identification Codes 3011 from the second-degree identity tracker (and corresponding first-degree identity tracker(s)) corresponding to the final link's User Identification Code 3011 on the final list of third-degree users. If Database 101 determines there is no CIP Match with respect to any of the third-degree users, then (assuming still that N=6), the process continues with Step 7 (for fourth-degree users), Step 8 (for fifth-degree users, if a CIP Match is not found in Step 7), and Step 9 (for sixth-degree users, if a CIP Match is not found in Step 8). In each successive step, Database 101 may compile a final list of the next-degree users (to which it may add previous-degree identity trackers and carry forward even-more-previous-degree identity trackers) and search for a CIP Match in the Master Contact Lists of such users, all in a manner analogous to that described above. If such is found in any of such steps, the Service may report positive results to User A and/or the final/interim links, all in a manner analogous to that described above. If, in Step 9, shown in FIG. 13, where Database 101 searches for a CIP Match in the Master Contact Lists of the Nth-degree users, no such match is found, then the process continues and ends with Step 9B, where the Service may report negative results to User A.

System 10 (and/or System 60) may also enable, and a user may also employ, other automatic radial mining processes performed in behalf of (at least partially) one user and involving the mining of information contained in other users' Master Contact Lists (some of which are discussed below), either as alternatives or supplements to the first preferred process. For example, User A may engage the Service by means other than that described in connection with Step 1 of the first process; for example, as described above, he may engage the Service using a Device 106 in Category 1063 through Gateway 104 via Networks 105, and, by communicating with Gateway 104 (which in turn communicates with Database 101), he may select target CIPs, select first-degree users, receive positive or negative results, and/or otherwise command the Service to perform a radial mining process analogous to the first preferred process. For another example, whereas in the process shown in FIG. 13 (and assuming positive results) searching ends after Database 101 finds the first CIP Match and completes its search for additional CIP Matches in the Master Contact Lists of the same degree of users in which it finds the first CIP Match, searching may either (1) end after Database 101 finds the first CIP Match (without completing its search for additional CIP Matches in the Master Contact Lists of the same degree of users in which it finds the first CIP Match), or (2) end after Database 101 searches for CIP Matches in the Master Contact Lists of all degrees of users through the Nth-degree users (even if a CIP Match was found in the Master Contact Lists of previous-degree users and where, if more than one final link, the final links may be from different degrees of users). For another example, in Step 3, the Service may enable User A to select as a group to be included among the first-degree users those users in whose Master Contact Lists is stored one or more of User A's outgoing CIPs, even if User A does not have any outgoing CIPs of such other users in his Master Contact List, in a manner analogous to that described above for the second selection process in Step 3 of the preferred automatic update process shown in FIG. 7. If such were the case, and User A selected such group of users, Database 101 may, as part of Step 4, search Storage Spaces 1012 of all other users for CIPs having User A's User Identification Code 3011 in order to determine the User Identification Code 3011 of each user in such group of users (this in itself an automatic radial mining process), in a manner analogous to that described above for Step 4 of the preferred automatic update process shown in FIG. 7. The Service may "select" analogous groups of users in its compiling the final list of second-degree users, third-degree users, and so on. Correspondingly, the Service may enable users to set preferences concerning their possible selection in this manner as first-degree users (and/or second-degree users, and so on), also in a manner analogous to that described above for Step 4 of the preferred automatic update process shown in FIG. 7. For another example, the Service may, as to certain service restrictions that it may impose in its "selection" of second-degree users (and/or third-degree users, and so on), enable a user initiating this process to choose whether each such service restriction is to be applied by Database 101 in compiling the final lists of such users. For another example, Database 101 may search the Master Contact Lists of all users for one of User B's CIPs, compile a list of the User Identification Codes 3011 of all such users having in their Master Contact Lists one of User B's CIPs, and compare such list against a list of the User Identification Codes 3011 of all CIPs in User A's Master Contact List to identify possible common acquaintances between User A and User B. For another example, Database 101 may compile a list of the User Identification Codes 3011 of all users in User B's Master Contact List and compare such list against a list of the User Identification Codes 3011 of all users in User A's Master Contact List, again, to identify possible common acquaintances between User A and User B. For another example, whether any of the above processes as initiated by User A returns positive or negative results, the Service may itself (subject to approval by User A) re-run the process (using the same target CIP(s)) on a periodic basis or at another appropriate time (even at times when User A is not engaging the Service); for example, every week until User A confirms that he has received positive results that served his purpose in initiating the process. For any of the above processes, the Service may employ still additional means (in addition, e.g., to its system of user preferences, service restrictions, etc.) for delivering positive results that serve User A's purpose in initiating the process. That is, for example, the Service may employ one or more other "trackers"—employed in a manner analogous to that described above for identity trackers—which may enable the Service to determine or make assumptions about the type and/or quality of each relationship in a complete chain of links between User A and User B, and thus, the type and/or quality of each complete chain of links as a whole. The Service may employ, for example, "type trackers," where, for example, in Step 5 of the first preferred process shown in FIG. 13, in creating, for each first degree user, the first interim list of second-degree users, Database 101 may extract from each the complying CIPs in the first-degree user's Master Contact List not only the User Identification Code 3011, but also the CIP Type Code 3014, and thus add to the list one or more such Codes 3014 as corresponding to each Code 3011 on the list; then, when adding to the second interim list, for each Code 3011 of a would-be second-degree user on the list, a first-degree identity tracker, Database 101 may also add to the list as a first-degree type tracker, for each Code 3011 of a first-degree user in the first-degree identity tracker, the Code(s) 3014 appearing on such first-degree user's first interim list as corresponding to the Code 3011 of the would-be second-degree user. Assuming, then, in a chain of links constituting a positive result, that User C is the first-degree interim link and User D is the second-degree interim link, then, in reporting such result to User A, the Service may share with User A assumptions concerning the type of relationship between Users C and D (as well as between each pair of other users in the complete chain of links), characterizing the relationship as, for example, either personal, professional, or both personal and professional. The Service may also employ, for example, "quality trackers," which may be, for example in simplest form, a single-digit code where "0" indicates a weak relationship and "1" indicates a strong relationship; and where, again for example in Step 5 of the first preferred process shown in FIG. 13, Database 101 may add to the second interim list one such code for a Code 3011 of a first-degree user in the first-degree identity tracker for a Code 3011 of a would-be second-degree user on the list, as an indicator of the quality of the relationship between the first-degree user and the would-be second-degree user. The value of the code so added (e.g., either "0" or "1") may be based on an assumption made by the Service, where Database 101 may be programmed to make such an assumption based on one or more pieces of relevant information available to it. Such relevant information may include, without limitation, whether or not the would-be second-degree user also has one or more of the first-degree user's CIPs in his Master Contact List; the total number of CIPs of one such user in the Master Contact List of the other; the Specific Preferences (if any) assigned to such CIPs; the amount of time such CIPs have been stored in such Master Contact Lists; the manner in which such CIPs are categorized in the folders of such Master Contact Lists; whether or not such CIPs are outdated or updated; whether or not supplementary information (like a voice activation stamp) is stored in such Master Contact Lists as corresponding to such CIPs; if a special-purpose CIP is stored in one user's Storage Space 1011, whether or not such special-purpose CIP is stored in the other user's Master Contact List; and so on. Information relevant to the making of such assumptions may also be compiled in users' "user profiles" (described above), whether or not such information may also be relevant to other processes for which Database 101 may refer to such profiles. For example, where such profiles include users' ages, Database 101 may assume that a 12-year old user identified as a final link between Users A and B (e.g., two men in their 50s) would not serve to make the desired business-related introduction between them, and therefore rank the relationship between such user and User B as "weak" (even though they may know each other very well). The value of a quality tracker code (e.g., either "0" or "1") may also be based on a determination made by the Service, where such determination is based on information provided directly by a user. That is, for example, the Service may enable each user to himself provide a rank (e.g., "weak" or "strong"), for each CIP in his Master Contact List, concerning the quality of his relationship with the user corresponding to such CIP, where such rank may be coded and stored as a quality tracker in such user's Master Contact List as corresponding to such CIP, and where, if such quality tracker is so stored, it may be used in the place of a quality tracker based on an assumption made by the Service (obviating the need for Database 101 to make such assumption). Assuming, again, in a chain of links constituting a positive result, that User C is the first-degree interim link and User D is the second-degree interim link, then, in reporting such result to User A, the Service may share with User A information (either an assumption or a determination) concerning the quality of relationship between Users C and D ("weak" or "strong"), as well as between each pair of other users in the complete chain of links. The assumption/determination made, for example, in Step 5 of the first preferred process shown in FIG. 13, concerning the quality of relationship between a first-degree user and a would-be second-degree user, may be used alternatively as a basis for removing the Code 3011 of such would-be second-degree user from the second interim list (where, e.g., the relationship is "weak"). As an alternative to the Service's making such assumptions/determinations and adding quality trackers to the second interim list in, for example, Step 5 of the first preferred process shown in FIG. 13, the Service may instead perform such process to completion and, assuming positive results, in the step in which it reports positive results (but prior to so reporting), make such assumptions/determinations only with respect to each pair of users in each complete chain of links constituting a positive result.

Automatic radial mining processes in behalf of (at least partially) one user and involving mining of information contained in other users' Master Contact Lists may be performed for personal and/or professional purposes in addition to that used hereinabove as an example to assist in describing such processes. For example, assuming User A is a journalist in Philadelphia and he has been invited to attend that city's journalism awards dinner (and has the event organizer's special-purpose CIP in his Master Contact List), he may command the Service to perform a process analogous to the first preferred process for purposes of determining which of his colleagues (whose CIPs are also in his Master Contact List) have also been invited to attend the dinner (and who may therefore also have the event organizer's special-purpose CIP in their Master Contact Lists) and, assuming positive results, contact his invited colleagues to make arrangements to sit together at the dinner. For another example, for the purpose of User A's expanding his Master Contact List to include the CIPs of users who are his personal and/or professional acquaintances but for whom he does not have CIPs in his Master Contact List, User A may command the Service to search the Master Contact Lists of all users to compile a list of all users having one or more of his CIPs in their Master Contact Lists and, subject to the preferences of each such other user, retrieve and deliver to User A one or more of such user's outgoing CIPs, where, for example, the type(s) of CIP(s) (personal, professional, or other) delivered to User A may depend upon the type(s) of CIP(s) of User A found in such user's Master Contact List. For a final example, assuming User A is interested in employment with a particular advertising firm and he is seeking one or more other users to assist in making a personal introduction (and/or a series of personal introductions culminating in a personal introduction) to any one of the Managing Directors at the firm; he may command the Service to perform a process analogous to the first preferred process where, instead of selecting a target CIP(s), he selects a search function (described below in connection with the second preferred process) having the firm name and the phrase "Managing Director" in the "company name" and "title" fields.

Other automatic radial mining processes, performed in behalf of (at least partially) one user, may involve the Service's mining of information contained in other users' Storage Spaces 1011 in Database 101, as shown in FIGS. 1 and 1A. For example, System 10 may enable, and such user may employ, a "second preferred" radial mining process involving the multiple steps shown in FIG. 14. In the discussion of the second process and referring to FIG. 1, assume User A (who lives in New York) is planning a business trip to Las Vegas and wishes to know whether any of his friends will be in Las Vegas at the same time. He can browse and/or search his Master Contact List to find his friends who live or work in Las Vegas; however, he also wishes to know whether any of his friends who do not live or work in Las Vegas may nevertheless be there while he is there. Also assume User B (a friend of User A who lives in Houston) is planning a vacation in Las Vegas; he has created a special-purpose CIP for his planned vacation and, employing the preferred automatic customization process described above, transferred such CIP to his parents, his office assistant, and several others—but not to User A.

Referring additionally to FIG. 14, in Step 1, User A uses any Device 106 in Category 1061 to engage the Service through Interface 102 via the Internet 103, where he is presented with, for example, Display Screen 20 shown in FIG. 2. By, for example, clicking on "Mining Processes" Block 203, User A is presented with another screen (or series of screens) from which he may select, and command the Service to commence, this second process. As mentioned above, the Service may enable a user to set General and/or Specific Preferences preventing the Service's mining of information contained in the outgoing CIPs stored in his Storage Space 1011 in Database 101 as shown in FIG. 1A in behalf of (at least partially) another user, for each process (including this process) or all processes in which such mining is involved. If the Service enables the setting of such preferences, then it may also, for example, for each user who has set such preferences for this process (and for a period of time after such user's removal of such preferences) prohibit such user from initiating this process in his own behalf. If such were the case, then, upon User A's selection of this process, Interface 102 may deliver to Database 101 a request to determine whether User A has set such preferences, and, if such preferences are found, the Service may inform User A that he is prohibited from initiating this process. Here, however, it is assumed either that the Service has not enabled the setting of such preferences or that User A (though enabled) has not set such preferences.

In Step 2, the Service instructs User A to select a search function by entering information in search fields corresponding, for example, to the "city," "state," "zip code," and/or "country" fields in Block 302 of sample MCIP 30 shown in FIG. 3 and/or the "effective dates" or other fields in Block 303 of sample MCIP 30. The Service again prompts User A through the process of selecting the search function, employing, where possible for each field (or portion of field), a pull-down bar listing possible responses to the prompt, and enabling him to import information from a CIP by, for example, simply clicking on it. For example, if User A has in his Master Contact List the CIP of the hotel at which he will be staying while in Las Vegas, then he may click on the CIP to import into the search fields the Hotel "name," "city," "state," "zip code," "country," and/or "location code," and then add or delete information to/from the search fields as desired. For another example, assuming User A has already created an outgoing special-purpose CIP for his planned business trip (which he may have created, in part, by importing into it the hotel's CIP), then he may similarly click on such CIP to import information into the search fields, and then add or delete information to/from the search fields as desired. The Service may also generate and/or import, and include in a search function, for some or all of the search fields containing data, and for each such field, a data-corresponding code. The Service may also enable User A to further define the search function by, for example, including "AND," "OR," and/or other search instructions. The Service may also enable the selection of a search function using Keyword and/or other common search techniques, apart from and/or in combination with the search techniques described above. The Service may also enable User A to tag one or more of his outgoing CIPs (for example, the special-purpose CIP he created for his planned business trip) as corresponding to the search function; meaning, for each "first-degree user" (defined below) in whose Storage Space 1011 a "Special-Purpose CIP Match" (also defined below) is found, if the Service generates a message to such user in the completion of this process, then the tagged CIP(s) may be included in such message. It is assumed here that User A uses pull-down bars to enter "USA" in the "country" field, "Nevada" in the "state" field, "Las Vegas" in the "city" field, and "March $3^{rd}$ through $13^{th}$" in the "effective dates" field, leaving other search fields blank; he also includes an "AND" search instruction. He then commands to the Service to conduct its search in accordance with his selected search function.

In Step 3, referring again to FIGS. 1, 1A, 3, and 13, Interface 102 delivers User A's command (which, among other things, includes the search function) to Database 101, which may then compile a "final list" of users in whose Storage Spaces 1011 it will search in accordance with the search function (here also called "first-degree users") and search such storage spaces of such users for a "Special-Purpose CIP Match" (defined below). In order to compile the final list of first-degree users, Database 101 may first review the CIPs in User A's Master Contact List (stored in his Storage Space 1012 shown in FIG. 1A) for compliance with service restrictions (if any) imposed by the Service on the "selection" of first-degree users, extracting the User Identification Code 3011 from each complying CIP to create an "interim list" of first-degree users (where multiple entries of the same Code 3011, if any, are merged into a single entry). The service restrictions (if any) in this process may be, in whole or in part, the same as or different from (but analogous to) those described above for Step 5 of the first automatic radial mining process shown in FIG. 13. For example, the Service may find as non-complying the CIPs of business users and thus not include the Codes 3011 of such users on the interim list; where, for example, as explained above, the Codes 3011 in the CIPs may include within them a sub-code indicating the type of user (individual or business) to whom a CIP corresponds. For each of the users whose Code 3011 is on the interim list, Database 101 may then retrieve and review his General and/or Specific Preferences concerning whether he permits his selection as a first-degree user in this process as initiated by User A, creating the final list by removing from the interim list the Code 3011 of each user who has set preferences prohibiting such selection (all in a manner analogous to that described above for Step 4 of the first automatic radial mining process shown in FIG. 13).

Database 101 may then search for a Special-Purpose CIP Match in the Storage Spaces 1011 of the first-degree users (whose User Identification Codes 3011 are on the final list). For each such user, Database 101 uses his Code 3011 to locate his Storage Space 1011 shown in FIG. 1A, in which is stored his outgoing MCIP(s). Within Storage Space 1011, Database 101 may first search for any special-purpose MCIPs, having a CIP Type Code 3014 of "04." If no special-purpose MCIPs are found, then, for such user, there is no Special-Purpose CIP Match. For each special-purpose MCIP that is found, Database 101 may then search the information (including data-corresponding codes, if any) within it for a match in accordance with the search function. For example, for the search function selected by User A, if such special-purpose MCIP has "USA" in the "country" field, "Nevada" in the "state" field, and "Las Vegas" in the "city" field, but has "effective dates" of "April $1^{st}$ through $6^{th}$," then there is no match. If, however, such special-purpose MCIP had the same information in the "country," "state," and "city" fields, but "effective dates" of "March $9^{th}$ through $20^{th}$"—where there is at least a partial (5-day) overlap with the "effective dates" in the search function—then there is an "interim" Special-Purpose CIP Match with such MCIP. For each special-purpose MCIP in the Storage Space 1011 of a first-degree user, a "Special-Purpose CIP Match" requires that (1) there is an interim Special-Purpose CIP Match, and (2) the first-degree user has not set Specific Preferences for such MCIP prohibiting the finding of a Special-Purpose CIP Match in this process. That is, for example, for each special-purpose MCIP with which there is an interim Special-Purpose CIP Match, Database 101 may then retrieve such first-degree user's Specific Preferences (if any) for such MCIP to determine whether such user prohibits the mining of such MCIP in this second process. If such user so prohibits the mining of such MCIP, then there is no Special-Purpose CIP Match with such MCIP (even though there is an interim Special-Purpose CIP Match). (Alternatively, Database 101 may retrieve and review the Specific Preferences for a special-purpose MCIP prior to searching the information within it for a match in accordance with the search function, and only undertake such searching where there is no prohibition against the mining of such MCIP.) Database 101 thus searches for a Special-Purpose CIP Match with respect to all of the special-purpose MCIPs in the Storage Spaces 1011 of all of the first-degree users.

If Database 101 determines there is one or more Special-Purpose CIP Matches, then the process continues and ends with Step 3A, shown in FIG. 14, where the Service reports positive results. Database 101 may generate for User A a report of positive results, which report may be delivered, for example, through Interface 102 to User A while he is still engaging the Service. The report may state, among other things, the number of other users in whose Storage Spaces 1011 a Special-Purpose CIP Match was found. The report may also identify each such user, either by name alone or otherwise (including by the provision of the special-purpose CIP(s) with respect to which a Special-Purpose CIP Match was found), facilitating User A's contacting such user if he wishes to arrange to get together with such user while in Las Vegas. For example, assuming in this case that User C is one such user, the report to User A may state that "User C (in your Master Contact List) is planning to be in Las Vegas from March $9^{th}$ through the $20^{th}$." Database 101 may also generate appropriate messages for inclusion in the running reports of each of the first-degree users in whose Storage Space 1011 a Special-Purpose CIP Match was found (as well as, perhaps, other users, e.g., those in whose Storage Spaces 1011 an interim Special-Purpose CIP Match was found but whose Specific Preferences prohibited a Special-Purpose CIP Match). Such messages may identify User A (and include, for example, his tagged CIP), facilitating each such user's contacting User A if he wishes to arrange to get together with User A while in Las Vegas. For example, assuming again User C is one such user, the message to User C may state that "User A (see tagged special-purpose CIP) is planning to be in Las Vegas at the same time that you are planning to be there (though User A has not been informed of your plans); please feel free to contact User A if you wish to arrange to get together with him while there." Preferably, if the Service enables in this process, in whole or in part, either or both of the identity preferences described above for Step 4A of the first preferred automatic radial mining process shown in FIG. 13, it does so in a manner that assures that, in the report to User A and/or the message to each of such other users, sufficient identity information is disclosed to facilitate the above-described contacts. If Database 101 determines, however, that there is no Special-Purpose CIP Match, then the process continues and ends with Step 3B, shown in FIG. 14, where the Service reports to User A negative results.

System 10 (and/or System 60) may also enable, and a user may also employ, other automatic radial mining processes performed in behalf of (at least partially) one user and involving the mining of information contained in other users' Storage Spaces 1011 (some of which are discussed below), either as alternatives or supplements to the second preferred process. For example, User A may engage the Service by means other than that described in connection with Step 1 of the second process; for example, as described above, he may engage the Service using a Device 106 in Category 1063 through Gateway 104 via Networks 105, and, by communicating with Gateway 104 (which in turn communicates with Database 101), he may select a search function, receive positive or negative results, and/or otherwise command the Service to perform a radial mining process analogous to the second preferred process. For another example, in Step 1, the Service may, at any time that it determines may be appropriate for User A to initiate this process (e.g., just following User A's creation of his special-purpose MCIP for his planned business trip), use a prompt to suggest that User A initiate this process and enable him to do so without, for example, clicking on "Mining Processes" Block 203 of Display Screen 20 shown in FIG. 2. Indeed, at any such time, the Service may itself initiate this process for User A (subject to User A's preferences), where it may, for example, automatically construct the search function by importing into the search fields information from certain of the fields within User A's special-purpose MCIP. For another example, whether the process is first initiated by User A or by the Service for User A, the Service may itself re-run the process (using the same search function) on a periodic basis or at another appropriate time (even at times when User A is not engaging the Service); for example, one day prior to the earliest date in the "effective dates" search field. For another example, the Service may enable User A to select the first-degree users (in a manner analogous to that described above for Step 3 of the first preferred automatic radial mining process shown in FIG. 13), where, among other things, the Service may enable him to select as a group to be included among the first-degree users those users in whose Master Contact Lists is stored one or more of User A's outgoing CIPs, even if User A does not have any outgoing CIPs of such other users in his Master Contact List (in a manner analogous to that described above for the second selection process in Step 3 of the preferred automatic update process shown in FIG. 7). If such were the case, and User A selected such group of users, Database 101 may, as part of Step 3, search Storage Spaces 1012 of all other users for CIPs having User A's User Identification Code 3011 in order to determine the User Identification Code 3011 of each user in such group of users (in a manner analogous to that described above for Step 4 of the preferred automatic update process shown in FIG. 7). The Service itself may "select" analogous groups of users in its compiling the final list of first-degree users in Step 3. Correspondingly, the Service may enable users to set preferences concerning their possible selection in this manner as first-degree users, also in a manner analogous to that described above for Step 4 of the preferred automatic update process shown in FIG. 7. If such were the case, then, for each user so selected and whose User Identification Code 3011 is on the final list of first-degree users, Database 101 may include on the final list a marker corresponding to such Code 3011 indicating that such user was so selected and Database 101 may then search in his Storage Space 1011 for any outgoing MCIP (of any type, not just a special-purpose type) containing information (excluding, e.g., the "effective dates" field) constituting a match in accordance with the search function (which match, absent Specific Preferences prohibiting the mining of such MCIP in this process, is considered a "positive result")—where, for example, the Service may retrieve for User A the CIPs of users who are presumably acquaintances of User A who live or work in Las Vegas, but for whom User A did not previously have CIPs stored in his Master Contact List. For another example, the Service may, as to certain service restrictions that it may impose in its "selection" of first-degree users, enable a user initiating this process to choose whether each such service restriction is to be applied by Database 101 in compiling the final list of such users.

Automatic radial mining processes in behalf of (at least partially) one user and involving mining of information contained in other users' Storage Spaces 1011 may be performed for personal and/or professional purposes in addition to that used hereinabove as an example to assist in describing such processes.

Still Other Embodiments

In the embodiments of System 10 (and/or System 60) described above, CIPs may stored in Database 101, for each user, in his Storage Spaces 1011 (outgoing CIPs) and/or 1012 (incoming CIPs), and, at least as stored in Database 101, each CIP contains contact information data in, for example, Block 302 of sample MCIP 30 shown in FIG. 3. In other embodiments of System 10, either for all users or particular users (as determined, e.g., by a user's preferences), some or all of the information contained in a user's outgoing and/or incoming CIPs (including some or all of the outgoing and/or incoming contact information data) may not be stored in Database 101. That is, for example, System 10 may involve, for each user, the storage in his Storage Space 1011 of his outgoing MCIP(s) (containing his outgoing contact information data), but, with respect to each of his incoming CIPs, the storage in his Storage Space 1012 of only Codes 3011 through 3014 of each incoming CIP (without storage of the incoming contact information data and other information contained in such CIP). When such user is engaging the Service and/or at other times, the Service may, as required for the delivery of a particular feature of the invention for the benefit of such user and/or another user, use such codes in such user's Storage Space 1012 to retrieve the corresponding incoming CIPs from other users' Storage Spaces 1011 and thus temporarily compile all or a portion of such user's Master Contact List (complete with contact information data for each incoming CIP). For another example, the Service may enable a user to set General and/or Specific Preferences indicating that one or more of his outgoing MCIPs is not to be stored in his Storage Space 1011. For any such outgoing MCIP that is not to be stored in Storage Space 1011 in Database 101, Database 101 may, for example, at the time of its creation at the Service and prior to such user's (e.g., User A's) downloading of it to his own device(s), include (or enable) in it (e.g., in Block 305 of sample MCIP 30 shown in FIG. 3) an instruction (not a toggle instruction) indicating that, in the creation of a corresponding Return CIP upon the downloading of such CIP to a another user's (e.g., User B's) Device 106, such corresponding Return CIP is to include (in addition to Codes 7011, 7012, 7013, 7014, and/or other information described above) at least the contact information data contained in such CIP (as well as, perhaps, some or all of the other information contained in such CIP). Therefore, when User B uploads such Return CIP to the Service in, for example, the preferred automatic portability process shown in FIG. 12, Database 101 may in Step 6, instead of retrieving the corresponding CIP as described above, deliver such Return CIP itself (as the corresponding CIP) to Gateway 104 for distribution to User B's other Device(s) 106. If, at the time of User B's uploading of such Return CIP to the Service, User A is no longer a Member of the Service (as determined by Database 101 using the Code 7011 in the Return CIP), then Database 101 may be programmed such that it does not store the Return CIP in User B's Storage Space 1012 and/or distribute it to User B's other Device(s) 106 and/or Distributors 608. For a final example, referring to FIGS. 1, 1A, and 1B, System 10 (and/or System 60) may exclude altogether Database 101 and the other components (Interface 102 and Gateway 104) of the Service, implementing the invention through, among other things, software and/or hardware on users' Devices 106, enabling, among other things, the creation of outgoing MCIPs directly on some or all of such devices, where, in such embodiment, certain of the features of the invention may be realized in the same or substantially the same manner as described above, and where certain other features of the invention may be compromised or disabled.

Persons skilled in the art will appreciate that the present invention can be practiced by still other than the described embodiments, which are presented for purposes of illustration and not of limitation. One or more of the components of System 10 (and/or System 60) may be omitted, and additional components may be added to System 10 (and/or System 60), without departing from the spirit and scope of the invention.

What is claimed is:

1. A system for the management of contact information, said system, for use with devices, comprising:
   a database having, for a plurality of users of the system, first storage spaces for storing said users' outgoing contact information profiles and, for at least some of said users, second storage spaces for storing incoming contact information profiles, said database also configured to store preferences for at least some of said users, and wherein said database includes a directory for searching of contact information profiles, said directory including said users' outgoing contact information profiles that are searchable by one or more other said users of the system, and wherein at least some of said users may set preferences with respect to accessibility of their outgoing contact information profiles in said directory;

wherein said database is further configured to receive information relating to a second said user's creating and saving an outgoing advertisement; said database is also configured to receive information relating to said second user's selecting potential recipients of said outgoing advertisement including by selecting one or more targeting options, and is further configured to enable said second user, in said selecting of potential recipients of said outgoing advertisement, to include at least some of other said users who are radially connected in the first degree to one or more other said users who are radially connected in the first degree to said second user;

an Internet interface linked to said database and enabling interactions, via the Internet, between said database and a plurality of said devices; and a communications gateway linked to said database for either sending to or receiving from said devices, or both, communications via either the Internet or other public communications networks, or both, wherein said system is configured to operate in conjunction with one or more distributors, said system configured to receive one or more communications, via the Internet, generated in connection with a first said user's using a first said distributor while on a said device and, in response to said one or more communications, to deliver an advertisement via the Internet for presentation to said first user on said device, said delivered advertisement being any one of said outgoing advertisement created by said second user and another advertisement deliverable from said system.

2. The system of claim 1, wherein said system is configured to receive one or more preferences of said first user relating to targeted advertisements, said one or more preferences of said first user relating to targeted advertisements being present in said one or more communications generated in connection with a first said user's using a first said distributor while on a said device, whereby said delivered advertisement is in compliance with said one or more preferences of said first user relating to targeted advertisements.

3. The system of claim 2, wherein said one or more preferences of said first user relating to targeted advertisements involves said first user's either one of permitting or prohibiting said system's delivery to him of a type of targeted advertisements.

4. The system of claim 3, wherein said type of targeted advertisements is a type where said system's selection of a said advertisement for delivery to said first user is based, at least in part, on said first user's location.

5. The system of claim 3, wherein at least one of said distributors is an application program stored on one or more of said devices.

6. The system of claim 5, wherein said system is further configured to make available, via the Internet, a software module for integration with said application program.

7. The system of claim 6, wherein at least one of said one or more preferences of said first user relating to targeted advertisements are stored in said database and attributed to said first user irrespective of said device in use by said first user.

8. The system of claim 1, wherein said database is further configured to determine whether said first user is a said potential recipient of said second user's said outgoing advertisement.

9. The system of claim 8, wherein said one or more communications generated in connection with a first said user's using a first said distributor while on a said device includes a distributor identifier.

10. The system of claim 9, wherein said database is configured to store preferences of at least some of said users regarding distribution, whereby said second user excludes one or more of said distributors from distributing said outgoing advertisement.

11. The system of claim 10, wherein at least one of said distributors is an Internet website, and where said system is further configured to make available, via the Internet, a software module for incorporation into said Internet website.

12. The system of claim 9, wherein said one or more communications generated in connection with a first said user's using a first said distributor while on a said device includes information for said system to identify said first user, where said information for said system to identify said first user is a code, stored on said first user's said device, where said system has previously associated said code with said first user while said first user was interacting with said system via the Internet.

13. The system of claim 12, wherein said system is configured to enable said second user, in said selecting of potential recipients of said outgoing advertisement, to include at least some of other said users in whose said second storage spaces in said database said second user's said outgoing contact information profile is stored as a said incoming contact information profile.

14. The system of claim 13, wherein said system is also configured to enable said second user, in said selecting of potential recipients of said outgoing advertisement, to exclude at least some of other said users in whose said second storage spaces in said database said second user's said outgoing contact information profile is stored as a said incoming contact information profile.

15. The system of claim 13, wherein, in connection with said determination whether said first user is a said potential recipient of said second user's said outgoing advertisement, said database makes assumptions or determinations, or both, about either the type of relationships or the quality of relationships, or both, between said first user and said one or more other said users who are radially connected in the first degree to said second user.

16. The system of claim 12, wherein said system is configured to enable said second user, in said selecting of potential recipients of said outgoing advertisement, to include at least some of other said users who are determined by said database to correspond to data uploaded to said database by said second user.

17. The system of claim 16, wherein said data uploaded to said database by said second user is contact information data.

18. The system of claim 17, wherein said delivered advertisement is configured such that said first user, following said presentation of said delivered advertisement to said first user on said device, takes one or more actions with respect to said delivered advertisement to set one or more preferences relating to advertisements.

19. The system of claim 18, where said second user's said outgoing advertisement is said delivered advertisement, wherein said setting of one or more preferences relating to advertisements involves said first user's blocking his further receipt of an advertisement of said second user.

20. The system of claim 19, wherein said database is configured to compile a user profile for at least some of said users and to make use of information in said user profile in targeting advertisements, where said setting of one or more preferences relating to advertisements involves said first user's editing said information in said user profile.

21. The system of claim 18, wherein said setting of one or more preferences relating to advertisements involves said first user's prohibiting his receipt of a type of targeted advertisements.

22. The system of claim 12, where said second user's said outgoing advertisement is said delivered advertisement, wherein said system is configured to receive one or more further communications, via the Internet, generated in connection with said first user taking one or more actions with respect to said delivered advertisement and, in response to said one or more further communications, to store said second user's said outgoing contact information profile as a said incoming contact information profile in said first user's said second storage space in said database.

23. The system of claim 12, wherein said database is configured to receive information indicating one or more actions recipients of said second user's said outgoing advertisement take with respect to said outgoing advertisement.

24. The system of claim 23, wherein said database is further configured to determine whether additional said users of said system are potential recipients of said second user's said outgoing advertisement and to compile information indicating the number of said potential recipients of said second user's said outgoing advertisement.

25. The system of claim 24, wherein said database compiles information relating to the number of said recipients of said second user's said outgoing advertisement.

26. The system of claim 8, wherein said system is configured to receive information, via the Internet, generated in connection with one or more of said users interacting with an Internet website of said second user, said information including information for said system to identify said second user, and, where said first user interacted with said second user's said Internet website, said database adds said first user to a list of said potential recipients of said second user's said outgoing advertisement.

27. The system of claim 26, wherein said information generated in connection with one or more of said users interacting with an Internet website of said second user indicates one or more actions taken by said first user while interacting with said second user's said Internet website.

28. The system of claim 27, wherein said database is configured to enable said second user to store in said database one or more preferences defining which of said one or more actions taken by said first user while interacting with said second user's said Internet website should result in said database adding said first user to said list.

29. The system of claim 28, wherein said system is further configured to make available, via the Internet, software code for use by said second user, said software code including information for said system to identify said second user.

30. The system of claim 29, wherein said software code is for incorporation into said second user's said Internet website.

31. The system of claim 29, wherein said information generated in connection with one or more of said users interacting with an Internet website of said second user includes information for said system to identify said first user.

32. The system of claim 31, where said information for said system to identify said first user is a code, stored on said first user's said device, where said system has previously associated said code with said first user while said first user was interacting with said system via the Internet.

33. The system of claim 29, wherein said one or more communications generated in connection with a first said user's using a first said distributor while on a said device includes information for said system to identify said first user, where said information for said system to identify said first user is a code, stored on said first user's said device, where said system has previously associated said code with said first user.

34. A system for the management of contact information, said system, for use with devices, comprising:
   a database having, for a plurality of users of the system, first storage spaces for storing said users' outgoing contact information profiles and, for at least some of said users, second storage spaces for storing incoming contact information profiles, said database also configured to store preferences for at least some of said users, and wherein said database includes a directory for searching of contact information profiles, said directory including said users' outgoing contact information profiles that are searchable by one or more other said users of the system, and wherein at least some of said users may set preferences with respect to accessibility of their outgoing contact information profiles in said directory;
   wherein said database is further configured to receive information relating to a second said user's creating and saving an outgoing advertisement;
   an Internet interface linked to said database and enabling interactions, via the Internet, between said database and a plurality of said devices; and
   a communications gateway linked to said database for either sending to or receiving from said devices, or both, communications via either the Internet or other public communications networks, or both,
   wherein said system is configured to operate in conjunction with one or more distributors, said system configured to receive one or more communications, via the Internet, generated in connection with a first said user's using a first said distributor while on a said device and, in response to said one or more communications, to deliver an advertisement via the Internet for presentation to said first user on said device;
   wherein said system is further configured such that, where said second user's said outgoing advertisement is said delivered advertisement, and where said first user is radially connected in the first degree to another said user who is radially connected in the first degree to said second user, then said delivered advertisement is presented together with information identifying such said user who is radially connected in the first degree to both said first user and said second user.

35. The system of claim 34, wherein said system is configured to receive one or more preferences of said first user relating to targeted advertisements, said one or more preferences of said first user relating to targeted advertisements being present in said one or more communications generated in connection with a first said user's using a first said distributor while on a said device, whereby said delivered advertisement is in compliance with said one or more preferences of said first user relating to targeted advertisements.

36. The system of claim 35, wherein said one or more preferences of said first user relating to targeted advertisements involves said first user's either one of permitting or prohibiting said system's delivery to him of a type of targeted advertisements.

37. The system of claim 36, wherein said type of targeted advertisements is a type where said system's selection of a said advertisement for delivery to said first user is based, at least in part, on said first user's location.

38. The system of claim 36, wherein at least one of said distributors is an application program stored on one or more of said devices.

39. The system of claim 38, wherein said system is further configured to make available, via the Internet, a software module for integration with said application program.

40. The system of claim 39, wherein at least one of said one or more preferences of said first user relating to targeted advertisements are stored in said database and attributed to said first user irrespective of said device in use by said first user.

41. The system of claim 34, wherein said database is also configured to receive information relating to said second user's selecting potential recipients of said outgoing advertisement including by selecting one or more targeting options; and said database is further configured to determine whether said first user is a said potential recipient of said second user's said outgoing advertisement.

42. The system of claim 41, wherein said one or more communications generated in connection with a first said user's using a first said distributor while on a said device includes a distributor identifier.

43. The system of claim 42, wherein said database is configured to store preferences of at least some of said users regarding distribution, whereby said second user excludes one or more of said distributors from distributing said outgoing advertisement.

44. The system of claim 43, wherein said one or more communications generated in connection with a first said user's using a first said distributor while on a said device includes information for said system to identify said first user, where said information for said system to identify said first user is a code, stored on said first user's said device, where said system has previously associated said code with said first user while said first user was interacting with said system via the Internet.

45. The system of claim 44, wherein said system is further configured to enable said second user, in said selecting of potential recipients of said outgoing advertisement, to include at least some of other said users who are radially connected in the first degree to one or more other said users who are radially connected in the first degree to said second user.

46. The system of claim 45, wherein, in connection with said determination whether said first user is a said potential recipient of said second user's said outgoing advertisement, said database makes assumptions or determinations, or both, about either the type of relationships or the quality of relationships, or both, between said first user and said one or more other said users who are radially connected in the first degree to said second user.

47. The system of claim 43, wherein said database is configured to store preferences for at least some of said users regarding disclosure of identities, whereby such said user who is radially connected in the first degree to both said first user and said second user prohibits said presentation to said first user of information identifying such said user.

48. The system of claim 43, wherein said system is configured to receive one or more further communications, via the Internet, generated in connection with said first user taking one or more actions with respect to said delivered advertisement and, in response to said one or more further communications, to store said second user's said outgoing contact information profile as a said incoming contact information profile in said first user's said second storage space in said database.

49. The system of claim 43, wherein said delivered advertisement is configured such that said first user, following said presentation of said delivered advertisement to said first user on said device, takes one or more actions with respect to said delivered advertisement to set one or more preferences relating to advertisements.

50. The system of claim 49, wherein said setting of one or more preferences relating to advertisements involves said first user's blocking his further receipt of an advertisement of said second user.

51. The system of claim 50, wherein said database is configured to compile a user profile for at least some of said users and to make use of information in said user profile in targeting advertisements, where said setting of one or more preferences relating to advertisements involves said first user's editing said information in said user profile.

52. The system of claim 49, wherein said setting of one or more preferences relating to advertisements involves said first user's prohibiting his receipt of a type of targeted advertisements.

53. The system of claim 43, wherein said system is configured to receive information, via the Internet, generated in connection with one or more of said users interacting with an Internet website of said second user, said information including information for said system to identify said second user, and, where said first user interacted with said second user's said Internet website, said database adds said first user to a list of said potential recipients of said second user's said outgoing advertisement.

54. The system of claim 53, wherein said information generated in connection with one or more of said users interacting with an Internet website of said second user indicates one or more actions taken by said first user while interacting with said second user's said Internet website.

55. The system of claim 54, wherein said database is configured to enable said second user to store in said database one or more preferences defining which of said one or more actions taken by said first user while interacting with said second user's said Internet website should result in said database adding said first user to said list.

56. The system of claim 55, wherein said system is further configured to make available, via the Internet, software code for use by said second user, said software code including information for said system to identify said second user.

57. The system of claim 56, wherein said software code is for incorporation into said second user's said Internet website.

58. The system of claim 56, wherein said information generated in connection with one or more of said users interacting with an Internet website of said second user includes information for said system to identify said first user.

59. The system of claim 58, where said information for said system to identify said first user is a code, stored on said first user's said device, where said system has previously associated said code with said first user while said first user was interacting with said system via the Internet.

60. The system of claim 56, wherein said one or more communications generated in connection with a first said user's using a first said distributor while on a said device includes information for said system to identify said first user, where said information for said system to identify said first user is a code, stored on said first user's said device, where said system has previously associated said code with said first user.

61. The system of claim 53, wherein said system is configured to enable said second user, in said selecting of potential recipients of said outgoing advertisement, to include at least some of other said users who are determined by said database to correspond to data uploaded to said database by said second user.

62. The system of claim 61, wherein said data uploaded to said database by said second user is contact information data.

63. The system of claim 62, wherein said database is further configured to determine whether additional said users of said system are potential recipients of said second user's said outgoing advertisement and to compile information indicating the number of said potential recipients of said second user's said outgoing advertisement.

64. A system for the management of contact information, said system, for use with devices, comprising:
   a database having, for a plurality of users of the system, first storage spaces for storing said users' outgoing contact information profiles and, for at least some of said users, second storage spaces for storing incoming contact information profiles, said database also configured to store preferences for at least some of said users, and wherein said database includes a directory for searching of contact information profiles, said directory including said users' outgoing contact information profiles that are searchable by one or more other said users of the system, and wherein at least some of said users may set preferences with respect to accessibility of their outgoing contact information profiles in said directory;
   wherein said database is further configured to receive information relating to a second said user's creating and saving an outgoing advertisement;
   an Internet interface linked to said database and enabling interactions, via the Internet, between said database and a plurality of said devices; and
   a communications gateway linked to said database for either sending to or receiving from said devices, or both, communications via either the Internet or other public communications networks, or both,
   wherein said system is configured to operate in conjunction with one or more distributors, said system configured to receive one or more communications, via the Internet, generated in connection with a first said user's using a first said distributor while on a said device and, in response to said one or more communications, to deliver an advertisement via the Internet for presentation to said first user on said device;
   and where said second user's said outgoing advertisement is said delivered advertisement, wherein said system is configured to receive one or more further communications, via the Internet, generated in connection with said first user taking one or more actions with respect to said delivered advertisement and, in response to said one or more further communications, to store said second user's said outgoing contact information profile as a said incoming contact information profile in said first user's said second storage space in said database, and wherein said system is further configured such that, in connection with said first user taking said one or more actions that results in said second user's said outgoing contact information profile being stored as a said incoming contact information profile in said first user's said second storage space in said database, said system presents a message to one or more other said users radially connected to said first user, said message including said second user's said outgoing contact information profile.

65. The system of claim 64, wherein said system is configured to receive one or more preferences of said first user relating to targeted advertisements, said one or more preferences of said first user relating to targeted advertisements being present in said one or more communications generated in connection with a first said user's using a first said distributor while on a said device, whereby said delivered advertisement is in compliance with said one or more preferences of said first user relating to targeted advertisements.

66. The system of claim 65, wherein said one or more preferences of said first user relating to targeted advertisements involves said first user's either one of permitting or prohibiting said system's delivery to him of a type of targeted advertisements.

67. The system of claim 66, wherein said type of targeted advertisements is a type where said system's selection of a said advertisement for delivery to said first user is based, at least in part, on said first user's location.

68. The system of claim 66, wherein at least one of said distributors is an application program stored on one or more of said devices.

69. The system of claim 68, wherein said system is further configured to make available, via the Internet, a software module for integration with said application program.

70. The system of claim 69, wherein at least one of said one or more preferences of said first user relating to targeted advertisements are stored in said database and attributed to said first user irrespective of said device in use by said first user.

71. The system of claim 64, wherein said database is also configured to receive information relating to said second user's selecting potential recipients of said outgoing advertisement including by selecting one or more targeting options; and said database is further configured to determine whether said first user is a said potential recipient of said second user's said outgoing advertisement.

72. The system of claim 71, wherein said one or more communications generated in connection with a first said user's using a first said distributor while on a said device includes a distributor identifier.

73. The system of claim 72, wherein said database is configured to store preferences of at least some of said users regarding distribution, whereby said second user excludes one or more of said distributors from distributing said outgoing advertisement.

74. The system of claim 71, wherein said one or more communications generated in connection with a first said user's using a first said distributor while on a said device includes information for said system to identify said first user, where said information for said system to identify said first user is a code, stored on said first user's said device, where said system has previously associated said code with said first user while said first user was interacting with said system via the Internet.

75. The system of claim 71, wherein said system is configured to enable said second user, in said selecting of potential recipients of said outgoing advertisement, to include at least some of other said users who are determined by said database to correspond to data uploaded to said database by said second user.

76. The system of claim 75, wherein said data uploaded to said database by said second user is contact information data.

77. The system of claim 71, wherein said database is configured to store preferences of at least some of said users regarding said system's presentation of said messages, whereby said first user sets preferences governing which other said users are to be presented said message.

78. The system of claim 77, wherein, in connection with said messages, said database makes either assumptions or determinations, or both, about either the type of relationships or the quality of relationships, or both, between said first user and said other users radially connected to said first user.

79. The system of claim 78, wherein said system is further configured to enable said second user to send promotional updates to at least some of other said users in whose said second storage spaces in said database said second user's said outgoing contact information profile is stored as an incoming contact information profile, said promotional updates including said second user's said outgoing contact information profile and being presentable to such said other users through either said Internet interface or said communications gateway, or both.

80. The system of claim 79, wherein said database is configured to store preferences of at least some of said users regarding their receipt of said promotional updates, whereby a such said other user sets preferences indicating that said system restrict presentation to such said other user promotional updates sent by said second user.

81. The system of claim 80, wherein said system is further configured to enable said second user to choose one or more targeting options governing the delivery of a said promotional update to other said users.

82. The system of claim 81, wherein one or more of said targeting options relate to the locations of said other users.

83. The system of claim 71, wherein said system is configured to receive information, via the Internet, generated in connection with one or more of said users interacting with an Internet website of said second user, said information including information for said system to identify said second user, and, where said first user interacted with said second user's said Internet website, said database adds said first user to a list of said potential recipients of said second user's said outgoing advertisement.

84. The system of claim 83, wherein said information generated in connection with one or more of said users interacting with an Internet website of said second user indicates one or more actions taken by said first user while interacting with said second user's said Internet website.

85. The system of claim 84, wherein said database is configured to enable said second user to store in said database one or more preferences defining which of said one or more actions taken by said first user while interacting with said second user's said Internet website should result in said database adding said first user to said list.

86. The system of claim 85, wherein said system is further configured to make available, via the Internet, software code for use by said second user, said software code including information for said system to identify said second user.

87. The system of claim 86, wherein said software code is for incorporation into said second user's said Internet website.

88. The system of claim 86, wherein said information generated in connection with one or more of said users interacting with an Internet website of said second user includes information for said system to identify said first user.

89. The system of claim 88, where said information for said system to identify said first user is a code, stored on said first user's said device, where said system has previously associated said code with said first user while said first user was interacting with said system via the Internet.

90. The system of claim 86, wherein said one or more communications generated in connection with a first said user's using a first said distributor while on a said device includes information for said system to identify said first user, where said information for said system to identify said first user is a code, stored on said first user's said device, where said system has previously associated said code with said first user.

* * * * *